US011639415B2

(12) United States Patent
Lalgudi et al.

(10) Patent No.: US 11,639,415 B2
(45) Date of Patent: May 2, 2023

(54) BPA-FREE COATINGS

(71) Applicant: BATTELLE MEMORIAL INSTITUTE, Columbus, OH (US)

(72) Inventors: Ramanathan S. Lalgudi, Westerville, OH (US); Robert J. Cain, Lewis Center, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 411 days.

(21) Appl. No.: 16/867,994

(22) Filed: May 6, 2020

(65) Prior Publication Data

US 2020/0332055 A1 Oct. 22, 2020

Related U.S. Application Data

(62) Division of application No. 15/565,616, filed as application No. PCT/US2016/026851 on Apr. 10, 2016, now Pat. No. 10,767,000.

(60) Provisional application No. 62/146,237, filed on Apr. 10, 2015.

(51) Int. Cl.

| C08G 12/00 | (2006.01) |
| C08G 2/00 | (2006.01) |
| C08G 61/04 | (2006.01) |
| C08G 59/16 | (2006.01) |
| C08G 59/32 | (2006.01) |
| C08G 65/332 | (2006.01) |
| B65D 23/02 | (2006.01) |
| B65D 25/14 | (2006.01) |
| C09D 177/00 | (2006.01) |
| C09D 179/02 | (2006.01) |
| B05D 7/14 | (2006.01) |
| B05D 7/22 | (2006.01) |

(52) U.S. Cl.
CPC ......... *C08G 59/1455* (2013.01); *B65D 23/02* (2013.01); *B65D 25/14* (2013.01); *C08G 59/32* (2013.01); *C08G 65/3322* (2013.01); *C09D 177/00* (2013.01); *C09D 179/02* (2013.01); *B05D 7/14* (2013.01); *B05D 7/227* (2013.01)

(58) Field of Classification Search
CPC .... B65D 23/02; B65D 25/14; C08G 59/1455; C08G 59/32; C08G 65/3322; C09D 177/00; C09D 179/02; B05D 7/227; B05D 7/14
USPC ..................... 528/228, 220; 520/1
See application file for complete search history.

(56) References Cited

U.S. PATENT DOCUMENTS

| 5,973,082 A | 10/1999 | Elmore |
| 6,204,343 B1 * | 3/2001 | Barucha ............ C08G 65/3322 524/451 |
| 2007/0173602 A1 | 7/2007 | Brinkman et al. |
| 2013/0217804 A1 * | 8/2013 | Campbell .............. C09J 163/00 523/400 |
| 2016/0297992 A1 | 10/2016 | Lalgudi et al. |

FOREIGN PATENT DOCUMENTS

| DE | 000010225367 | * | 9/2003 |
| DE | 10225367 C1 | | 9/2003 |
| GB | 1154726 A | | 6/1969 |
| GB | 1319112 A | | 6/1973 |
| WO | 2012064717 A2 | | 5/2012 |
| WO | 2013092539 A1 | | 6/2013 |
| WO | 2016164870 A1 | | 10/2016 |
| WO | 2016164869 A3 | | 11/2016 |

OTHER PUBLICATIONS

Witzeman et al, Transacetoacetylation with tert-butyl acetoacetate: Synthetic applications, J. Org. Chem., 1991,56, 1713-1718 (Year: 1991).*
Pietschmann, DE 000010225367 Machine Translation, Sep. 18, 2003 (Year: 2003).*
Witzeman, et al., "Comparison of Methods for the Preparation of Acetoacetylated Coating Resins," J. Coatings Technology, 1990, 62, 101-112.
Targel, et al., "Oxidative Asymmetric Umpolung Alkylation of Evans' beta-ketoimides Using Dialkylzinc Nucleophiles," Organic and Biomolecular Chemistry, 2015, 13, 2546-2549.
International Search Report and Written Opinion in International Patent Application No. PCT/US16/26850, dated May 10, 2016.
International Search Report and Written Opinion in International Patent Application No. PCT/US16/26851, dated Aug. 8, 2016.
Witzeman, et al., "Transacetoacetylation with Tert-Butyl Acetoacetate: Synthetic Applications," J. Org. Chem. 1991, 56, 1713-1718.
International Preliminary Report on Patentability in International Patent Application No. PCT/US16/26851, dated Oct. 10, 2017.
International Preliminary Report on Patentability in International Patent Application No. PCT/US16/26850, dated Oct. 10, 2017.

* cited by examiner

*Primary Examiner* — Jessica Whiteley
(74) *Attorney, Agent, or Firm* — Benesch, Friedlander, Coplan & Aronoff LLP

(57) ABSTRACT

Provided are poly(AAG)-compositions, and corresponding coatings, foams, and coated articles. Also provided are methods for preparing the poly(AAG)-compositions and corresponding reagents including, e.g., polyol-AAG compositions. Coatings using the poly(AAG)-compositions may be useful for, e.g., replacing bisphenol-A cross-linked coatings used in food and beverage containers, coating metal articles, and the like.

6 Claims, 7 Drawing Sheets

| Property | Method | Soy-PK |
|---|---|---|
| Functionality | Based on structure | 6 |
| Molecular weight | Estimated based on chemical structure | >3000 |
| Color | Visual | Amber |
| Density (g/mL) | ASTM D-4052 | 1.07 |
| Viscosity @ 19 °C (cPs) 100% solids | ASTM D-445 | 264,000 |
| Viscosity @ 19 °C (cPs) 75% solids in MEK | ASTM D-445 | 515 |

FIG. 2

| Measurement/Methods | Commercial BPA Resin | Soy-PK |
|---|---|---|
| MEK rub | 100+ double rubs | 100+ double rubs |
| Cross-hatch adhesion | 5B | 5B |
| Conical Mandrel Bend | Cracked (3/4 inch diameter) | Passed (1 inch +) |
| Boiling water resistance (1hr) ASTM D 6665 | No haziness, adhesion maintained | No haziness, adhesion maintained |
| Citric acid resistance (saturated solution, 72-hour exposure) ASTM C282-10 | No haziness, adhesion maintained | No haziness, adhesion maintained |
| Corrosion performance[1] | Comparative control | Similar to commercial BPA resin |

FIG. 4

BPA-FREE COATINGS

CROSS-REFERENCE TO RELATED APPLICATIONS

This application is a divisional of U.S. patent application Ser. No. 15/565,616 filed Oct. 10, 2017, which is a national stage filing under 35 U.S.C. § 371 of PCT/US2016/026851, filed Apr. 10, 2016, which claims priority from U.S. Provisional Pat. App. No. 62/146,237, filed on Apr. 10, 2015. Each of the above-referenced applications is entirely incorporated by reference herein.

BACKGROUND

Bisphenol-A (BPA) is a cross-linker for synthetic resins used as coatings, and began to replace resins based on natural oils (oleoresins) in the mid-1970s. BPA-based coatings have high corrosion resistance compared to oleoresins and are widely used, e.g., in food packaging. In the United States, over 300 billion beer, beverage, and food cans are coated with half a million metric tons of BPA-containing epoxy resins each year, and the global market is more than twice that large. Although there are currently no U.S. Food and Drug Administration (FDA) or other U.S. regulatory restrictions on the use of BPA-based resins in most food containers, BPA-related health hazards have been recognized by regulators, policymakers, and consumers. Controversy over health implications has caused concern over the use of BPA in food packaging. BPA is banned from use in applications such as infant feeding plastic bottles, and California recently listed BPA as a hazardous material.

There is much interest in cost-effective and functional replacements for BPA-based epoxy resins in can coatings that may contact food. Desirable characteristics for alternative coatings are numerous and challenging, including coating integrity (adhesion, strength, flexibility, pH/corrosion resistance, and the like) under sterilization, handling, and storage, no effect on food taste, compliance with FDA guidelines on direct food contact use, cost-effective, compatible with established manufacturing processes, and the like.

Many attempts to develop a viable solution have been made. Natural oils may be functionalized with hydroxyl or carboxyl groups and may be converted to polyesters and polyurethanes for use in coatings, inks, adhesives, foams, and the like. However, oleoresins often exhibit poor corrosion resistance. For example, it is believed that acidic tomato juice readily damages oleoresin coatings. Chemistries such as vinylation, acrylation, polyesterifcation, polyolefinination, and use of a variety of cross-linkers have been explored, but have not been successful because of failure in one or more desirable characteristics, such as flexibility, adhesion, application method, cure speed, corrosion resistance, or hydrolysis under low pH.

Some epoxy-based resin alternatives have been investigated using alternative cross-linkers, such as diglycidyl ethers of n-alkyl diphenolates, isosorbide, and bisguaracol. However, these alternatives are costly and have been reported to suffer from problems such as estrogen receptor activity, epichlorohydrin toxicity, and poor hydrolytic stability.

The present application appreciates that developing corrosion resistant resins. e.g., for replacing BPA-cross-linked resins in can coatings, may be a challenging endeavor.

SUMMARY

In one embodiment, In various embodiments, a method for preparing a AAG composition is provided. The method may include providing a poly-functional compound including two or more functional groups. Each functional group nay independently be hydroxy, amino, or alkenyl. The method may include reacting the poly-functional compound under conditions effective to form the AAG composition by one or more of the following. For example, the method may include reacting the poly-functional compound under conditions effective to form the AAG composition by contacting the poly-functional compound with a ketene compound, wherein the poly-functional compound includes at least one hydroxy group. The method may include reacting the poly-functional compound under conditions effective to form the AAG composition by contacting the poly-functional compound with a β-ketoester, wherein the poly-functional compound includes at least one hydroxy or amino group. The method may include reacting the poly-functional compound under conditions effective to form the AAG composition by contacting the poly-functional compound with a peroxo reagent and one or more of: a β-ketoimide, a β-ketoester, and a β-ketoacid, wherein the poly-functional compound includes at least one alkenyl group. The method may include reacting the poly-functional compound under conditions effective to form the AAG composition by contacting the poly-functional compound with a mercaptoalkanol in the presence of an initiator effective to form a mercaptoalkanol-substituted compound. The poly-functional compound may include at least one alkenyl group. The method may include further reacting the mercaptoalkanol-substituted compound with one or more of: the β-ketoester and the β-ketoacid effective to form the AAG composition.

In another embodiment, a method for preparing an AAG composition is provided. The method may include contacting a poly-functional compound with a β-ketoester to form a reaction mixture. The poly-functional compound may include one or more of: a hydroxyl group; and an amino group. The method may include allowing the poly-functional compound and the β-ketoester to react substantially in the absence of solvent effective to form the AAG composition.

In one embodiment, a method for preparing a polyol-AAG composition is provided. The method may include contacting an unsaturated polyol with a peroxo reagent and a β-ketoimide to form a reaction mixture. The method may include allowing the unsaturated polyol, the peroxo reagent, and the β-ketoimide to react effective to form the polyol-AAG composition.

In one embodiment, a method for preparing a poly(AAG)-composition is provided. The method may include contacting an AAG composition with a cross-linking compound to form a reaction mixture. The method may include allowing the AAG composition and the cross-linking compound to react effective to form the poly(AAG) composition. The AAG composition may exclude a triglyceride-AAG composition.

In another embodiment, a method for preparing a poly (AAG)-β-ketoester composition is provided. The method may include contacting a AAG composition with a cross-linking compound to form a reaction mixture. The method may include allowing the AAG composition and the cross-linking compound to react effective to form the poly(AAG)-β-ketoester composition.

In one embodiment, a poly(AAG)-composition is provided. The poly(AAG)-composition may include a polyfunctional moiety derived from a polyol unit, a polyamine unit, a polyalkene unit, or a combination or composite thereof. The poly(AAG)-composition may include a β-ketoester group bonded to an alkyl chain of the polyfunctional moiety. The poly(AAG)-composition may include one or more of the following. The poly(AAG)-composition may include an amide group bonded to a carbon of the alkyl chain that is alpha to a ketone of the β-ketoester such that the poly(AAG)-composition includes a poly(AAG)amido-β-ketoester composition. The poly(AAG)-composition may include an amine group bonded to a carbon on the alkyl chain that is beta to a ketone of the β-ketoester such that the poly(AAG)-composition comprises a poly(AAG)amino-β-ketoester composition. The poly(AAG)-composition may include a hydrazone group bonded to a keto-carbon of the β-ketoester group such that the poly(AAG)-composition comprises a poly(AAG)hydrazone-β-ketoester composition.

In another embodiment, a poly(AAG)-β-ketoester composition is provided. The poly(AAG)-β-ketoester composition may include: a polyol unit; a β-ketoester group bonded to an alkyl chain of the polyol unit. The poly(AAG)-β-ketoester composition may include an amide group bonded to a carbon of the alkyl chain that may be alpha to a ketone of the β-ketoester such that the poly(AAG)-β-ketoester composition includes a polyol polyamido-β-ketoester composition. The poly(AAG)-β-ketoester composition may include an amine group bonded to a carbon on the alkyl chain that may be beta to a ketone of the β-ketoester such that the poly(AAG)-β-ketoester composition includes a polyol polyamino-β-ketoester composition. The poly(AAG)-β-ketoester composition may include a hydrazone group bonded to a keto-carbon of the β-ketoester group such that the poly(AAG)-β-ketoester composition includes a polyol polyhydrazone-β-ketoester composition.

In one embodiment, an article is provided. The article may include a surface coated with a poly(AAG)-composition.

In another embodiment, an article is provided. The article nay include a surface coated with a poly(AAG)-β-ketoester composition.

BRIEF DESCRIPTION OF THE DRAWINGS

The accompanying figures, which are incorporated in and constitute a part of the specification, illustrate example methods and compositions and are used merely to illustrate example embodiments.

FIG. 2 is a table showing the physical properties of an example soy-AAG ("soy-PK").

FIG. 4 is a table showing the performance properties of an example soy-AAG ("soy-PK") CYMEL™-303-cured resin as compared to commercial BPA resin.

DETAILED DESCRIPTION

Figure 1:
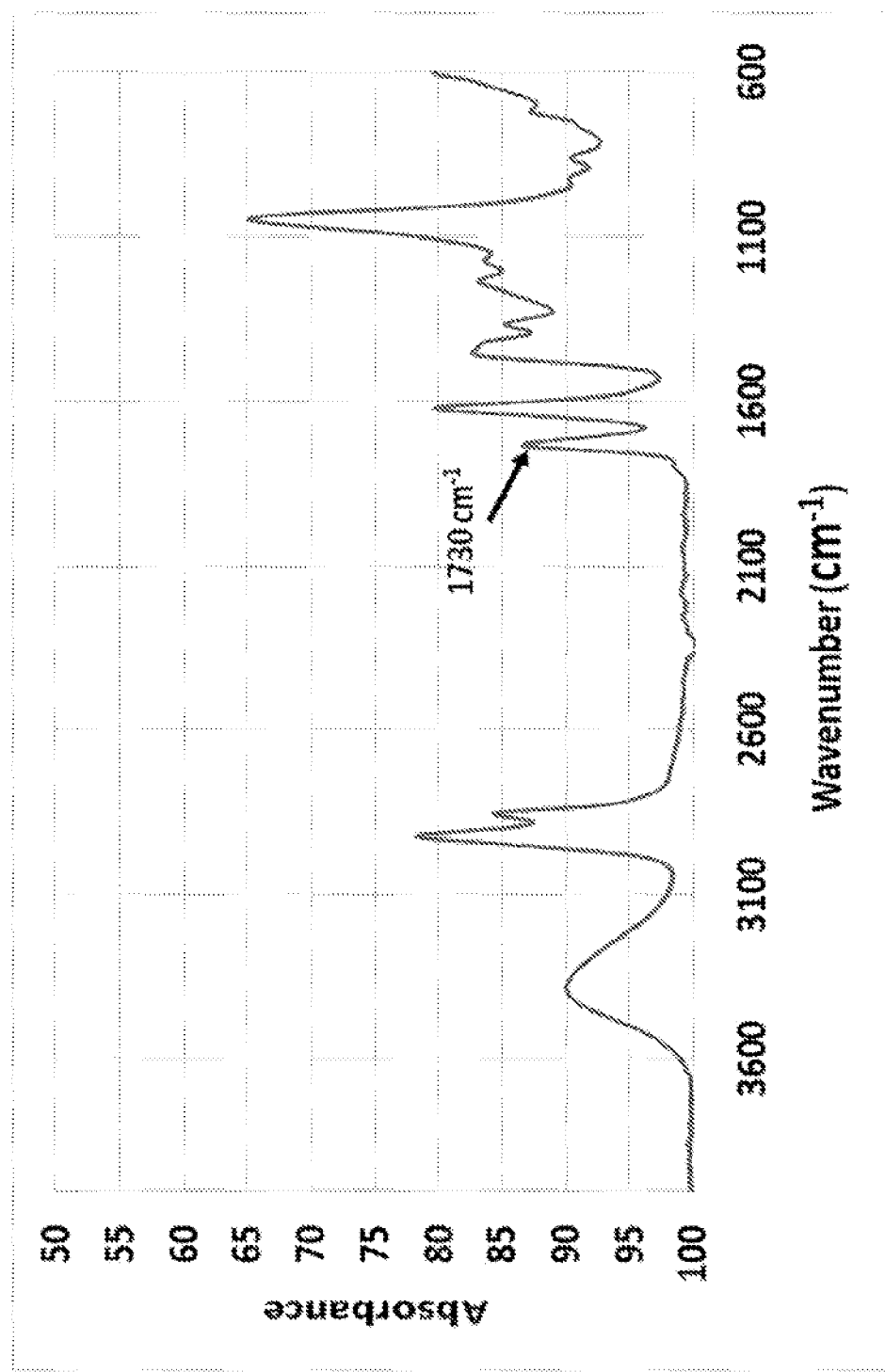
FIG. 1 is an FTIR spectrum of an example soy-AAG ("soy-PK"), as prepared in EXAMPLES 2A and 2B.

In various embodiments, a method for preparing a triglyceride-AAG composition is provided. The method may include contacting an epoxidized triglyceride composition with an epoxy-reactive nucleophilic compound. The epoxy-reactive nucleophilic compound may be AAG (acetoacetyl group)-substituted. The epoxy-reactive nucleophilic compound may be AAG-unsubstituted. The method may include allowing the epoxidized triglyceride composition to react with the AAG-substituted epoxy-reactive nucleophilic compound effective to form the triglyceride-AAG composition. The method may include allowing the epoxidized triglyceride composition to react with the AAG-unsubstituted epoxy-reactive nucleophilic compound effective to form an intermediate product. The method may include reacting the intermediate product with a β-ketoacid or a β-ketoester effective to form the triglyceride-AAG composition.

In some embodiments, the method may include allowing the epoxidized triglyceride composition to react with the AAG-unsubstituted epoxy-reactive nucleophilic compound effective to form the intermediate product, e.g., ending with isolation of the intermediate product.

In many embodiments, the method may include contacting the epoxidized triglyceride composition with the AAG-substituted epoxy-reactive nucleophile in the form of the β-ketoacid to form a reaction mixture. The method may include allowing the epoxidized triglyceride composition and the β-ketoacid to react effective to form the triglyceride-AAG composition.

As used herein, the term "AAG" means an acetoacetyl group. For example, triglyceride-methyl-AAG and polyol-methyl-AAG may refer to, respectively:

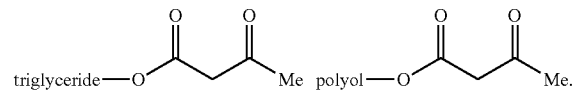

As used herein, a "β-ketoacid" means a group including a carboxylic acid separated from a carbonyl by one intervening carbon atom, e.g., —C(═O)CH$_2$CO$_2$H. Likewise, as used herein, a "β-ketoester" means a group including a carboxylic acid ester separated from a carbonyl by one intervening carbon atom, e.g., —C(═O)CH$_2$CO$_2$R.

As used herein, an epoxidized triglyceride means a triester of glycerol, CH(CH$_2$OH)$_2$, with at least one epoxide group in or on at least one fatty acid side-chain.

As used herein, an epoxy-reactive nucleophilic compound means a compound capable of reacting with an epoxide, e.g., a compound containing at least one nucleophilic functional group capable of a nucleophilic attack on an electrophilic epoxy carbon of the epoxidized triglyceride. The nucleophilic attack may lead to, for example, ring-opening of the epoxide, covalent bond formation between the nucleophilic functional group of the epoxy-reactive nucleophilic compound and the electrophilic epoxy carbon of the epoxidized triglyceride, and the like Example nucleophilic functional groups include, for example, hydroxy, amino, thiol, carboxy, and the like. For example, an epoxy-reactive nucleophilic compound may include a nucleophilic functional group, e.g., hydroxy, amino, thiol, carboxy, phosphine, and the like. Further, for example, an epoxy-reactive nucleophilic compound may include a nucleophilic functional group which may produce a nucleophilic carbanion, e.g., a carbonyl-containing compound, such as an enolate.

In many embodiments, an epoxidized triglyceride composition may include the epoxidized triglyceride. The epoxidized triglyceride composition may be characterized by a percentage by weight of the epoxidized triglyceride of at least about one or more of: 50, 60, 70, 8, 90, 95, 96, 97, 98, 99, 99.5, and 99.9. The epoxidized triglyceride composition may consist essentially of, or consist of, the epoxidized triglyceride. The epoxidized triglyceride composition may include a portion of free glycerol. The epoxidized triglyceride composition may include one or more glycerol monoesters, diesters, and triesters. Each ester group in the one or more glycerol monoesters, diesters, and triesters may correspond to one of a saturated fatty acid, an unsaturated fatty acid, and an epoxidized fatty acid. The epoxidized triglyceride composition may consist essentially of, or consist of, the glycerol monoesters, diesters, and triesters; the glycerol diesters and triesters; or the glycerol triesters. For example, the epoxidized triglyceride composition may consist essentially of the epoxidized triglyceride, with small amounts of glycerol or glycerol monoesters, diesters, and triesters including saturated fatty acid groups and unsaturated fatty acid groups.

As used herein, a saturated fatty acid means a carboxylic acid with a $C_1$-$C_{26}$ alkyl group, e.g., decanoic acid ($C_9$ chain), dodecanoic acid ($C_{11}$ chain), and the like. As used herein, an unsaturated fatty acid means a carboxylic acid with a $C_1$-$C_{26}$ alkenyl group including at least one carbon-carbon double bond, e.g., 2-decenoic acid, 2-dodecenoic acid, and the like. As used herein, an epoxidized fatty acid is a carboxylic acid with a $C_1$-$C_{26}$ alkyl group including at least one epoxide group. The epoxidized fatty acid may correspond to the unsaturated fatty acid wherein the at least carbon-carbon double bond may be epoxidized. The saturated fatty acid groups, unsaturated fatty acid groups, and epoxidized fatty acid groups may be optionally substituted. e.g., with one or more hydroxyl substituents.

In various embodiments of the method, the epoxidized triglyceride composition may include a compound represented by Formula I:

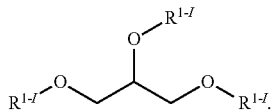

Each $R^{1-I}$ may independently be H,

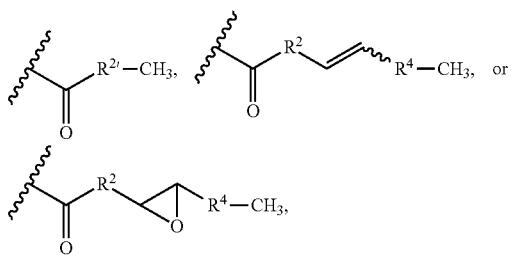

provided that at least one $R^{1-I}$ may be:

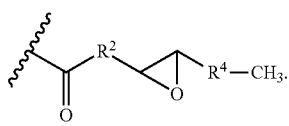

$R^2$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^4$ may be a bond, optionally hydroxylated $C_1$-$C_{25}$ alkyl, optionally hydroxylated $C_2$-$C_{25}$ alkenyl or optionally hydroxylated $C_2$-$C_{25}$ epoxyalkyl.

In several embodiments, the epoxidized triglyceride composition may include a hydroxyl value in mg KOH/g of one or more of about: 5, 10, 15, 20, 25, 50, 75, 100, 250, 500, 750, 1000, 1250, 1500, 1750, and 1800; or a range between any two of the preceding values, for example, between about 5 and about 1800. The epoxidized triglyceride composition may include a number of epoxide functional groups per triglyceride of one or more of about: 1, 2, 3, 4, 5, 6, 7, or 8, or a range between any two of the preceding values, for example, between about 2 and about 8.

In various embodiments, the epoxidized triglyceride composition may be derived by epoxidation of an unsaturated fatty acid triglyceride ester obtained from any organism, including, for example, plants, mammals, reptiles, insects, fish, mollusks, crustaceans, fungi, algae, diatoms, and the like. In some embodiments, the epoxidized triglyceride composition may exclude those derived from insects or marine, non-terrestrial plant and animal sources, e.g., marine plants (e.g., water hyacinth), marine mammals, marine reptiles, fish, mollusks, crustaceans, marine microorganisms (e.g., fungi, bacteria, algae, diatoms), and the like, or in some embodiments, the epoxidized triglyceride composition may exclude those derived from insects or marine sources such as marine plants (e.g., water hyacinth), marine mammals, marine reptiles, fish, mollusks, crustaceans, marine microorganisms (e.g., fungi, bacteria, algae, diatoms), and the like. The epoxidized triglyceride composition may include epoxidized chains of fatty acid esters derived from one or more of: linolenic acid, linoleic acid, oleic acid, myristoleic acid, palmitoleic acid, sapienic acid, elaidic acid, vaccenic acid, linoelaidic acid, α-linolenic acid, arachidonic acid, eicosapentanenoic acid, erucic acid, docsahexaenoic acid, ricinoleic acid, and the like. The epoxidized triglyceride composition may include epoxidized chains of fatty acid esters derived from one or more of: coconut oil, palm kernel oil, palm oil, cottonseed oil, wheat germ oil, soybean oil, olive oil, corn oil, sunflower oil, safflower oil, hemp oil, canola/rapeseed oil, castor oil, and the like. The epoxidized triglyceride composition may include epoxidized chains of fatty acid esters derived from oil of one or more of: legume seeds, non-legume seeds, and animal fat. In some embodiments, animal fat includes terrestrial animals and excludes marine animals. The epoxidized triglyceride composition may include epoxidized chains of fatty acid esters derived from soybean oil.

In several embodiments, the epoxidized triglyceride composition may include a compound represented by Formula II:

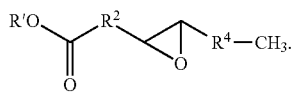

R' may be $C_1$-$C_4$ alkyl. $R^2$ may be optionally hydroxylated $C_2$-$C_{25}$ alkyl or optionally hydroxylated $C_2$-$C_{25}$ alkenyl. $R^4$ may be a bond, or optionally hydroxylated $C_1$-$C_{25}$ alkyl, $C_2$-$C_{25}$ alkenyl, or $C_2$-$C_{25}$ epoxyalkyl.

In some embodiments, the epoxidized triglyceride composition may be one of at least partially: hydrogenated, hydroxylated, and hydrolyzed. The epoxidized triglyceride composition may be characterized by a percentage by weight of epoxidized triglyceride of at least about one or more of: 50, 60, 70, 80, 90, 95, 96, 97, 98, 99, 99.5, and 99.9. The β-ketoacid may be represented by Formula III:

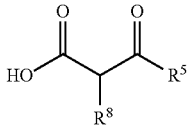

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^8$ may be H, optionally hydroxylated $C_1$-$C_8$ alkyl, or optionally hydroxylated $C_6$-$C_{10}$ aryl.

In many embodiments, the β-ketoacid may include one or more of: 3-oxobutanoic acid, 3-oxopentanoic acid, 3-oxohexanoic acid, 3-oxo-3-phenylpropanoic acid, and the like.

In several embodiments, the method may include contacting the epoxidized triglyceride composition and the epoxy-reactive nucleophilic compound, e.g., the β-ketoacid, in the presence of an acid catalyst. The acid catalyst may include one or more of: p-toluene sulfonic acid; methane sulfonic acid, a $C_1$-$C_8$ carboxylic acid; a $C_1$-$C_8$ halocarboxylic acid, e.g., trifluoromethane sulfonic acid, chloroacetic acid, dichloroacetic acid, trichloroacetic acid, and the like; a polymeric sulfonic acid resin; boron trifluoride; 9-BBN, and the like. In some embodiments, the method may include contacting the epoxidized triglyceride composition and the epoxy-reactive nucleophilic compound, e.g., the β-ketoacid, in the presence of a base. The base may include one or more of: pyridine, trimethylamine, triethylamine, and the like.

In some embodiments, the method may include heating, e.g., of the epoxidized triglyceride composition and the epoxy-reactive nucleophilic compound, to a temperature in ° C. of at least about one or more of: 30, 40, 50, 60, 70, 80, 90, and 100. The method may include allowing reaction effective to form the triglyceride-AAG composition, e.g., of the epoxidized triglyceride composition and the epoxy-reactive nucleophilic compound or of the intermediate product and the β-ketoacid or β-ketoester, for a period of time in minutes of at least about one or more of: 5, 10, 15, 20, 30, 40, 6, 90, 120, 150, 170, and 200.

In several embodiments, the triglyceride-AAG composition may include a triglyceride-AAG. The triglyceride-AAG may include a fatty acid ester; at least one hydroxyl group bonded to an alkyl chain of the fatty acid ester; and a β-ketoester group bonded to a carbon atom alpha to a carbon atom bearing the hydroxyl group. For example, the triglyceride-AAG composition may include a compound represented by Formula IV:

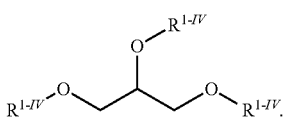

Each $R^{1-IV}$ may independently be H,

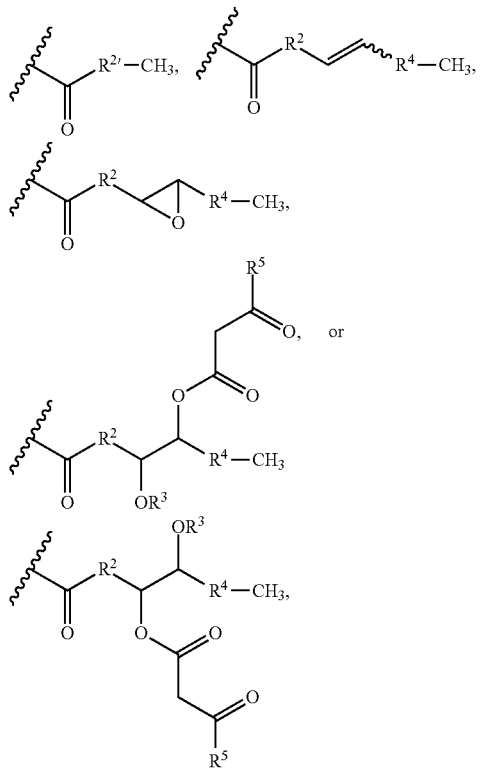

provided that at least one $R^{1-IV}$ is not H, or alternatively, provided that at least one $R^{1-IV}$ may be:

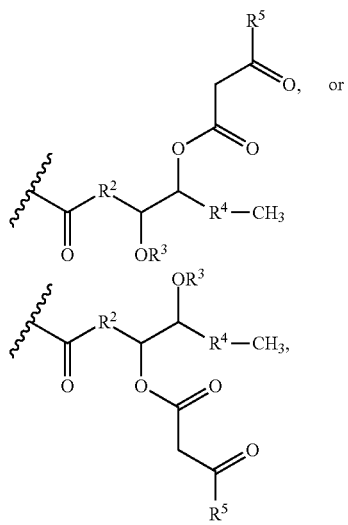

$R^2$ may be optionally hydroxylated $C_2$-$C_{25}$ alkyl or optionally hydroxylated $C_2$-$C_{25}$ alkenyl. $R^3$ may be H or:

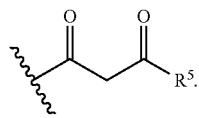

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl.

In many embodiments, the epoxy-reactive nucleophilic compound may be substituted with an AAG group, i.e., an AAG-substituted epoxy-reactive nucleophile. For example, the AAG-substituted epoxy-reactive nucleophile may include an AAG-substituted hydroxy acid in some embodiments, the AAG-substituted epoxy-reactive nucleophilic compound may include one or more of: dimethylol propionic acid, lactic acid, citric acid, tartaric acid, diphenolic acid, and the like. At least one hydroxyl group of one or more of: dimethylol propionic acid, lactic acid, citric acid, tartaric acid, diphenolic acid, and the like, may be substituted with an AAG group. For example, an AAG-substituted epoxy-reactive nucleophile including, for example, lactic acid, may be represented by:

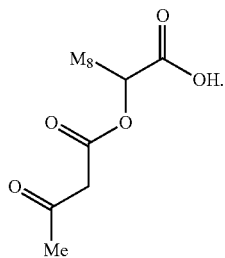

In many embodiments, the triglyceride-AAG composition may include a compound represented by:

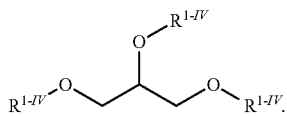

Each $R^{1-IV}$ may independently be H,

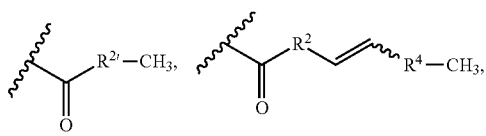

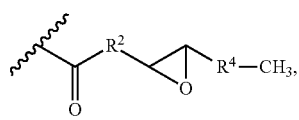

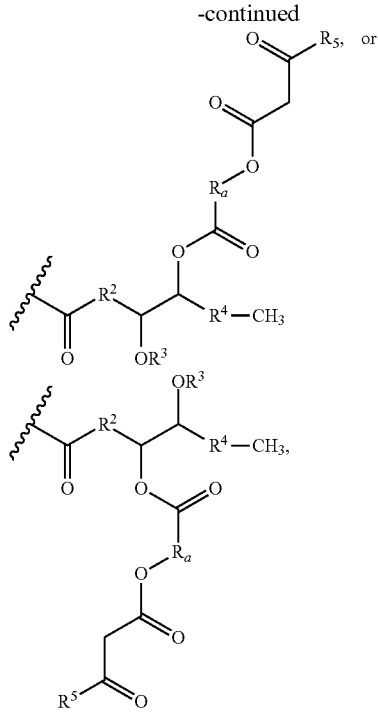

provided that at least one $R^{1-IV}$ may be:

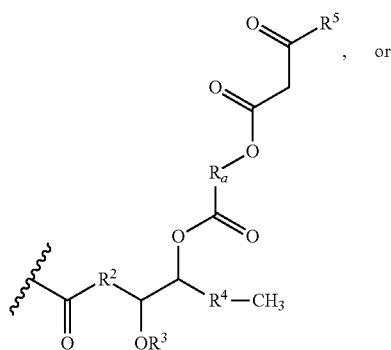

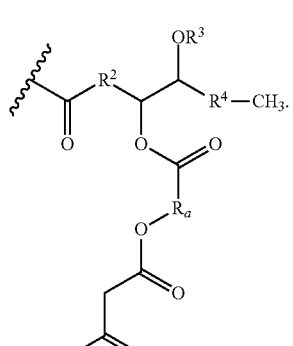

$R^2$ may be optionally hydroxylated $C_2$-$C_{25}$ alkyl or $C_2$-$C_{25}$ alkenyl. $R^3$ may be H, or:

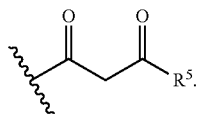

$R^4$ may be a bond, or optionally hydroxylated $C_1$-$C_{25}$ alkyl, $C_2$-$C_{25}$ alkenyl, or $C_2$-$C_{25}$ epoxyalkyl. $R_a$ may be $C_1$-$C_6$ alkyl, branched alkyl, carboxy-substituted alkyl, aryl, or aralkyl. $R^5$ may be optionally hydroxylated $C_1$-$C_8$alkyl, $C_2$-$C_8$ alkenyl, $C_6$-$C_{10}$ aryl, or $C_4$-$C_{10}$ heteroaryl.

In many embodiments, the AAG-unsubstituted epoxy-reactive nucleophile compound may be represented by:

X—$R_b$—Y

X may be —OH, —SH, —NH$_2$, or —NHR$_f$. $R_f$ may be optionally hydroxylated $C_1$-$C_6$alkyl, Y may be —OH, —SH, —NH$_2$, or —NHR$_f$. $R_b$ may be optionally substituted $C_1$-$C_6$ alkyl, or aryl.

In some embodiments, the epoxy-reactive nucleophilic compound may include one or more of: an alkanolamine, e.g., a mono $C_1$-$C_8$ alkanolamine, a di $C_1$-$C_8$ alkanolamine, and the like; a mercaptoalkanol, e.g., a $C_1$-$C_8$ mercaptoalkanol; a diol, e.g., a $C_1$-$C_8$ diol; a hydroxyphenol, an aminophenol, a mercaptophenol, and the like. For example, the epoxy-reactive nucleophilic compound may include one or more of: ethanolamine, diethanolamine, mercaptoethanol, ethylene glycol, propylene glycol, ethylenediamine, ethane-1,2-dithiol, pyrogallol, catechol, resorcinol, hydroquinone, lignin, and the like.

The intermediate product may be represented by:

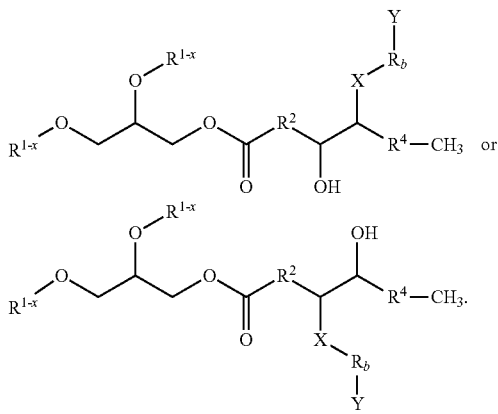

$R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, $C_2$-$C_{25}$ alkenyl, or $C_2$-$C_{25}$ epoxyalkyl. $R_b$ may be optionally carboxylated C1-C6 alkyl, branched alkyl, or aryl. X is O, S, NH, or N-alkyl. Y is OH, SH, NH$_2$, or NH-alkyl. $R^{1-X}$ may be H,

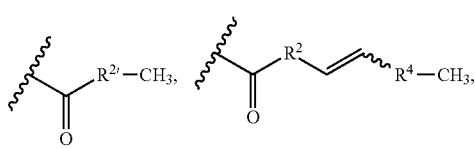

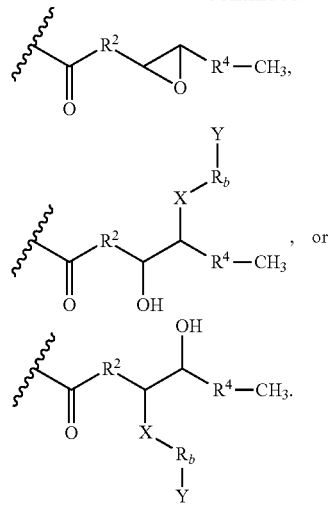

$R^{2'}$ may be optionally hydroxylated $C_2$-$C_{26}$ alkyl.

In some embodiments, the method may include reacting the intermediate product with a β-ketoester to form the triglyceride-AAG composition. The β-ketoester may be represented by:

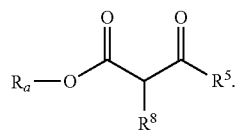

$R_e$ may be $C_1$-$C_4$ alkyl. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl. $R^8$ may be H, or optionally hydroxylated $C_1$-$C_8$ alkyl or $C_6$-$C_{10}$ aryl.

In many embodiments, the method may include allowing the epoxidized triglyceride composition to react with the AAG-unsubstituted epoxy-reactive nucleophilic compound effective to form the intermediate product. The method may include reacting the intermediate product with the β-ketoacid or the β-ketoester effective to form the triglyceride-AAG composition.

In several embodiments, the triglyceride-AAG composition may include a compound represented by:

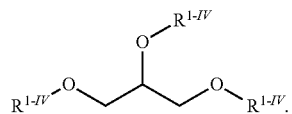

Each $R^{1-IV}$ may independently be H,

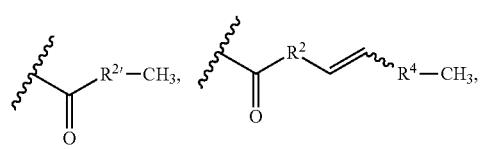

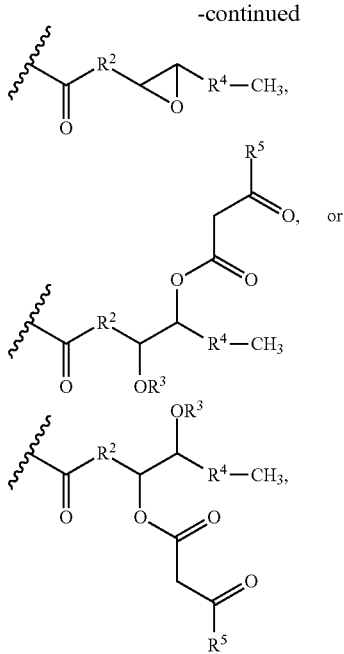

provided that at least one $R^{1-IV}$ may be:

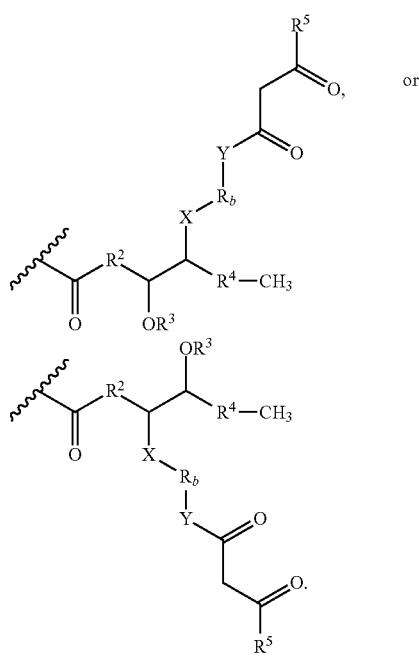

$R^2$ may be optionally hydroxylated $C_2$-$C_{25}$ alkyl or $C_2$-$C_{25}$ alkenyl. $R^3$ may be H, or:

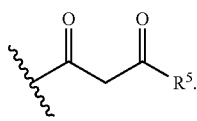

$R^4$ may be a bond, or optionally hydroxylated $C_1$-$C_{25}$ alkyl, $C_2$-$C_{25}$ alkenyl, or $C_2$-$C_{25}$ epoxyalkyl. $R_b$ may be $C_1$-$C_6$ alkyl, branched alkyl, or aryl, $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl. X may be O, S, NH, or $NR_f$. Y may be O, S, NH, or $NR_f$. $R_f$ ma be optionally hydroxylated $C_1$-$C_6$ alkyl.

In some embodiments, the triglyceride-AAG composition may include a hydroxyl value in mg KOH/g of one or more of about: 5, 10, 15, 20, 25, 50, 75, 100, 250, 50, 750, 1000, 1250, 1500, 1750, and 1800; or a range between any two of the preceding values, for example, between about 5 and about 1800. For example, the triglyceride-AAG composition may include a hydroxyl value greater than the epoxidized triglyceride composition.

In various embodiments, a method fro preparing a triglyceride-AAG composition is provided. The method may include contacting an unsaturated triglyceride with a peroxo reagent and one or more of: a β-ketoimide, a β-ketoester, and a β-ketoacid to form a reaction mixture. The method may include allowing the unsaturated triglyceride, the peroxo reagent, and one or more of: the β-ketoimide, the β-ketoester, and the β-ketoacid to react effective to form the triglyceride-AAG composition.

In several embodiments, the method may include contacting the unsaturated triglyceride with a peroxo reagent and the β-ketoimide to form the reaction mixture. The method may include allowing the unsaturated triglyceride, the peroxo reagent, and the β-ketoimide to react effective to form the triglyceride-AAG composition.

In some embodiments, the method may include pre-mixing the peroxo reagent and one or more of the β-ketoimide and the β-ketoacid prior to contacting the unsaturated triglyceride. The method may include pre-mixing the peroxo reagent and one or more of the β-ketoimide and the β-ketoacid at a reduced temperature, e.g., less than about 25° C. The method may include pre-mixing the unsaturated triglyceride and one or more of the β-ketoimide and the β-ketoacid prior to contacting the peroxo reagent.

The method may include allowing the unsaturated triglyceride, the peroxo reagent, and one or more of: the β-ketoimide, the β-ketoester, and the β-ketoacid to react at a temperature in ° C. of at least about one or more of: 0, 10, 20, 30.40, 50, 60, 70, 80, 90, and 100. The method may include allowing the unsaturated triglyceride, the peroxo reagent, and one or more of the β-ketoimide, the β-ketoester, and the β-ketoacid to react for a period of time in minutes of at least about one or more of: 5, 10, 15, 20, 30, 40, 60, 90, 120, 150, 170, and 200.

In several embodiments, the method may include, after forming the triglyceride-AAG composition, contacting the reaction mixture with a reducing agent effective to consume at least a portion of remaining peroxo reagent. Suitable reducing reagents may include, for example, sodium sulfite, sodium thiosulfate, and the like. The method may include, after forming the triglyceride-AAG composition, purifying the triglyceride-AAG composition by one or more of contacting the reaction mixture with one of: water, aqueous brine, and aqueous mild acid; separating an aqueous layer from the reaction mixture, contacting the reaction mixture to a chromatography solid phase; eluting the triglyceride-AAG composition from the chromatography solid phase to provide the triglyceride-AAG composition in at least partly purified form.

In various embodiments, the unsaturated triglyceride may be represented by Formula V:

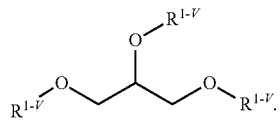

Each $R^{1-V}$ may independently be H, or:

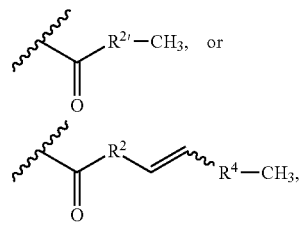

provided that at least one $R^{1-V}$ may be:

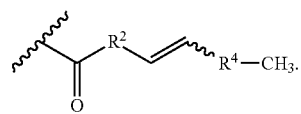

$R^{2'}$ may be optionally-hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^4$ may be a bond, optionally hydroxylated $C_1$-$C_{25}$ alkyl, or optionally hydroxylated $C_2$-$C_{25}$ alkenyl.

In various embodiments, the unsaturated triglyceride may be obtained from any organism, including, for example, plants, mammals, reptiles, insects, fish, mollusks, crustaceans, fungi, algae, diatoms, and the like. In some embodiments, the unsaturated triglyceride may exclude those derived from insects or marine, non-terrestrial plant and animal sources, e.g., marine plants (e.g., water hyacinth), marine mammals, marine reptiles, fish, mollusks, crustaceans, marine microorganisms (e.g., fungi, bacteria, algae, diatoms), and the like, or in some embodiments, the unsaturated triglyceride may exclude those derived from insects or marine sources such as marine plants (e.g., water hyacinth), marine mammals, marine reptiles, fish, mollusks, crustaceans, marine microorganisms (e.g., fungi, bacteria, algae, diatoms), and the like. The unsaturated triglyceride may include an unsaturated fatty acid group derived from one or more of: linolenic acid, linoleic acid, oleic acid, myristoleic acid, palmitoleic acid, sapienic acid, elaidic acid, vaccenic acid, linoelaidic acid. α-linolenic acid, arachidonic acid, eicosapentanenoic acid, erucic acid, docosahexaenic acid, ricinoleic acid, and the like. The unsaturated triglyceride may include an unsaturated fatty acid group derived from one or more of, coconut oil, palm kernel oil, palm oil, cottonseed oil, wheat germ oil, soybean oil, olive oil, corn oil, sunflower oil, safflower oil, hemp oil, canola/rapeseed oil, castor oil, and the like. The unsaturated triglyceride may include an unsaturated fatty acid group derived from oil of one or more of legume seeds, non-legume seeds, animal fat, and the like. In some embodiments, animal fat includes terrestrial mammals and excludes marine mammals. The unsaturated triglyceride may include an unsaturated fatty acid group derived from soybean oil.

In several embodiments, the β-ketoimide may be represented by Formula VI:

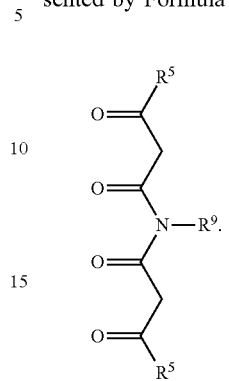

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^9$ may be $C_1$-$C_8$ alkyl or $C_6$ aryl optionally substituted with one or more of: nitro, carbonyl, haloalkyl, and halogen.

As used herein, halogen means fluoro, chloro, bromo, and iodo. Haloalkyls may include, for example, trifluoromethyl, and the like.

In various embodiments, the S-ketoimide may be represented by Formula VII:

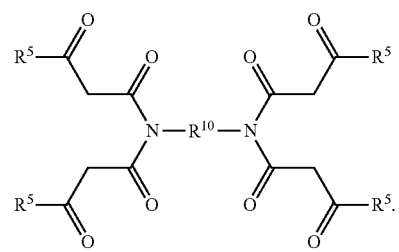

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{10}$ may be $C_2$-$C_6$ alkyl, $C_3$-$C_5$ heteroaryl, or $C_6$ aryl optionally substituted with one or more of: nitro, carbonyl, haloalkyl, and halogen. For example, the β-ketoimide may be represented by Formula VIII:

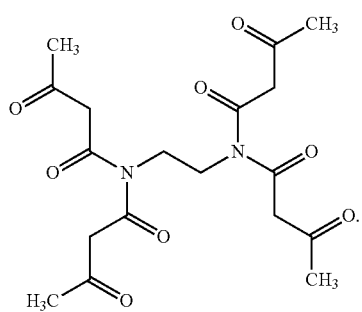

The β-ketoimide may also be represented by Formula IX:

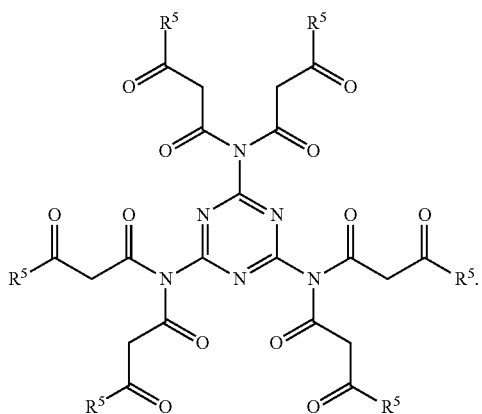

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl.

In some embodiments, the peroxo reagent may be hydrogen peroxide. For example, the peroxo reagent may include one or more of: hydrogen peroxide, manganese dioxide, sodium percarbonate, potassium percarbonate, sodium perborate, potassium perborate, and the like.

In various embodiments, the β-ketoester or β-ketoacid may be represented by:

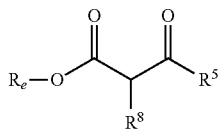

$R_e$ may be H or $C_1$-$C_4$ alkyl; $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl, and $R^8$ may be H, or optionally hydroxylated $C_1$-$C_8$ alkyl or $C_6$-$C_{10}$ aryl.

In many embodiments, the triglyceride-AAG composition may include a triglyceride-AAG. The triglyceride-AAG may include: a fatty acid ester substituted with at least one hydroxyl group on an alkyl chain of the fatty acid ester; and a β-ketoester group bonded to a carbon atom alpha to a carbon atom bearing the hydroxyl group. For example, the triglyceride-AAG composition may include a compound represented by Formula X:

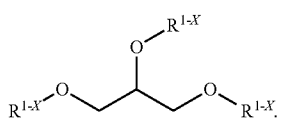

Each $R^{1-X}$ may independently be H,

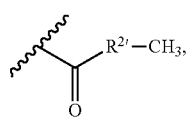

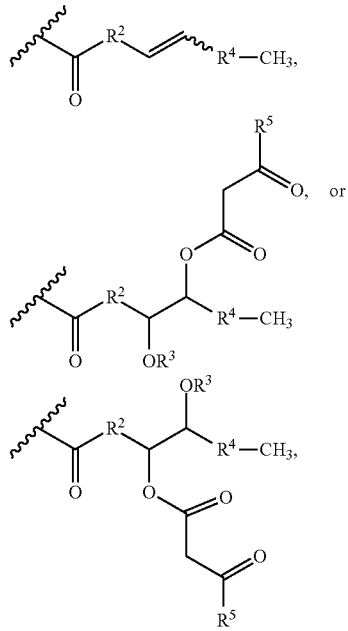

provided that at least one $R^{1-X}$ may be:

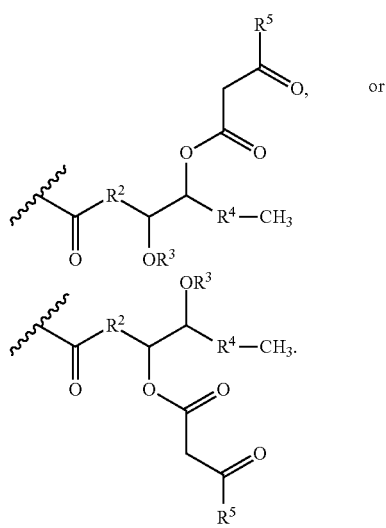

$R^{2'}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

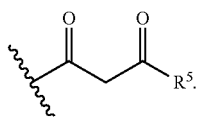

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl.

The triglyceride-AAG composition may include a hydroxyl value in mg KOH/g of one or more of about: 5, 10, 15, 20, 25, 50, 75, 1, 250, 500, 750, 1000, 1250, 1500, 1750, and 1800; or a range between any two of the preceding values, for example, between about 5 and about 1800. For example, the triglyceride-AAG composition may include a hydroxyl value greater than the unsaturated triglyceride.

In various embodiments, a method for preparing a triglyceride-AAG composition is provided. The method may include contacting an unsaturated triglyceride with a mercaptoalkanol in the presence of an initiator to form a first reaction mixture. The method may include allowing the unsaturated triglyceride and the mercaptoalkanol to react effective to provide a mercaptoalkanol-substituted triglyceride. The method may include contacting the mercaptoalkanol-substituted triglyceride with one or more of: β-ketoester and a β-ketoacid to form a second reaction mixture. The method may include allowing the mercaptoalkanol-substituted triglyceride and one or more of the β-ketoester and the β-ketoacid to react effective to provide the triglyceride-AAG composition.

In many embodiments, the initiator may include one or more of: heat, ultraviolet light, and a catalyst. For example, the initiator may include a ultraviolet light and a catalyst. For example, the initiator may include heat and a catalyst. For example, the catalyst may include. $Ru(bpy)_3Cl_2$.

In many embodiments, the unsaturated triglyceride may be represented

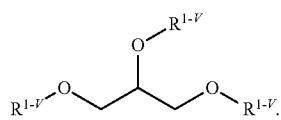

Each $R^{1-V}$ independently may be H,

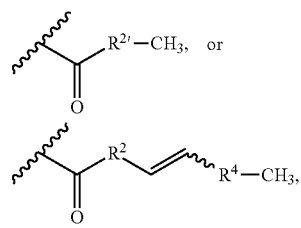

provided that at least one $R^{1-V}$ may be:

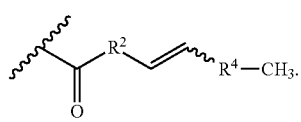

$R^{2\prime}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, or $C_2$-$C_{25}$ alkenyl.

In some embodiments, the mercaptoalkanol may be, e.g., a $C_1$-$C_8$ mercaptoalkanol, for example, the mercaptoalkanol may include one or more of: thioglycerol and mercaptoethanol, and the like.

In many embodiments, the mercaptoalkanol-substituted triglyceride may be represented by:

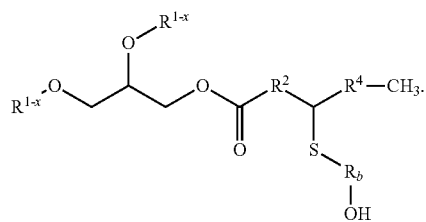

$R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, or $C_2$-$C_{25}$ alkenyl. $R_b$ may be optionally carboxylated C1-C6 alkyl, branched alkyl, or aryl. $R^{1-X}$ may be H,

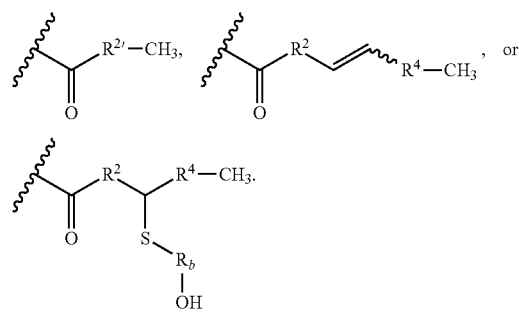

$R^{2\prime}$ may be optionally hydroxylated $C_2$-$C_{26}$ alkyl.

In many embodiments, the β-ketoacid or β-ketoester may be represented by:

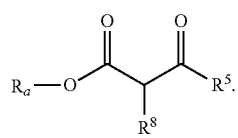

$R_a$ may be H or $C_1$-$C_4$ alkyl. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl. $R^8$ may be H, or optionally hydroxylated $C_1$-$C_8$ alkyl or $C_6$-$C_{10}$ aryl.

In several embodiments, the triglyceride-AAG composition may include a compound represented by:

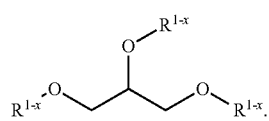

Each $R^{1-X}$ independently may be H,

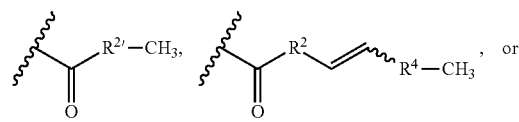

-continued

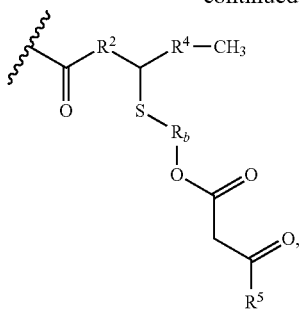

provided that at least one $R^{1-X}$ may be:

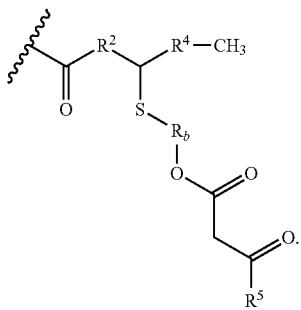

$R^{2'}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, or $C_2$-$C_{25}$ alkenyl. $R_b$ may be $C_1$-$C_6$ alkyl, branched alkyl, or aromatic hydrocarbon. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl.

In various embodiments, a method for preparing a triglyceride-AAG composition is provided. The method may include contacting a hydroxylated triglyceride with a ketene compound to form a reaction mixture. The method may include allowing the hydroxylated triglyceride and ketene compound to react effective to provide the triglyceride-AAG composition.

In several embodiments, the hydroxylated triglyceride may be represented by:

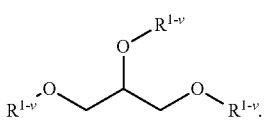

Each $R^{1-V}$ independently may be H,

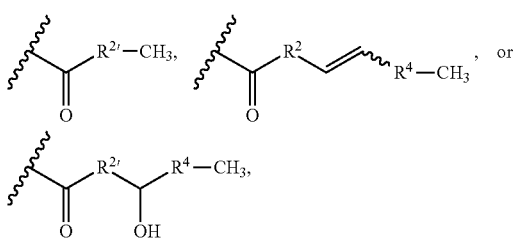

provided that at least one $R^{1-V}$ may be:

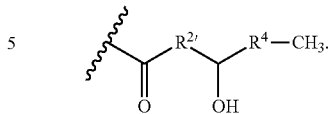

$R^{2'}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, or $C_2$-$C_{25}$ alkenyl.

In many embodiments, the ketene compound may include one or more of: 4-methyleneoxetan-2-one, 4-ethylidene-3-methyloxetan-2-one, and 4-benzylidene-3-phenyloxetane-2-one. In some embodiments, the ketene compound may be derived from one or more of: a diazo ketone and an α-halo acyl halide. The ketene compound may be optionally substituted with one or more of: $C_1$-$C_8$ alkyl and $C_6$-$C_{10}$ aryl.

In several embodiments, the triglyceride-AAG composition may include a compound being represented by.

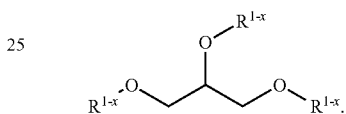

Each $R^{1-X}$ may independently be H,

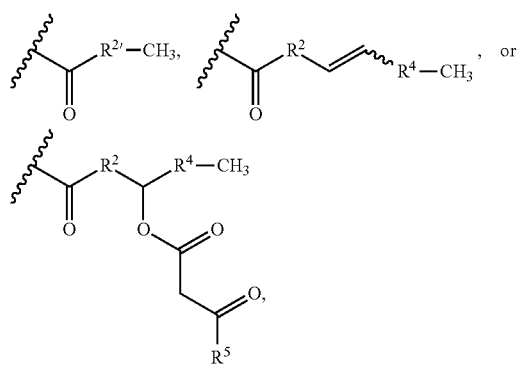

provided that at least one $R^{1-X}$ may be:

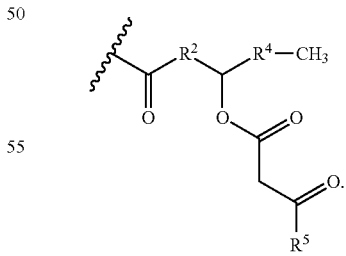

$R^{2'}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, $C_2$-$C_{25}$ alkenyl. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl.

In various embodiments, a triglyceride-AAG composition is provided. The triglyceride-AAG composition may include a fatty acid ester. The triglyceride-AAG composition may include a β-ketoester group bonded to an alkyl chain of the fatty acid ester.

In several embodiments, the triglyceride-AAG composition may include the fatty acid ester. The triglyceride-AAG composition may include at least one hydroxyl group bonded to an alkyl chain of the fatty acid ester. The triglyceride-AAG composition may include β-ketoester group bonded to a carbon atom of the alkyl chain that may be alpha to a carbon atom bearing the hydroxyl group.

In many embodiments, the triglyceride-AAG composition may include a compound represented by:

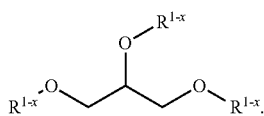

Each $R^{1-x}$ may independently be H,

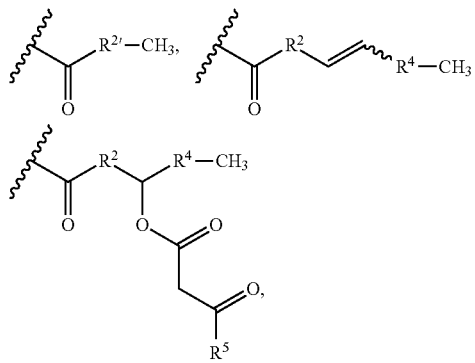

provided that at least one $R^{1-x}$ may be:

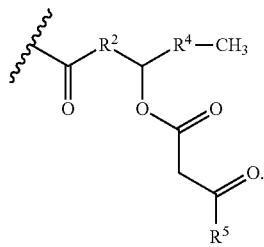

$R^{2\prime}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, $C_2$-$C_{25}$ alkenyl. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl.

In many embodiments, the triglyceride-AAG composition may include a compound represented by Formula X:

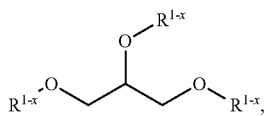

Each $R^{1-x}$ may independently be H,

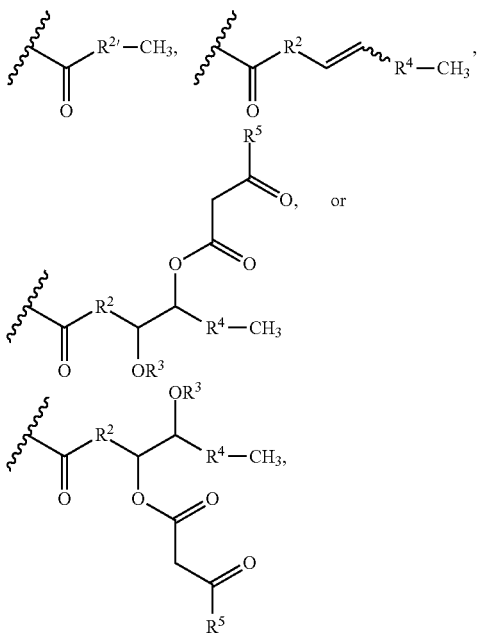

provided that at least one $R^{1-x}$ may be:

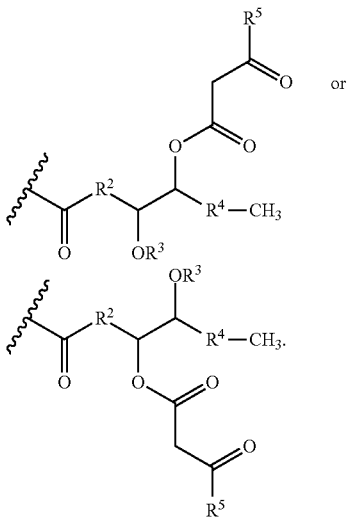

$R^{2\prime}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

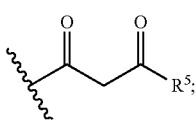

$R^{2\prime}$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl.

In various embodiments, a triglyceride-AAG composition is provided. The triglyceride-AAG composition may include a fatty acid ester. The triglyceride-AAG may include a linking group, the linking group being represented by:

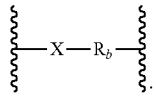

X ma be —OH, —SH, —NH$_2$, or NHR$_f$. R$_b$ may be optionally substituted $C_1$-$C_6$ alkyl or aryl. R$_f$ may be optionally hydroxylated $C_1$-$C_6$ alkyl. The triglyceride-AAG may include a β-ketoester group. The linking group may be bonded to an alkyl chain of the fatty acid ester via X and the β-ketoester group may be bonded via an ester moiety to R.

In several embodiments, the triglyceride-AAG composition may include a compound represented by:

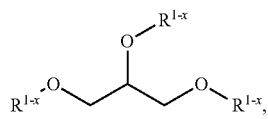

Each $R^{1-X}$ may independently be H,

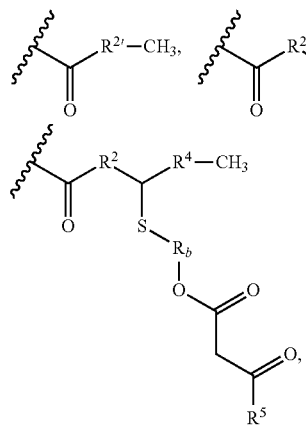

provided that at least one $R^{1-X}$ may be:

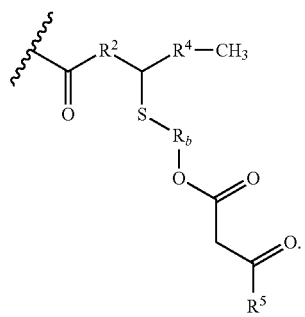

$R^{2'}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^4$ may be a bond, or optionally hydroxylated $C_1$-$C_{25}$ alkyl, or $C_2$-$C_{25}$ alkenyl. $R_b$ may be $C_1$-$C_6$ alkyl, branched alkyl, or aromatic hydrocarbon. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl.

In several embodiments, the triglyceride-AAG may further include at least one hydroxyl group. The at least one hydroxyl group may be bonded to the alkyl chain of the fatty acid ester. The linking group may be bonded to a carbon atom of the alkyl chain that is alpha to a carbon atom bearing the at least one hydroxyl group.

In many embodiments, the triglyceride-AAG composition may include a compound represented by:

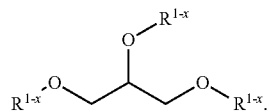

Each $R^{1-X}$ may independently be H,

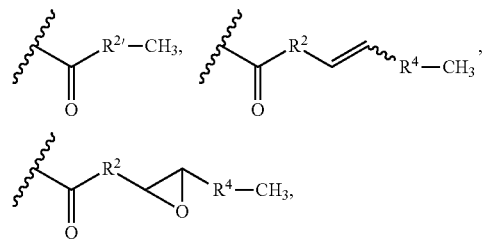

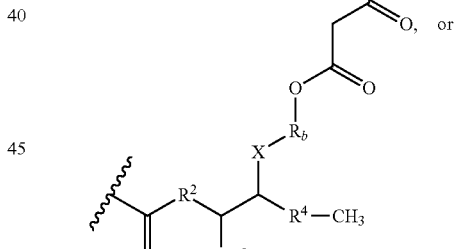

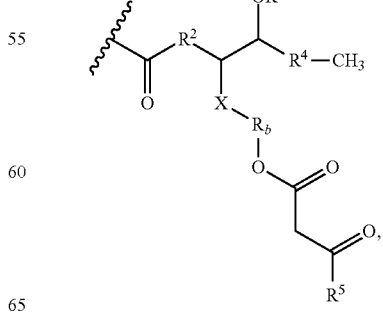

provided that at least one $R^{1-X}$ may be:

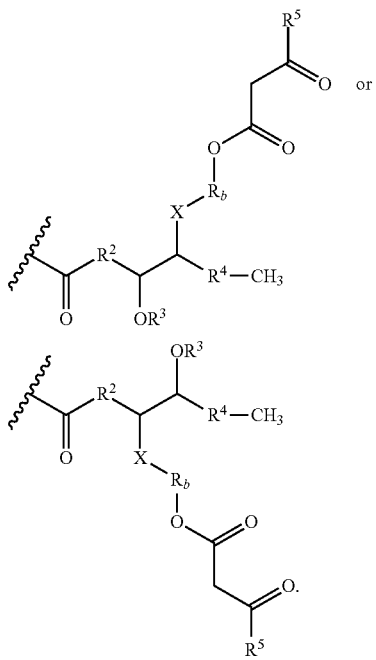

$R^{2'}$ may be optionally hydroxylated $C_2$-$C_{25}$ alkyl. $R^2$ may be optionally hydroxylated $C_2$-$C_{25}$ alkyl or $C_2$-$C_{25}$ alkenyl. $R^3$ may be H, or:

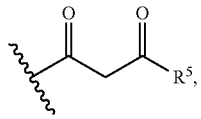

$R^4$ may be a bond, or optionally hydroxylated $C_1$-$C_{25}$ alkyl, $C_2$-$C_{25}$ alkenyl, or $C_2$-$C_{25}$ epoxyalkyl. $R_b$ may be optionally carboxylated $C_1$-$C_6$ alkyl, branched alkyl, or aromatic hydrocarbon. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl. X may be O, S, or N.

In various embodiments, a method for preparing a polytriglyceride-β-ketoester composition is provided. The method may include contacting a triglyceride-AAG composition with a cross-linking compound to form a reaction mixture. The method may include allowing the triglyceride-AAG composition and the cross-linking compound to react effective to form the polytriglyceride-β-ketoester composition.

In many embodiments, the triglyceride-AAG composition may include a compound represented by Formula X:

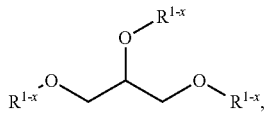

Each $R^{1-X}$ independently may be H,

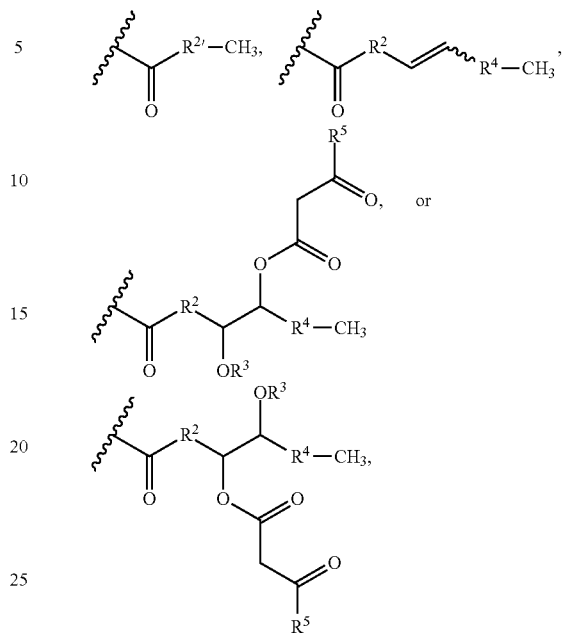

provided that at least one $R^{1-X}$ may be:

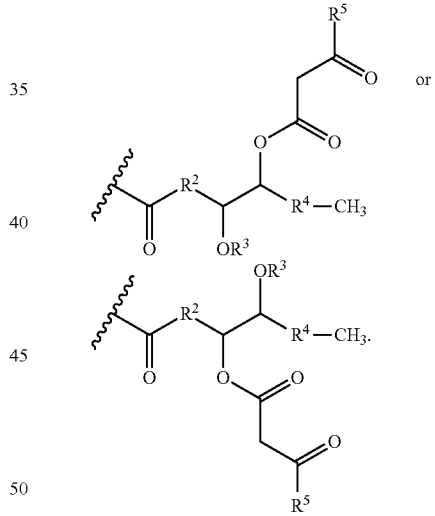

$R^{2'}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

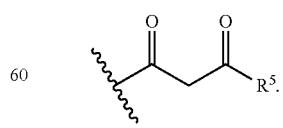

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl.

In some embodiments, the triglyceride-AAG composition may include a fatty acid group derived from oil of one or more of legume seeds, non-legume seeds, and animal fat. The triglyceride-AAG composition may include a fatty acid group derived from soybean oil. The method may include contacting the triglyceride-AAG composition and the cross-linking compound in the presence of a surfactant. The surfactant may include one or more of: tegostab B4690, Silstab 2000, polysiloxane-polyoxyalkylene block copolymer, and the like.

In several embodiments, the method may include contacting the triglyceride-AAG composition and the cross-linking compound neat, e.g., substantially in the absence of organic solvent. The method may include contacting the triglyceride-AAG composition and the cross-linking compound in the presence of an organic solvent, e.g., acetone, methyl ethyl ketone, and the like. The method may include contacting the triglyceride-AAG composition and the cross-linking compound in the presence of one or more of: water; a blowing agent; and a base. The base may include one or more of: magnesium hydroxide, zirconium hydroxide, aluminum hydroxide, and the like.

In some embodiments, the method may include contacting the triglyceride-AAG composition and the cross-linking compound in die presence of a polyol-AAG. The method may include heating the reaction mixture to a temperature in ° C. of at least one or more of: 140, 150, 160, 170, 180 and 200. The method may include allowing the triglyceride-AAG composition and the cross-linking compound to react for a period of time in minutes of at least about one or more of: 5, 10, 15, 20, 30, 40, 60, 90, 120, 150, 170, and 200.

In some embodiments, the method may include: applying the reaction mixture onto a surface; and heating the reaction mixture and the surface effective to form the polytriglyceride-β-ketoester composition as a cross-linked coating on the surface. The method may include contacting the triglyceride-AAG composition and the cross-linking compound at about 25° C. for less than 3 minutes prior to spraying the reaction mixture onto the surface. The method may include heating the reaction mixture and the surface at a temperature of about 180° C. for 20 minutes effective to form the polytriglyceride-β-ketoester composition as the cross-linked coating on the surface. The surface may be a metal surface. The surface may be an interior surface of a food or beverage container, e.g., a can. The surface may include a foil or metal packaging material. The surface may include one or more of: low carbon steel, aluminum, anodized aluminum, silver, and alloys or mixtures thereof. The surface may be one or more of an interior surface or an exterior surface of a medical device. The polytriglyceride-β-ketoester composition may form a cross-linked coating on one or more of the interior surface and the exterior surface of the medical device. Further, silver may be included by one or more of; the interior surface, the exterior surface, and the polytriglyceride-β-ketoester composition forming the cross-linked coating. The silver may be in ionic or oxide form.

In several embodiments, the method may include contacting the triglyceride-AAG composition and the cross-linking compound at about 25° C.; and pouring the reaction mixture into a mold, the mold coated in a mold release agent. The cross-linking compound may include one or more of: a diisocyanate, a triisocyanate, and a tetraisocyanate. The cross-linking compound may include a polymer that includes more than one isocyanate. The cross-linking compound may include one or more of: Luprinate M20, PMDI, Desmodur DA-L Desmodur DN, Bayhydur 302, VESTANAT® T, VESTANAT® HB, VESTANAT® HT, VESTANAT® B, VESTANAT® DS (Evonik Resource Efficiency GmbH. Essen, Germany), and like isocyanate cross-linking reagents.

In some embodiments, the polytriglyceride-β-ketoester composition may include a polytriglyceride polyamido-β-ketoester including a fatty acid ester, a β-ketoester bonded to an alkyl chain of the fatty acid ester; and an amide group bonded to a carbon alpha to a ketone of the β-ketoester. For example, the polytriglyceride polyamido-β-ketoester may be represented by Formula XI:

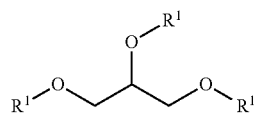

Each $R^{1-XI}$ independently may be H,

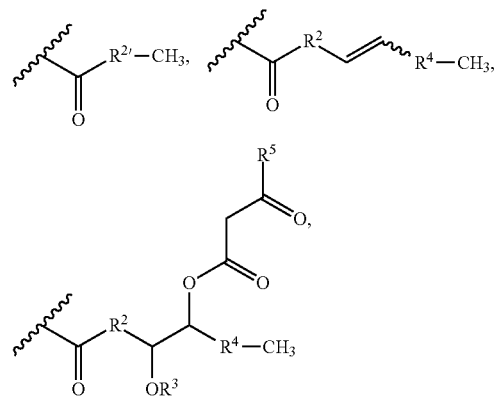

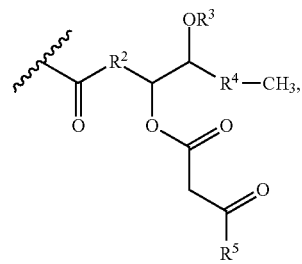

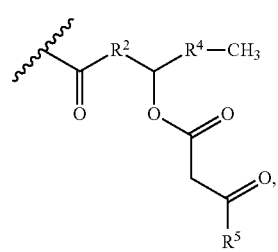

31
-continued
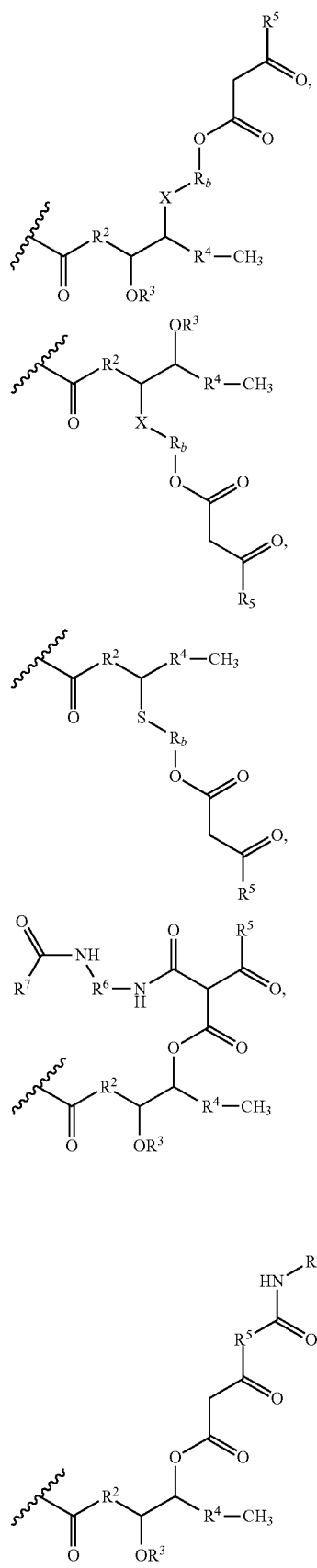
32
-continued
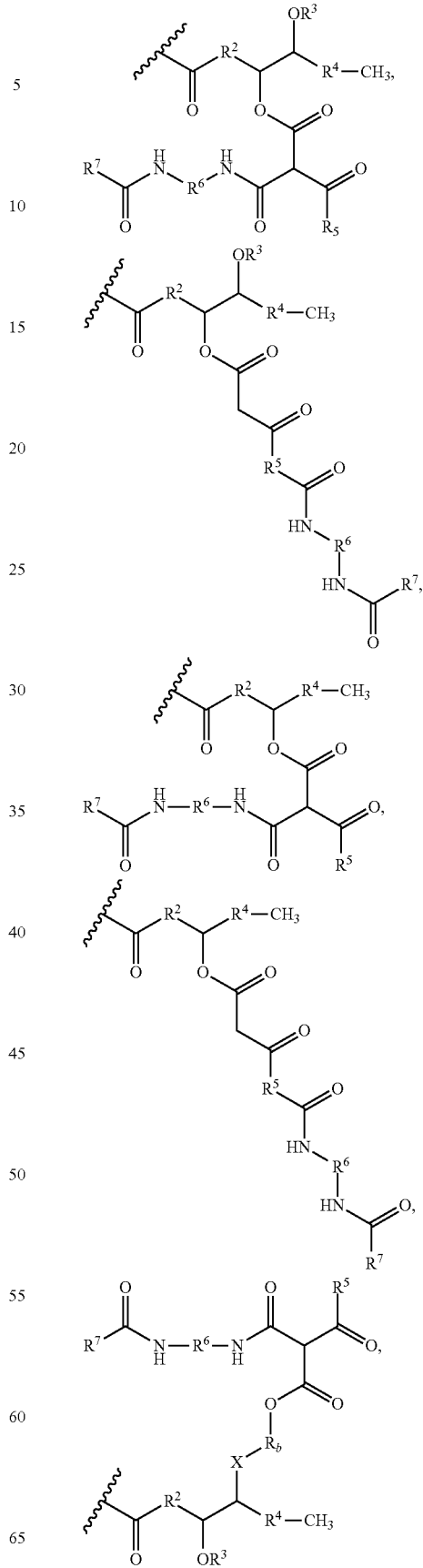

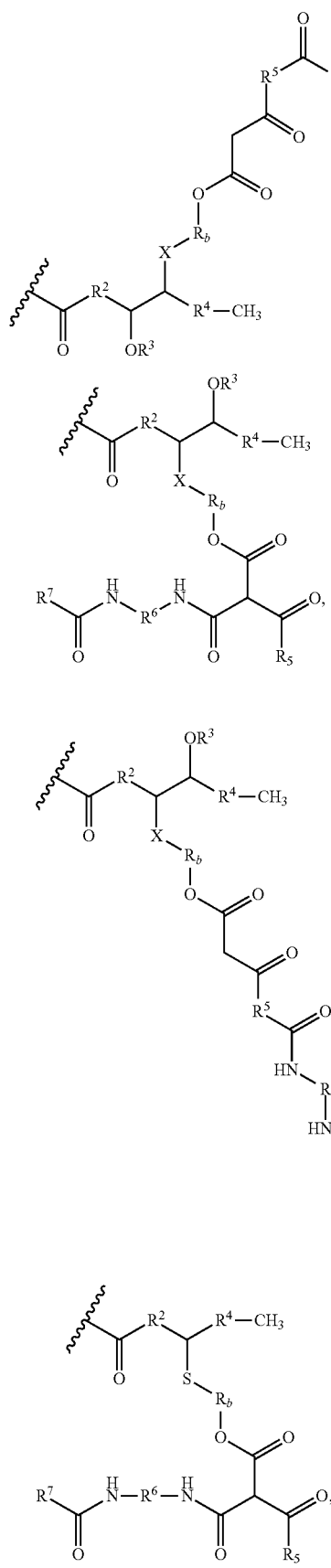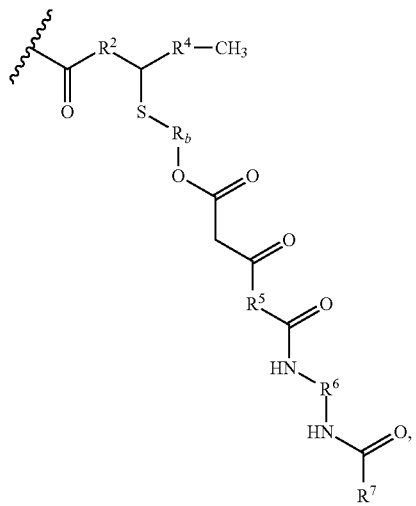
provided that at least one $R^{1-XI}$ may be:
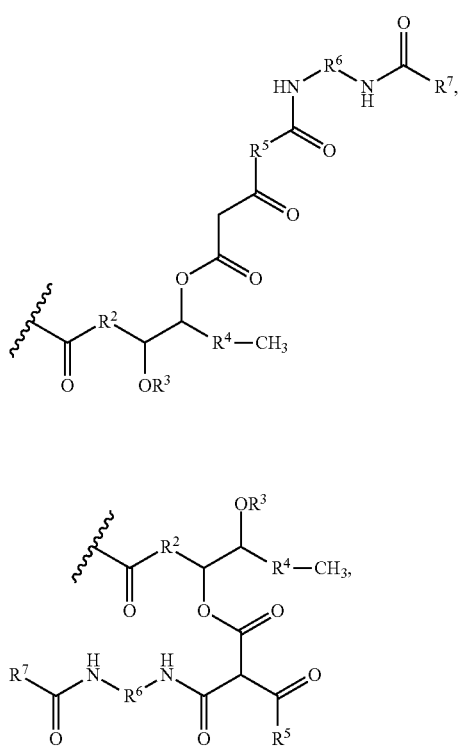

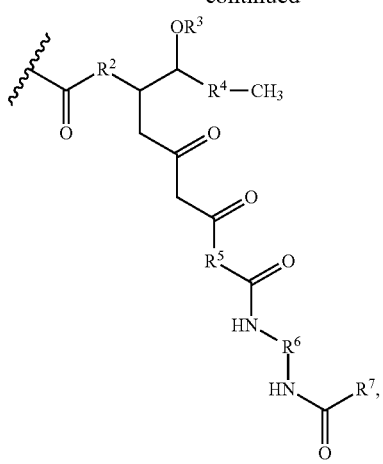
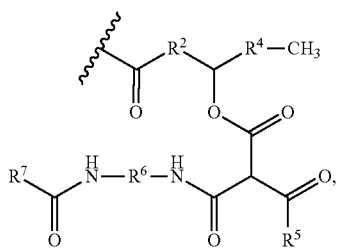
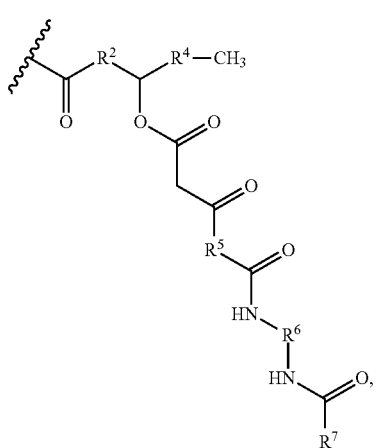
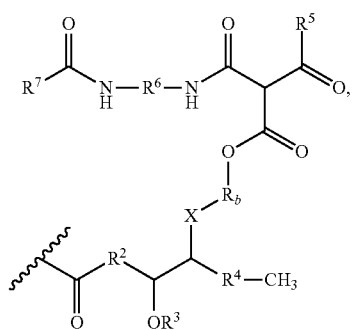
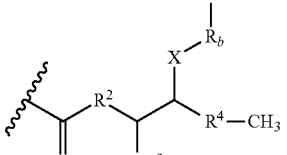
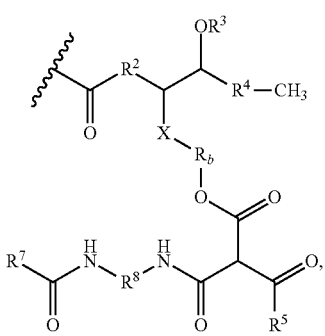
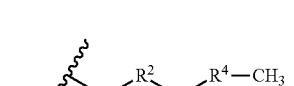

-continued

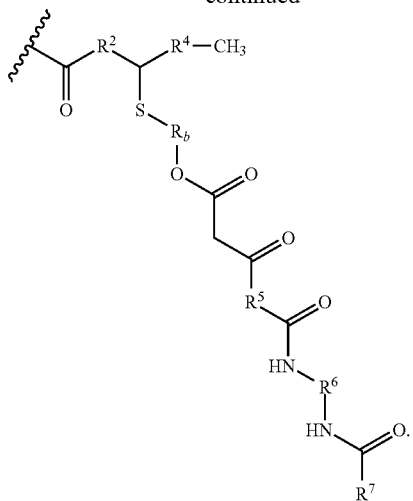

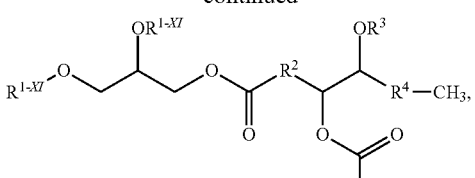

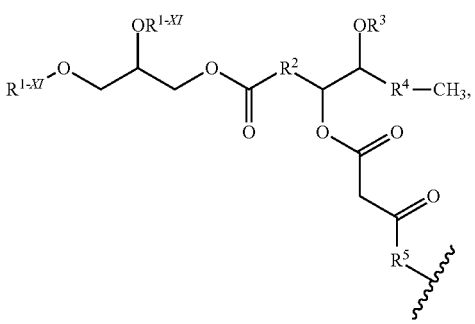

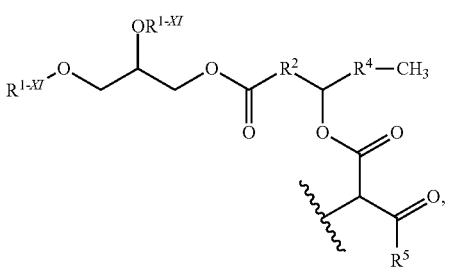

$R^{2\prime}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H or AAG:

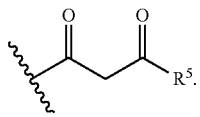

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^6$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R_b$ may be optionally carboxylated $C_1$-$C_6$ alkyl, branched alkyl, or aryl. X may be O, S, or N. $R^7$ may be:

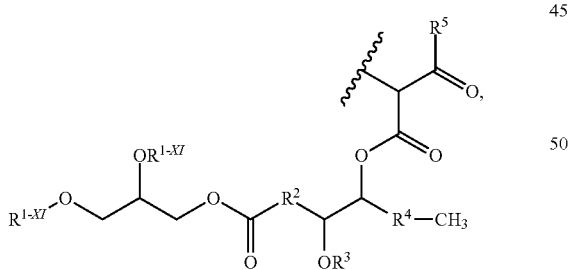

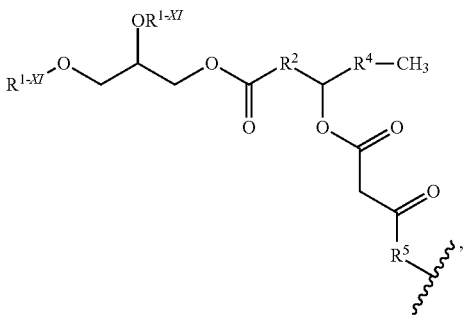

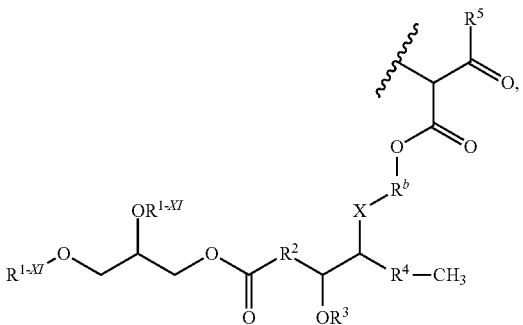

-continued

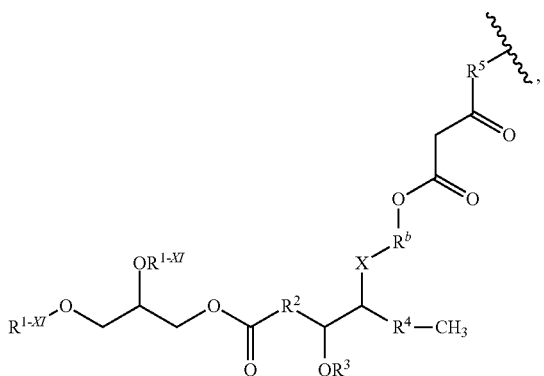

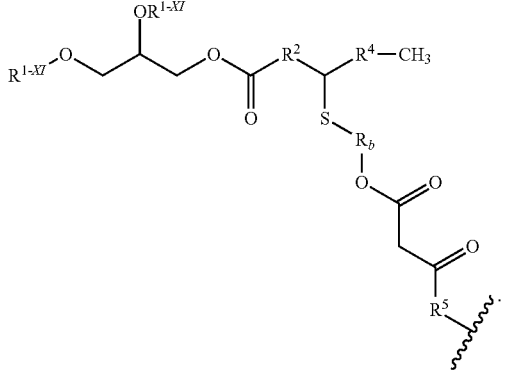

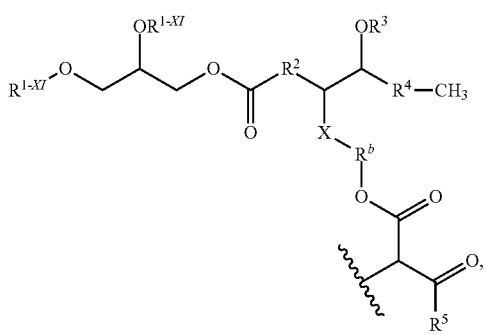

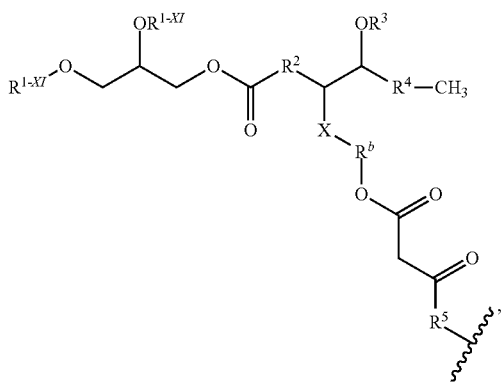

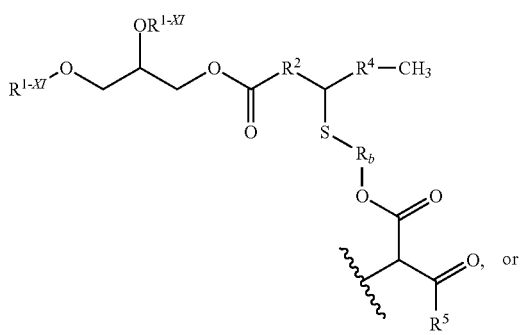

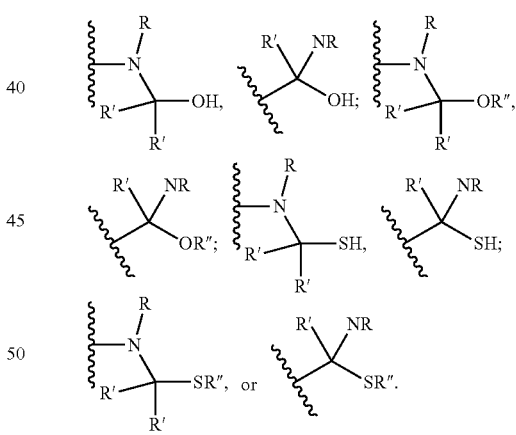

In some embodiments, the polytriglyceride-β-ketoester composition may include a hydroxyl value in mg KOH/g of one or more of about: 5, 10, 15, 20, 25, 5075, 100, 250, 500, 750, 1000, 1250, 1500, 1750, and 1800; or a range between any two of the preceding values, for example, between about 5 and about 1800.

As used herein, a "hemiaminal" may refer to a compound including a —NR(CR$_2$')OH group or —CR'(NR)(OH) group. As used herein, a "hemiaminal ether" may refer to a compound including a —NR(CR$_2$')OR'' group or —CR'(NR (OR'') group. As used herein, a "hemithioaminal" may refer to a compound including a —NR(CR$_2$')SH group or —CR' (NR)(SH) group. As used herein, a "hemiaminal thioether" may refer to a compound include a —NR(CR$_2$')SR'' group or —CR'(NR)(SR''). R, and R' may be H, alkyl, or aryl. R'' may be alkyl or aryl. As used herein used herein, a "hemiaminal". "hemiaminal ether", "hemithioaminal", and "hemiaminal thioether" may be represented by, respectively:

In many embodiments, the cross-linking compound may include one or more of: a hemiaminal, a hemiaminal ether, a hemiaminal thioether an aromatic hemiaminal, an aromatic hemiaminal ether, an aromatic hemiaminal thioether, a polymer including a hemiaminal, a polymer including a hemiaminal ether, a polymer including a hemiaminal thioether, and the like. For example, the cross-linking compound may include hemiaminal cross-linking compounds (e.g., the CYMEL™ series from Allnex USA, Inc., Alpharetta, Ga.) such as one or more of: CYMEL™ 303. CYMEL™ 300, CYMEL™ 301, CYMEL™ 303 LF, CYMEL™ 304, CYMEL™ 350, CYMEL™ 3745, CYMEL™ XW 3106, CYMEL™ MM-100, CYMEL™ 323, CYMEL™ 325, CYMEL™ 327, CYMEL™ 328, CYMEL™ 385, CYMEL™ 370, CYMEL™ 373, CYMEL™ 380, and the like.

In several embodiments, the method may include contacting the triglyceride-AAG composition and the cross-linking compound in the presence of an acid catalyst. The acid catalyst may include one or more of: p-toluene sulfonic acid; methane sulfonic acid; a $C_1$-$C_8$ carboxylic acid; a $C_1$-$C_8$ halocarboxylic acid, e.g., trifluoromethane sulfonic acid, chloroacetic acid, dichloroacetic acid, trichloroacetic acid, and the like; a polymeric sulfonic acid resin; boron trifluoride; and the like. The acid may include a Lewis acid. As used herein, a Lewis acid means an electron-deficient species that may accept electrons from a Lewis base. Suitable Lewis acids may be based on main group metals such as aluminum, boron, silicon, and tin, as well as early (titanium, zirconium) and late (iron, copper, zinc) d-block metals. A suitable Lewis acid may be trimethoxy boron, trimethoxyaluminum, 9-BBN, and the like. For example, methoxide or hydroxide from the hemiaminal or hemiaminal ether would be the Lewis base and result in an eta complex with the Lewis acid.

In several embodiments, the polytriglyceride-β-ketoester may include a triglyceride polyamino-β-ketoester. The triglyceride polyamino-β-ketoester may include a fatty acid ester. The triglyceride polyamino-4-ketoester may include a β-ketoester group bonded to an alkyl chain of the fatty acid ester. The triglyceride polyamino-β-ketoester may include an amine group bonded to the alkyl chain at a carbon beta to a ketone of the β-ketoester. For example, the triglyceride polyamino-β-ketoester may be represented by Formula XII:

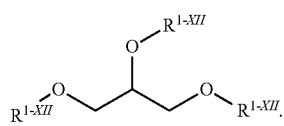

Each $R^{1-XII}$ may independently be H,

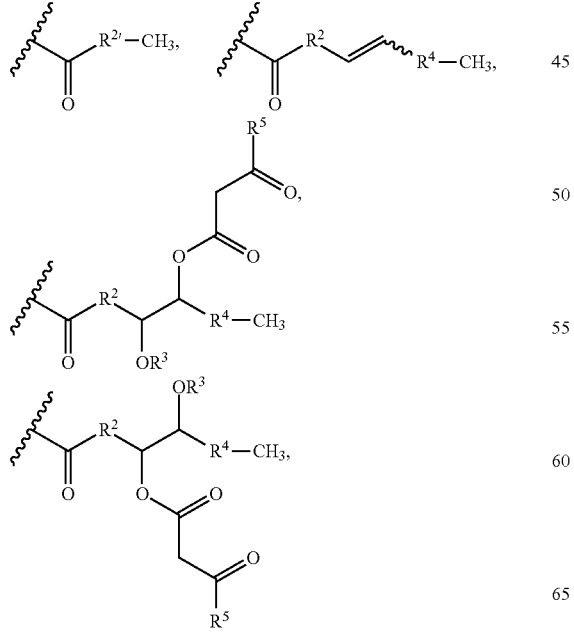

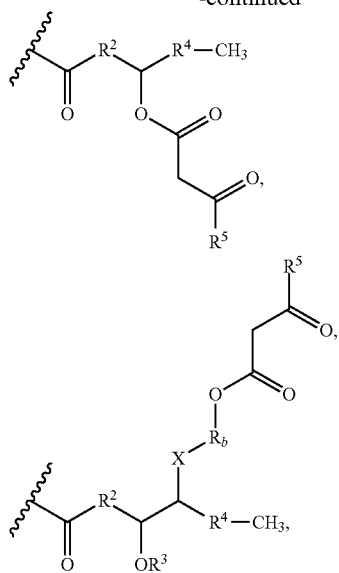

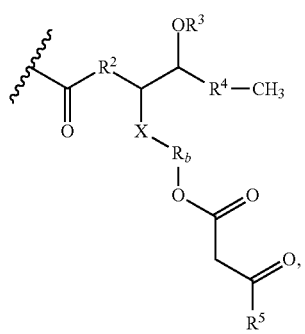

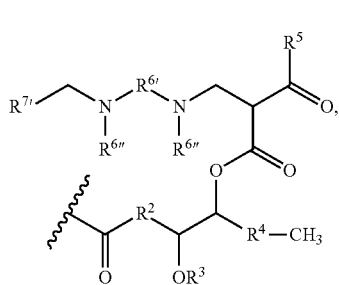

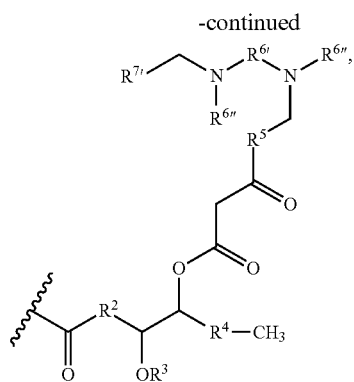
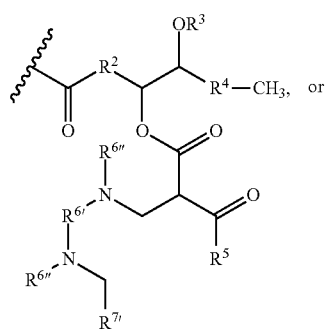
or
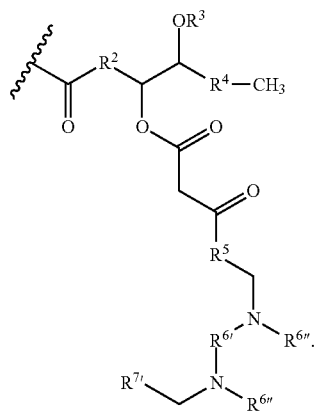
provided that at least one $R^{1\text{-}XII}$ may be:
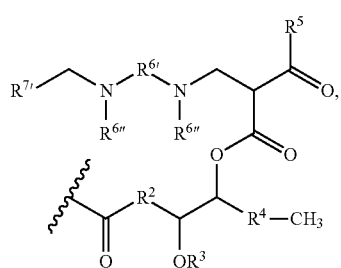
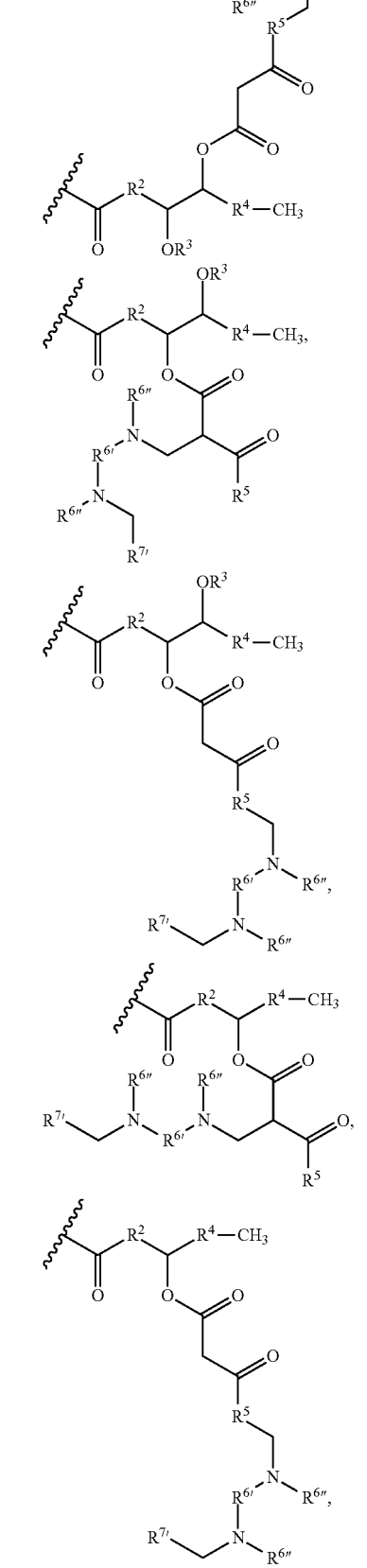

-continued

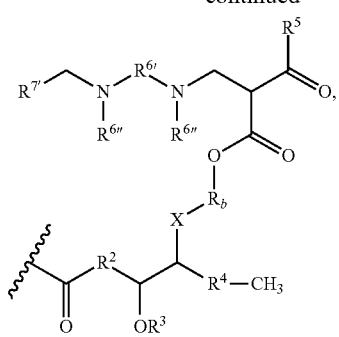

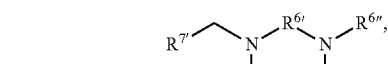

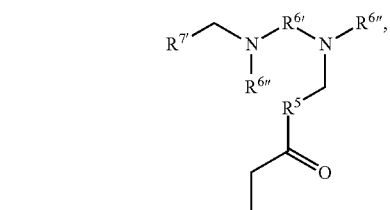

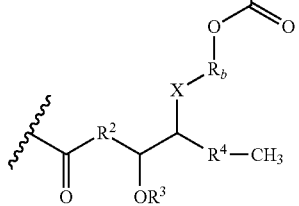

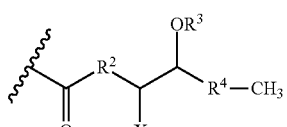

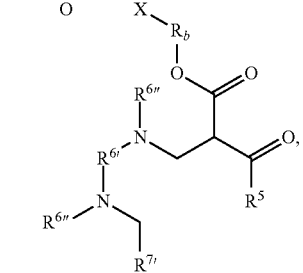

-continued

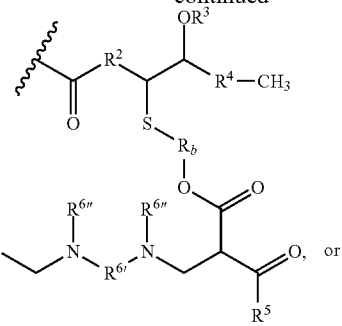

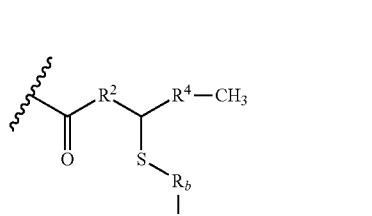

$R^{2\prime}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

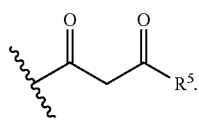

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{6\prime}$ may be optionally hydroxylated $C_2$-$C_6$ alkyl, optionally hydroxylated $C_4$-$C_{10}$ aryl, optionally hydroxylated $C_1$-$C_6$ alkyl-$C_6$-$C_{10}$ aryl, optionally hydroxylated $C_3$-$C_5$ heteroaryl, or optionally hydroxylated $C_1$-$C_6$ alkyl-$C_3$-$C_5$ heteroaryl. $R_b$ may be optionally carboxylated $C_1$-$C_6$ alkyl, branched alkyl, or aryl. X may be O, S, or N. $R^{6\prime}$ may be: $CH_2OH$, $CH-OCH_3$, $CH_2SH$, $CH_2SCH_3$,

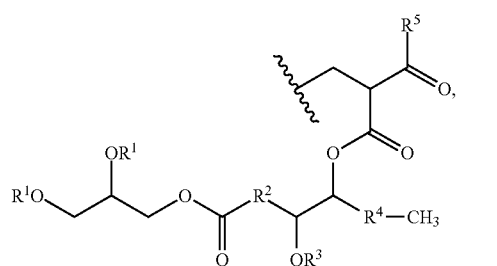
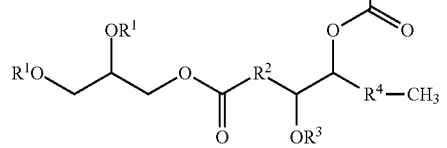
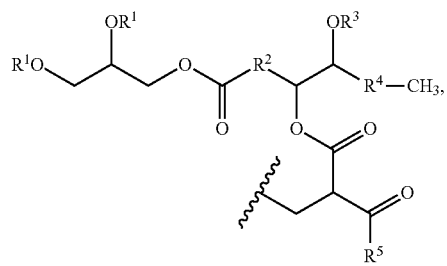
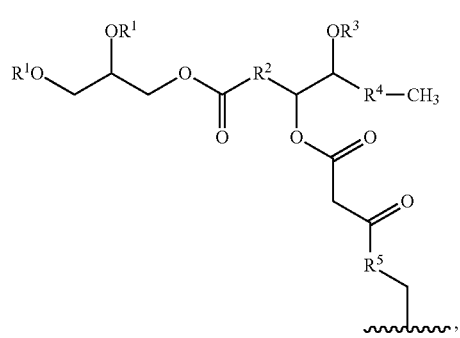
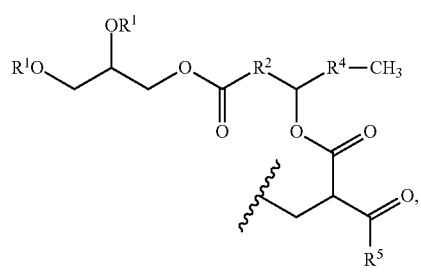
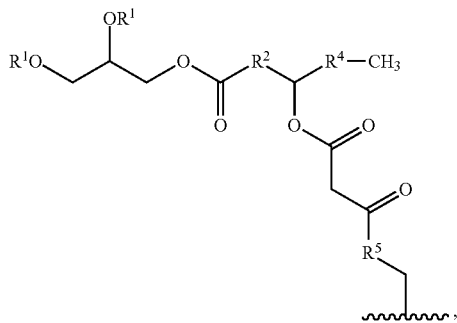
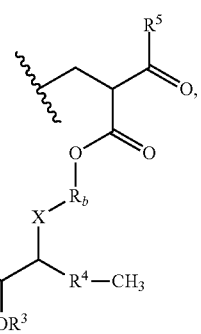
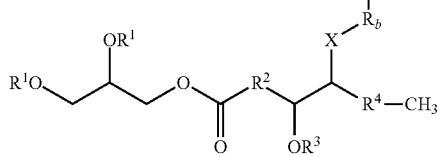
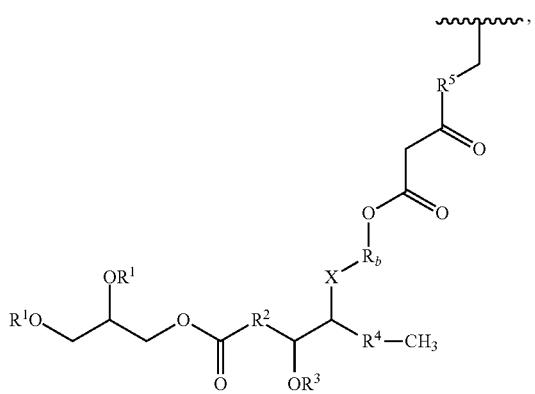
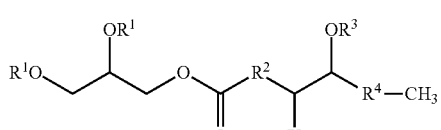
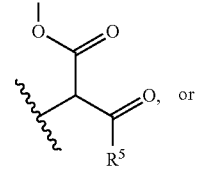

-continued
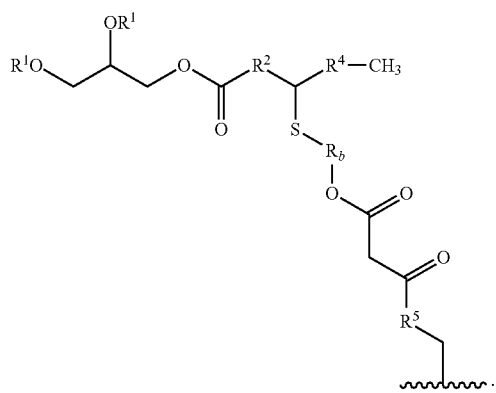
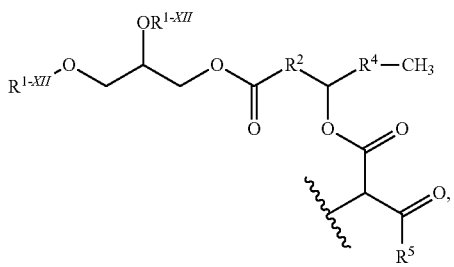
R⁷' may be:
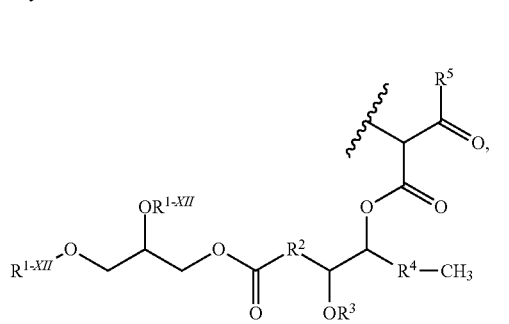
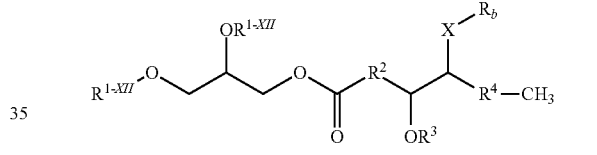
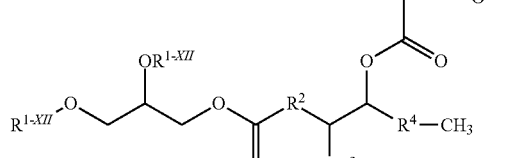
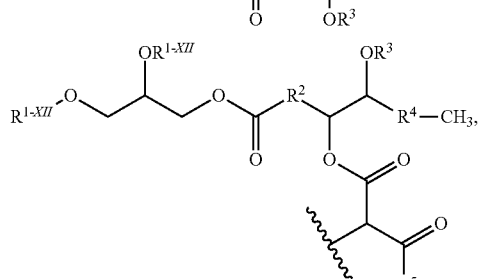
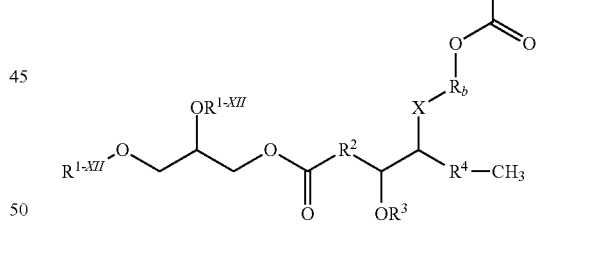
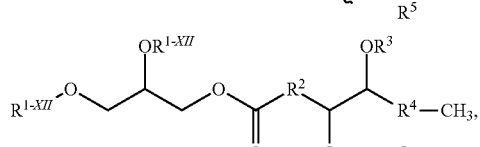
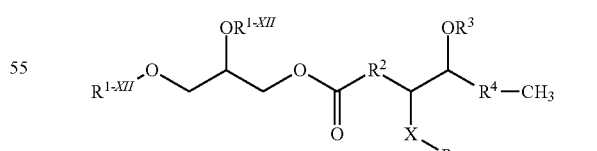
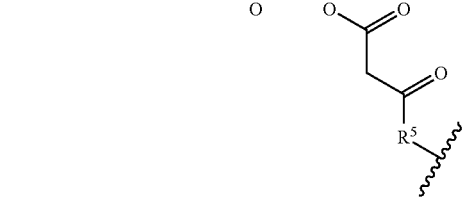

-continued

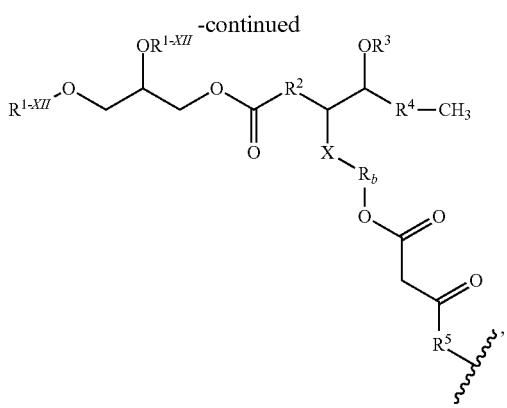

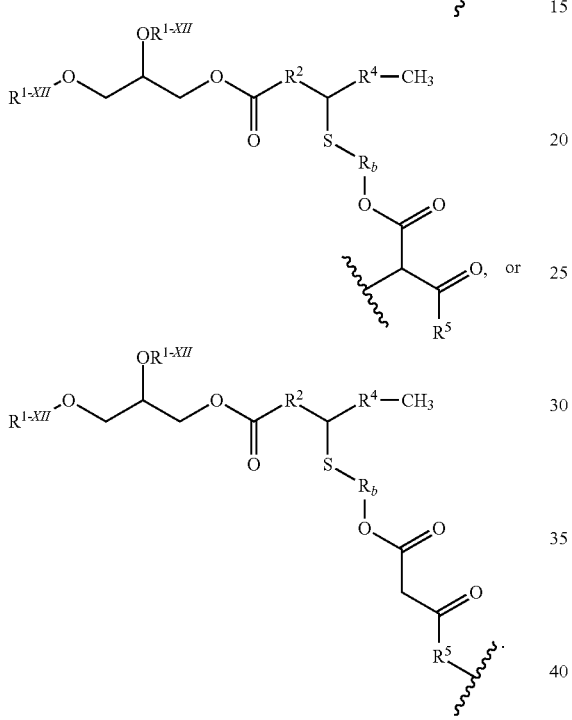

In various embodiments, the cross-linking compound may include a dihydrazine or a dihydrazide. For example, the cross-linking compound may include one or more of: adipic dihydrazide, sebacic dihydrazide, oxalyl dihydrazide, succinic dihydrazide, maleic dihydrazide, malic dihydrazide, isophthalic dihydrazide, terephthalic dihydrazide, and the like.

In some embodiments, the polytriglyceride-β-ketoester may include a triglyceride polyhydrazone-β-ketoester. The triglyceride polyhydrazone-β-ketoester may include a fatty acid ester. The glyceride polyhydrazone-β-ketoester may include a β-ketoester group bonded to an alkyl chain of the fatty acid ester. The triglyceride polyhydrazone-β-ketoester may include a hydrazone group bonded to the keto-carbon of the β-ketoester. For example, the product may be represented by Formula XIII:

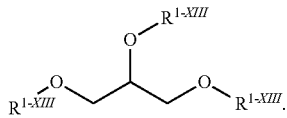

Each $R^{1\text{-}XIII}$ may independently be H,

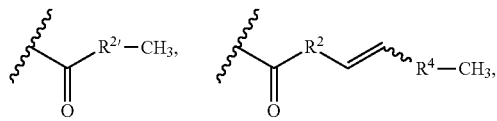

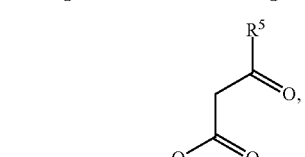

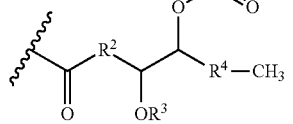

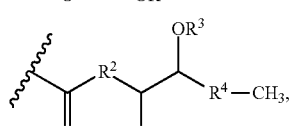

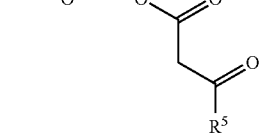

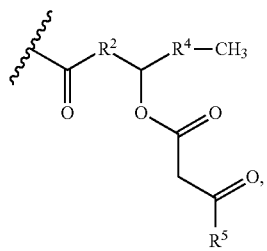

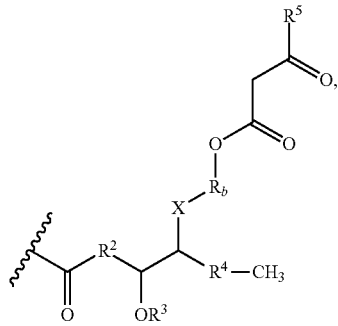

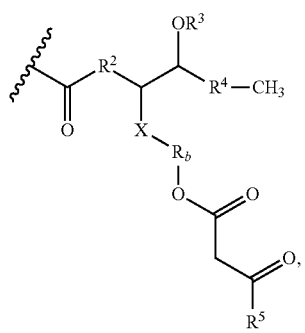

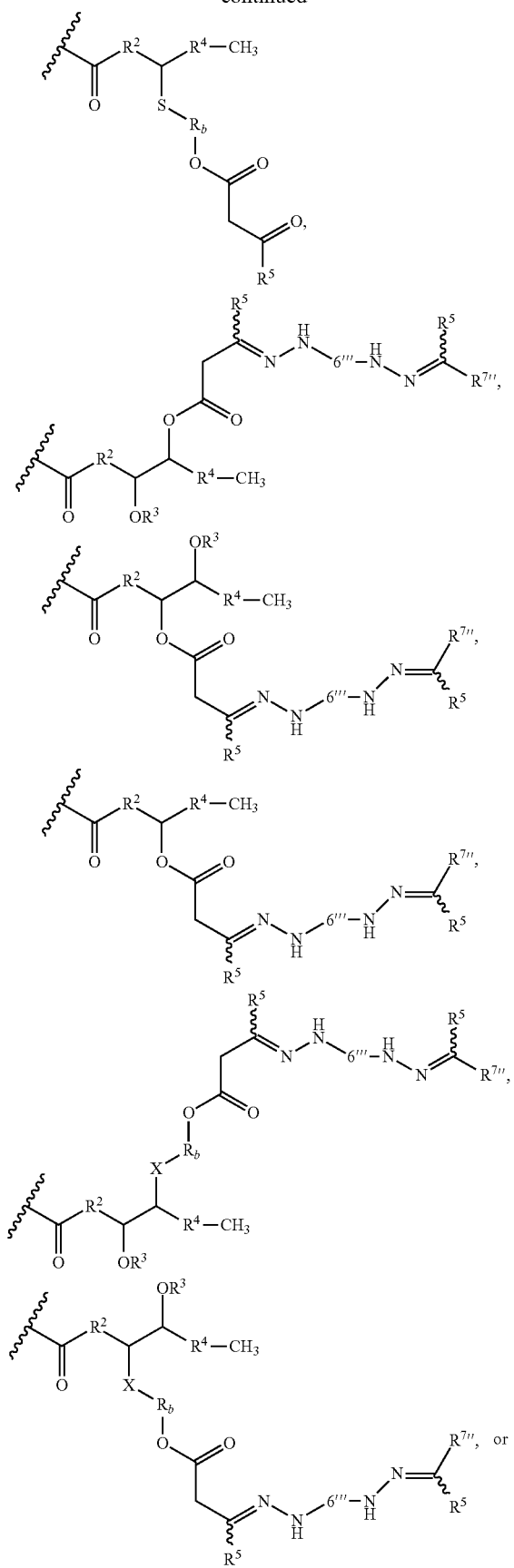
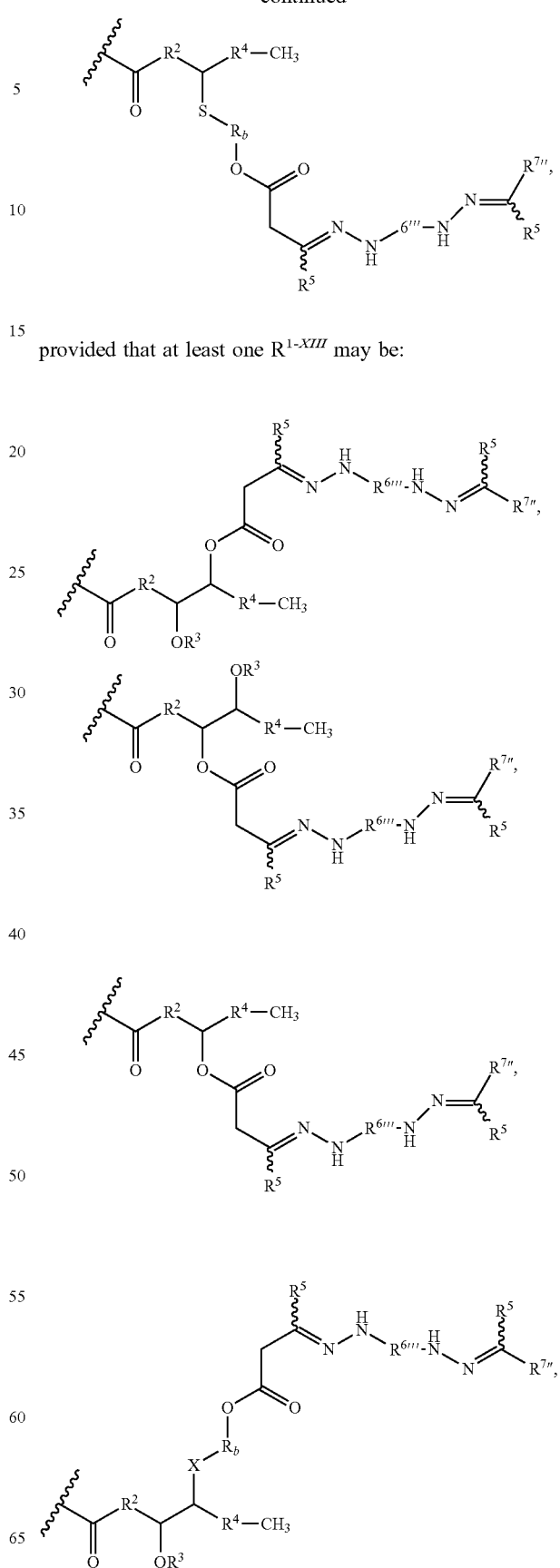
provided that at least one $R^{1\text{-}XIII}$ may be:

-continued

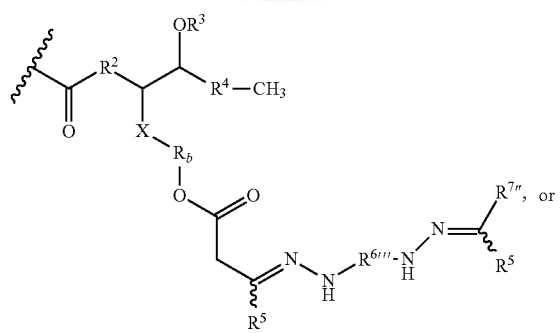

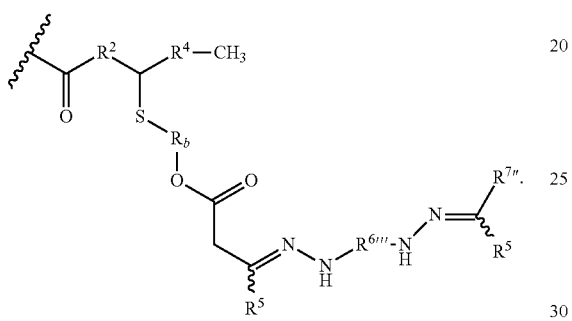

$R^{2'}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{6''''}$ may be $C_2$-$C_6$ alkyl, $C_4$-$C_{10}$ carboxylalkyl, $C_4$-$C_{10}$ sulfonylalkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R_b$ may be optionally carboxylated $C_1$-$C_6$ alkyl, branched alkyl, or aryl. X may be O, S, or N. $R^{7'''}$ may be:

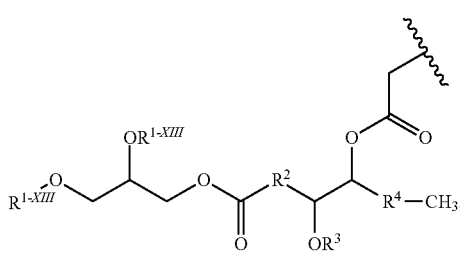

-continued

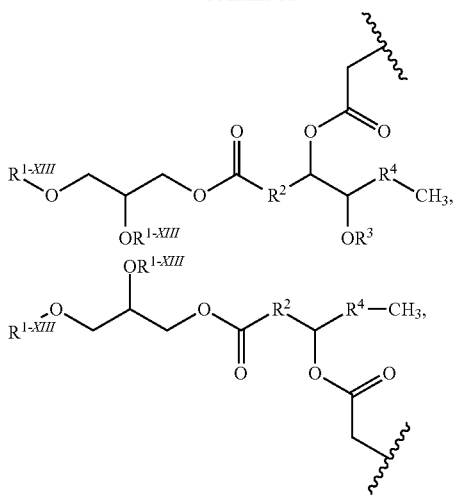

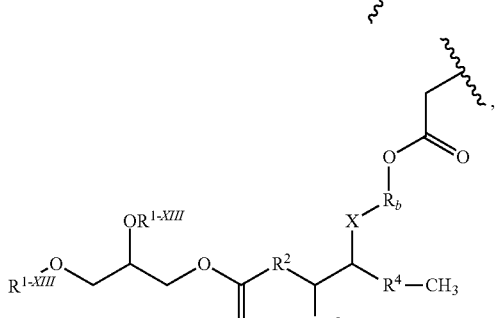

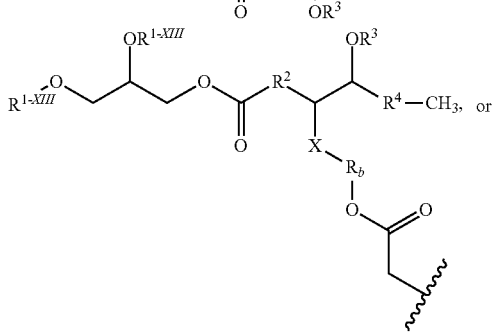

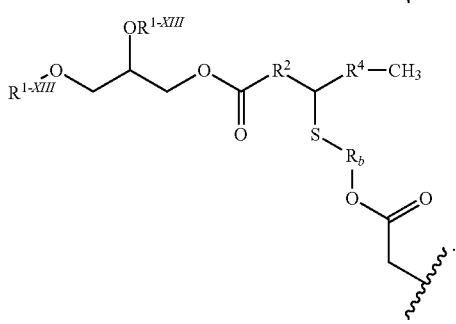

In some embodiments, the cross-linking compound may include at least one diazonium group. The cross-linking compound may include at least two diazonium groups.

In some embodiments, the cross-linking compound may include an aldehyde, for example, formaldehyde.

In some embodiments, the cross-linking compound may include at least two α,β-unsaturated carbonyl groups. For example, the cross-linking compound may be represented by Formula XIV:

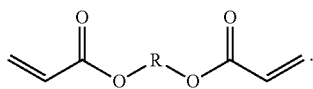

R may be $CH_2CH_2$, $CH_2(CH_3)CH$, $(CH_2CH_2OCH_2CH_2)_n$, or $CH_2(CH_3)CHOCH_2(CH_3)CH)_n$; and n may be an integer from 1 to 50.

In many embodiments, the crosslinking compound may include a polyamine. For example, the polyamine may include a diamine, triamine, and the like. The polyamine may be aliphatic or cycloaliphatic. The polyamine may be aromatic, aryl, or aralkyl. The polyamine may include a mixture of aliphatic, cycloaliphatic, and aromatic polyamines. For example, the polyamine may include any of the ANACAMINE® series (Air Products, Allentown, Pa.), e.g., ANACAMINE® 2049, ANACAMINE® 1110. ANACAMINE® 1482. ANACAMINE® 1608, ANACAMINE® 1617LV, ANACAMINE® 1638. ANACAMINE® 1693, ANACAMINE® 1769, ANACAMINE® 1784, ANACAMINE® 1856. ANACAMINE® 1884, ANACAMINE® 1922A, ANACAMINE® 2014FG, ANACAMINE® 2021, ANACAMINE® 2072, ANACAMINE® 2074, ANACAMINE® 2089M, ANACAMINE® 2143, ANACAMINE® 2280, and the like. The polyamine crosslinking agent may crosslink triglyceride-AAG compositions via imine or enamine linkages.

In several embodiments, the polytriglyceride-β-ketoester may include a triglyceride polyenamine-β-ketoester. The triglyceride polyenamine-β-ketoester may include a fatty acid ester. The triglyceride polyenamine-β-ketoester may include a β-ketoester group bonded to an alkyl chain of the fatty acid ester. The triglyceride polyenamine-β-ketoester may include an enamine group bonded to a keto-carbon of the β-ketoester.

As used herein, a "keto-carbon" or "keto-carbonyl" may refer to a carbonyl carbon, i.e., $C(=O)$. As used herein, an "imine" may refer to an amine condensed onto a carbonyl, i.e., $C(=NR)$. As used herein, an "enamine" may refer to a amine condensed onto a carbonyl, followed by tautomerization, i.e., $C=C-NR$.

In several embodiments, the triglyceride polyenamine-β-ketoester may be represented by:

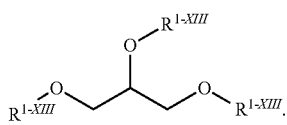

Each $R^{1-XIII}$ may independently be H,

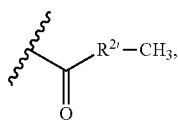 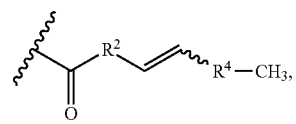

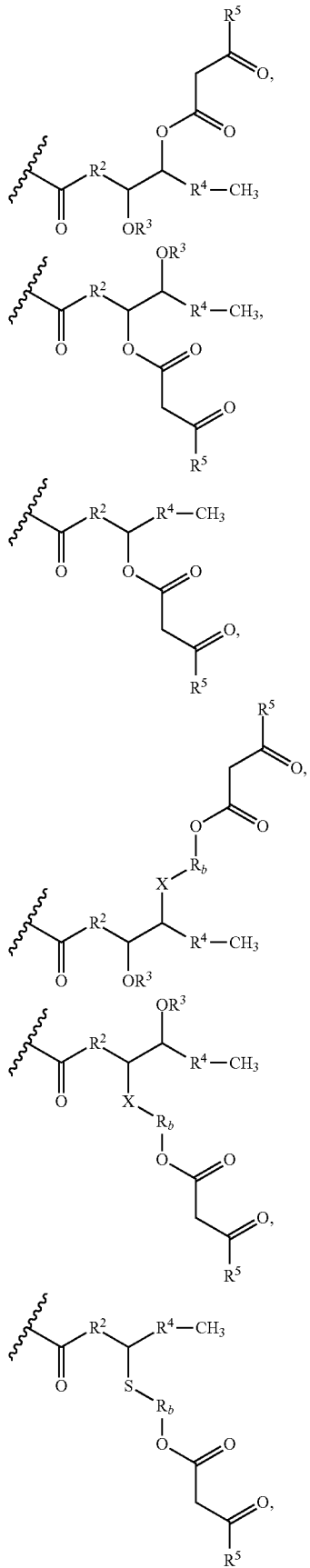

-continued
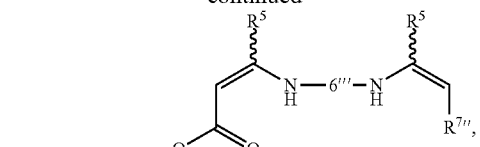
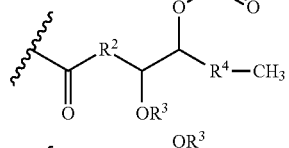
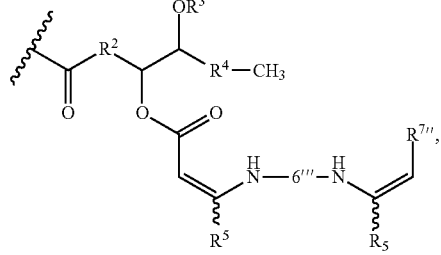
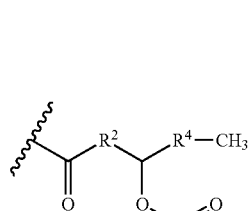
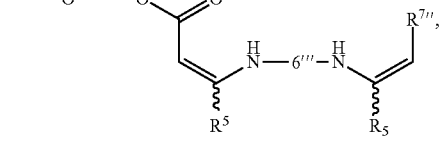
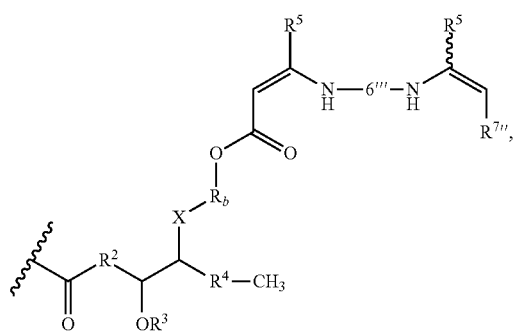
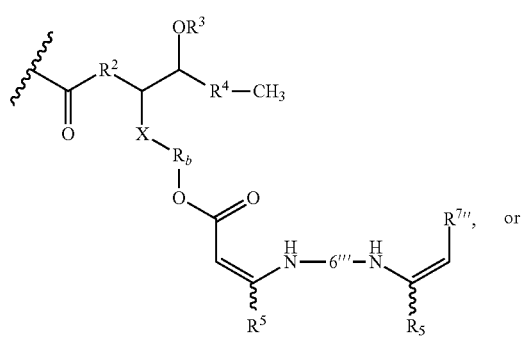
-continued
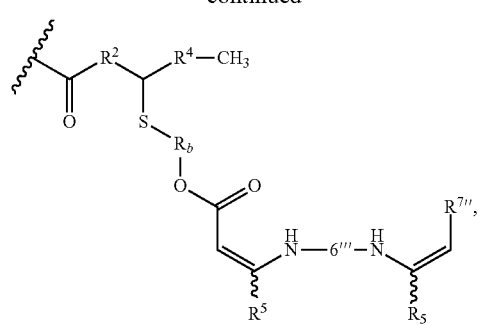
provided that at least one $R^{1-XIII}$ may be:
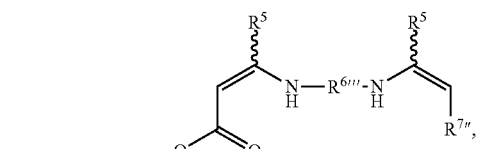
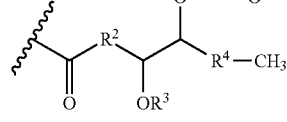
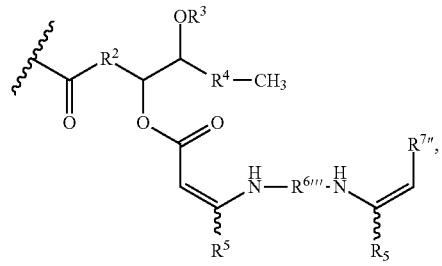
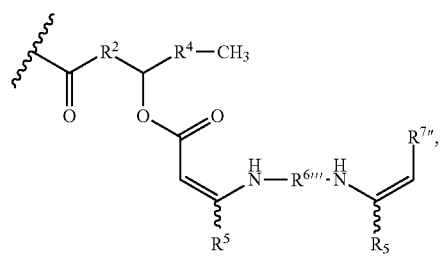
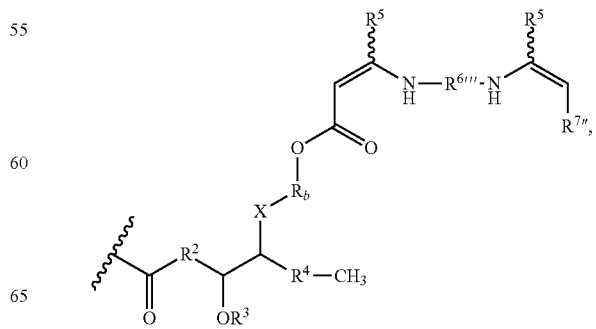

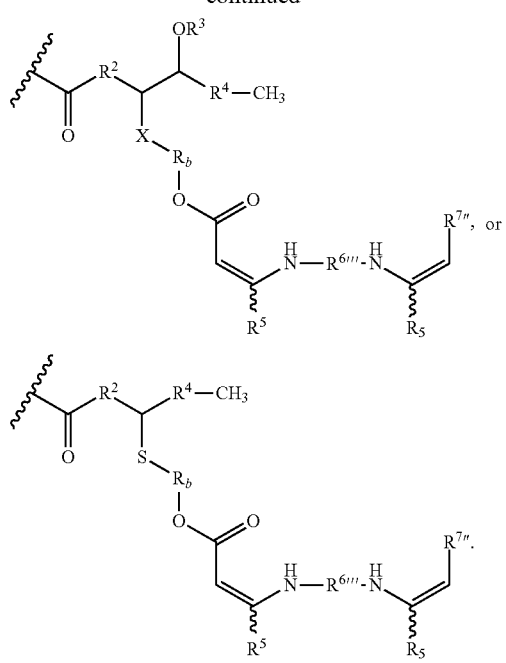

$R^{2'}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^3$ may be H, or:

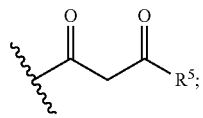

$R^4$ may be a bond, or optionally hydroxylated $C_1$-$C_{25}$ alkyl, $C_2$-$C_{25}$ alkenyl, or $C_2$-$C_{25}$ epoxyalkyl. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl. $R^{6''''}$ maybe $C_2$-$C_{10}$ alkyl or $C_2$-$C_{10}$ cycloalkyl. $R_b$ may be optionally carboxylated $C_1$-$C_6$ alkyl, branched alkyl, or aryl. X may be O, S, or N. $R^{7''}$ may be:

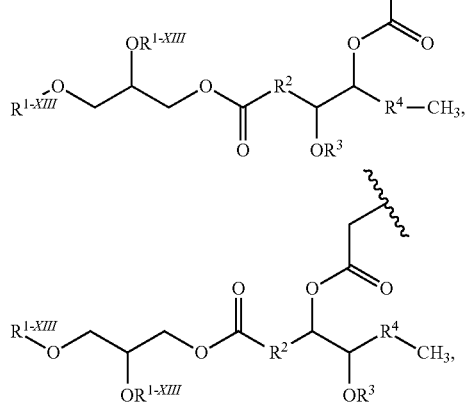

In various embodiments, a polytriglyceride-β-ketoester composition is provided. The polytriglyceride-β-ketoester composition may include a fatty acid ester. The polytriglyceride-β-ketoester composition may include a β-ketoester group bonded to one of: an alkyl chain of the fatty acid ester, or a linking group, the linking group being represented by:

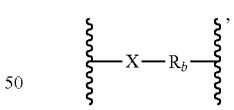

X may be —OH, —SH, —NH₂, or NHR$_f$. $R_b$ may be optionally substituted $C_1$-$C_6$ alkyl or aryl. $R_f$ may be optionally hydroxylated $C_1$-$C_6$ alkyl. The linking group may be bonded to the alkyl chain of the fatty acid ester via X and the β-ketoester group may be bonded via an ester moiety to $R_b$. The polytriglyceride-β-ketoester composition may include one or more of: an amide group bonded to a carbon that is alpha to a ketone of the β-ketoester such that the polytriglyceride-β-ketoester composition comprises a polytriglyceride-polyamide-β-ketoester composition, an amine group bonded to a carbon that is beta to a ketone of the β-ketoester such that the polytriglyceride-β-ketoester composition comprises a polytriglyceride-polyamino-β-ketoester composition an enamine group bonded to a keto-carbonyl of the β-ketoester such that the polytriglyceride-β-ketoester composition comprises a polytriglyceride-polyenamine-β-ketoester composition, and a hydrazone group bonded to a keto-carbonyl of the β-ketoester such that the polytriglyceride-β-ketoester composition comprises a polytriglyceride-polyhydrazone-β-ketoester composition.

In some embodiments, polytriglyceride-β-ketoester composition may include one or more of the polytriglyceride-polyamide-β-ketoester composition, the polytriglyceride-polyamino-β-ketoester composition, the polytriglyceride-polyenamine-β-ketoester composition and the polytriglyceride-polyhydrazone-β-ketoester composition.

In several embodiments, the polytriglyceride-β-ketoester composition may include the fatty acid ester and the β-ketoester group bonded to the alkyl chain of the fatty acid ester. The polytriglyceride-β-ketoester composition may include the amide group bonded to the carbon of the alkyl chain that is alpha to the ketone of the β-ketoester such that the polytriglyceride-β-ketoester composition may include the polytriglyceride-polyamide-β-ketoester composition. The polytriglyceride-β-ketoester composition may include the amine group bonded to the carbon of the alkyl chain that is beta to the ketone of the β-ketoester such that the polytriglyceride-β-ketoester composition may include the polytriglyceride-polyamino-β-ketoester composition. The polytriglyceride-β-ketoester composition may include the hydrazine group bonded to the keto-carbon of the β-ketoester such that the polytriglyceride-β-ketoester composition may include the polytriglyceride-polyhydrazone-β-ketoester composition.

In some embodiments, the polytriglyceride-β-ketoester composition may include one or more of the polytriglyceride-polyamide-β-ketoester composition, the polytriglyceride-polyamino-β-ketoester composition, and the polytriglyceride-polyhydrazone-β-ketoester composition.

In some embodiments, the polytriglyceride-β-ketoester composition may be in the form of one or more of: a cross-linked coating and a cross-linked foam. The polytriglyceride-β-ketoester composition may be in the form of a cross-linked coating on a surface. The polytriglyceride-β-ketoester composition may be in the form of a cross-linked coating on a metal surface. The polytriglyceride-β-ketoester composition may be in the form of a cross-linked coating on an interior surface of a beverage or food container. The surface may include a foil or metal packaging material. The surface may include one or more of: low carbon steel, aluminum, anodized aluminum, silver, and alloys or mixtures thereof. The surface may be one or more of an interior surface or an exterior surface of a medical device. The polytriglyceride-β-ketoester composition may form a cross-linked coating on one or more of the interior surface and the exterior surface of the medical device. Further, silver may be included by one or more of: the interior surface, the exterior surface, and the polytriglyceride-β-ketoester composition forming the cross-linked coating. The silver may be in ionic or oxide form.

In several embodiments, the triglyceride polyamido-β-ketoester composition may include the fatty acid ester. The triglyceride polyamido-β-ketoester composition may include the β-ketoester group bonded to one of: the alkyl chain of the fatty acid ester, or the linking group. The triglyceride polyamido-β-ketoester composition may include the amide group bonded to a carbon of the alkyl chain that may be alpha to a ketone of the β-ketoester. For example, the triglyceride polyamido-β-ketoester composition may be represented by Formula XI:

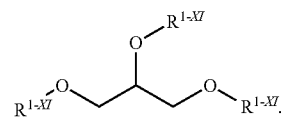

Each $R^{1-XI}$ independently may be H,

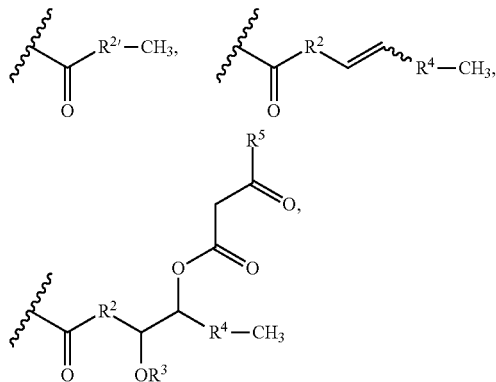

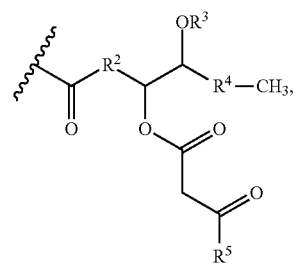

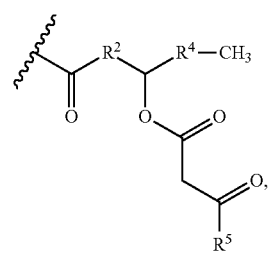

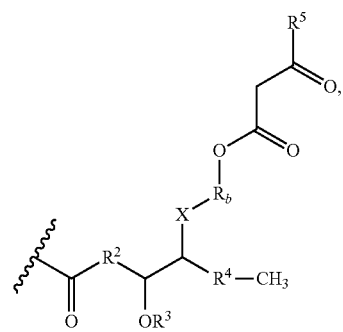

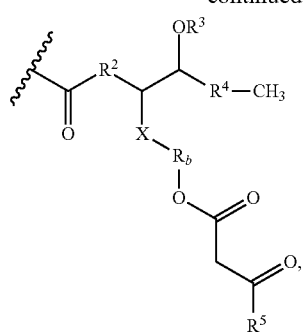
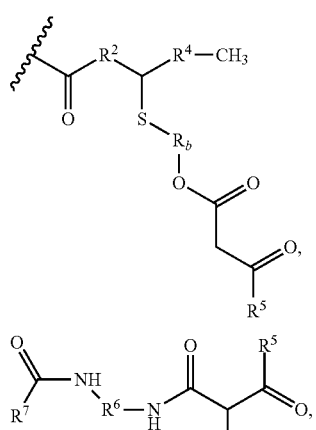
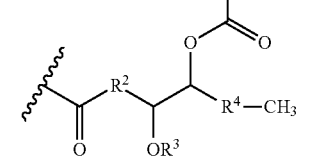
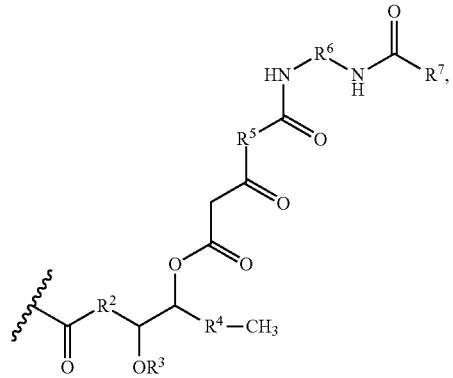
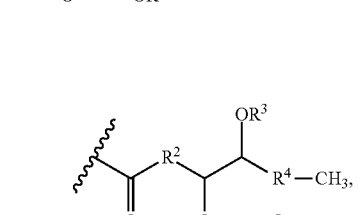
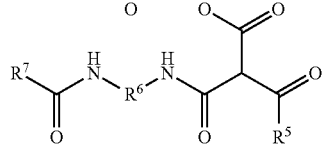
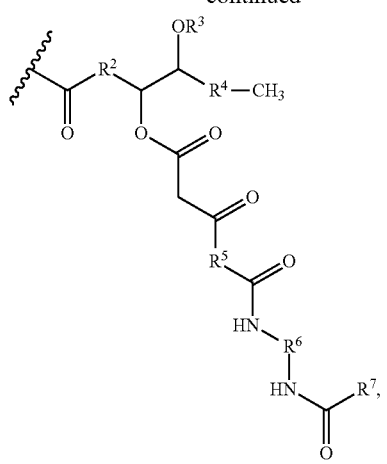
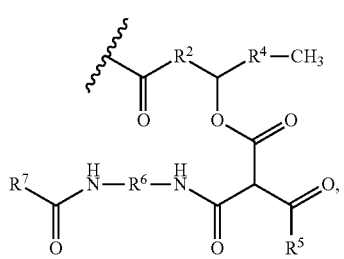
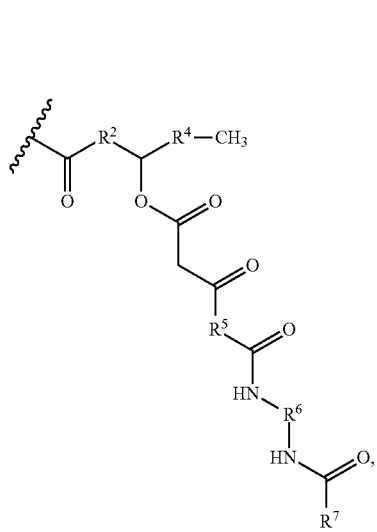
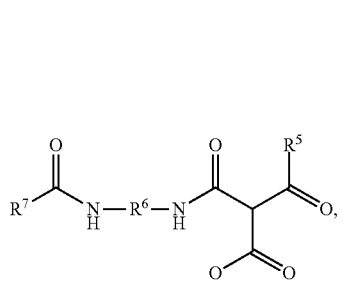
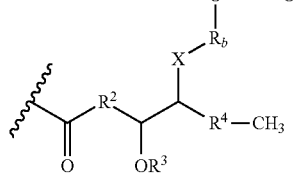

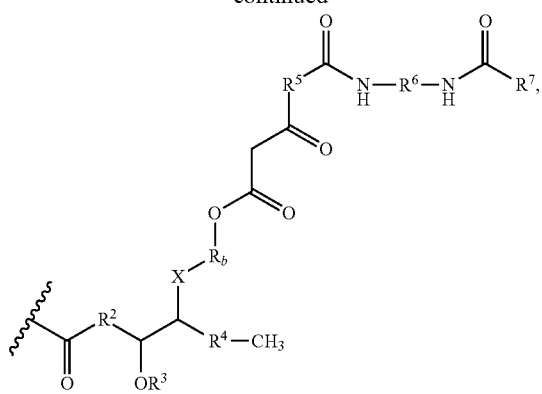
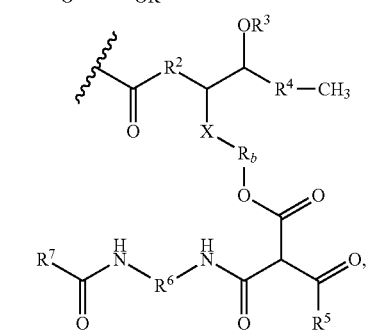
provided that at least one $R^{1-XI}$ may be:

69
-continued
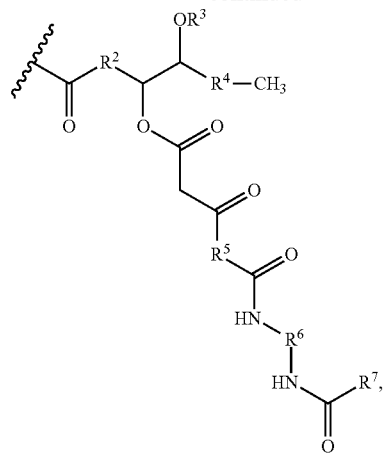
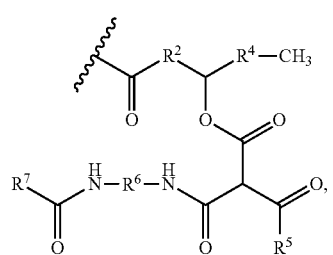
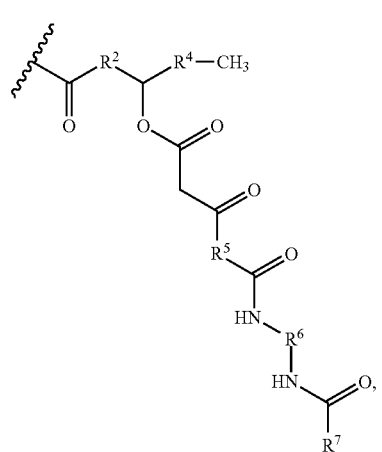
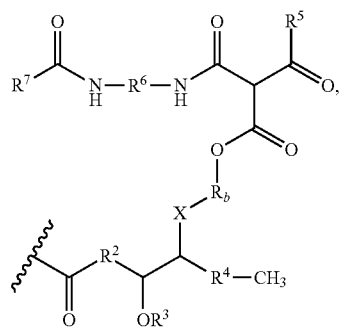
70
-continued
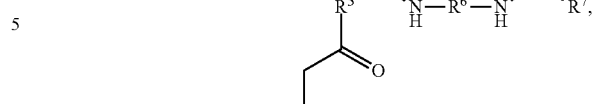
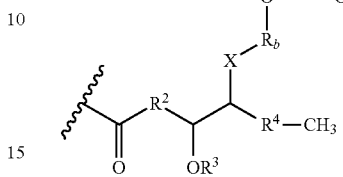
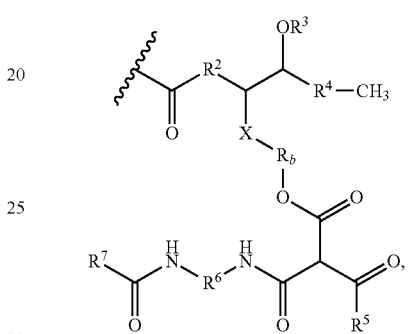
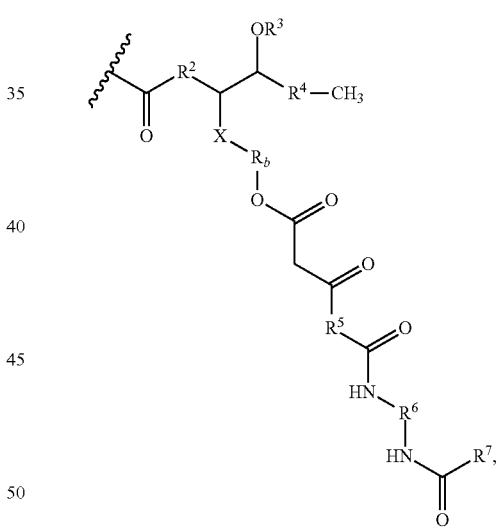
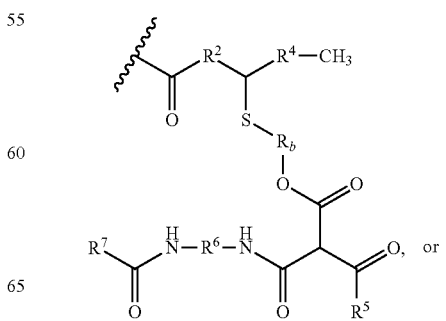

-continued

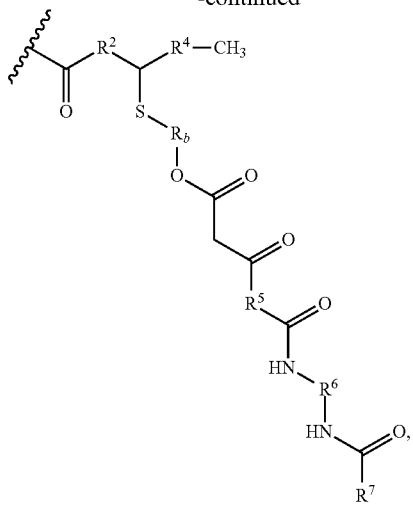

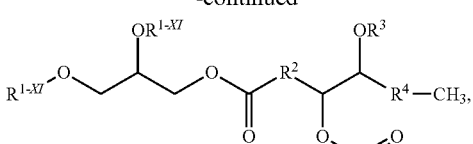

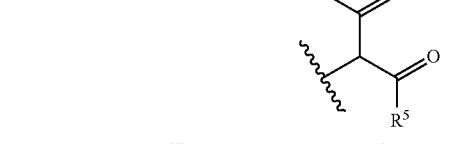

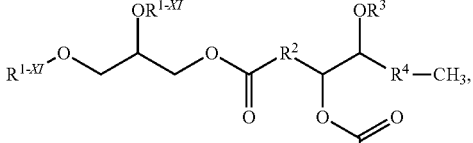

$R^{2'}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

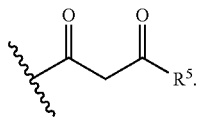

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^6$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R_b$ may be optionally carboxylated $C_1$-$C_6$ alkyl, branched alkyl, or aryl. X may be O, S, or N. $R^7$ may be:

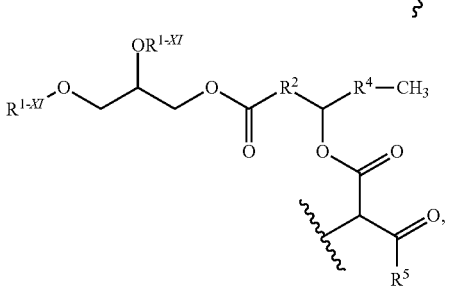

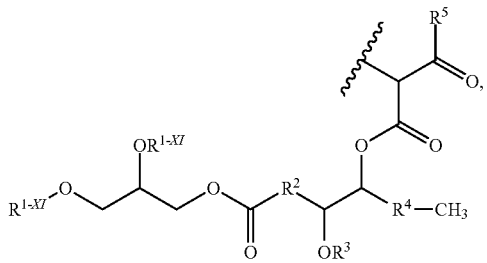

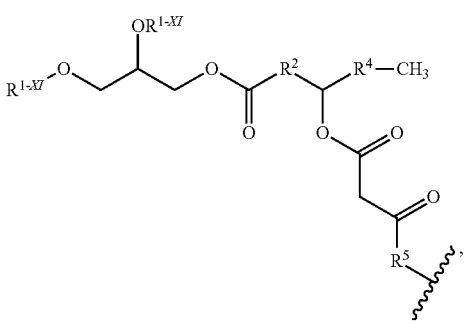

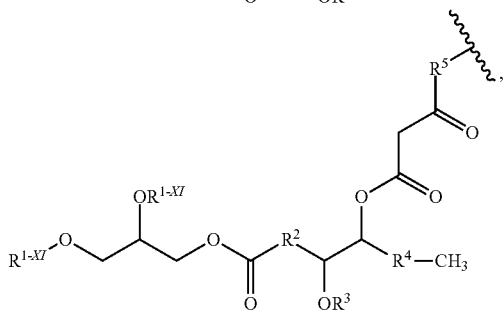

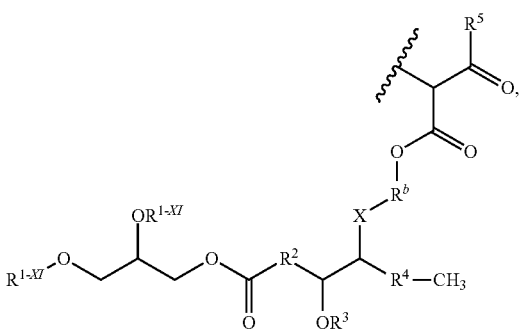

73
-continued
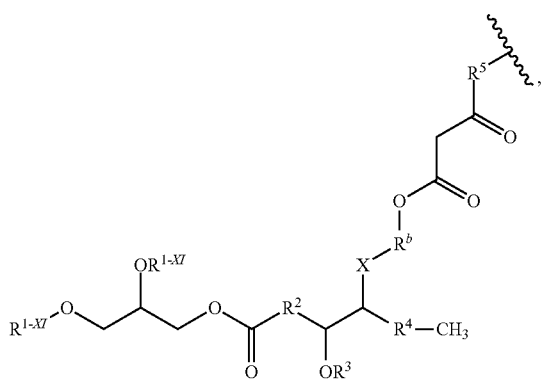
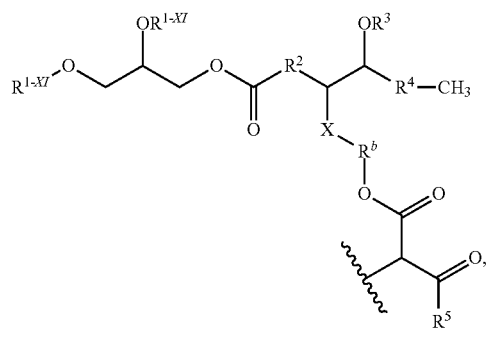
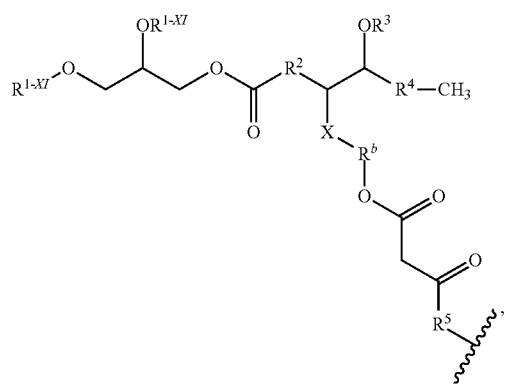
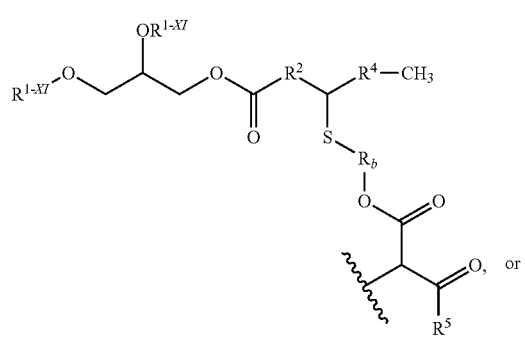
74
-continued
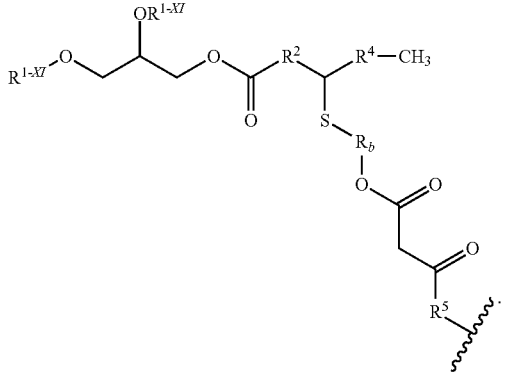
In several embodiments, the triglyceride polyamido-β-ketoester composition may be represented by Formula XV:
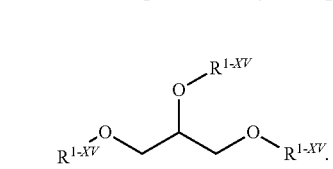
At least one $R^{1-XV}$ may be:
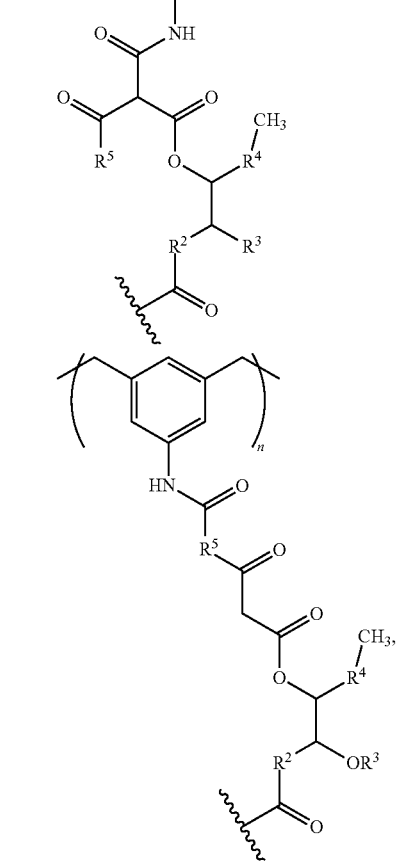

-continued

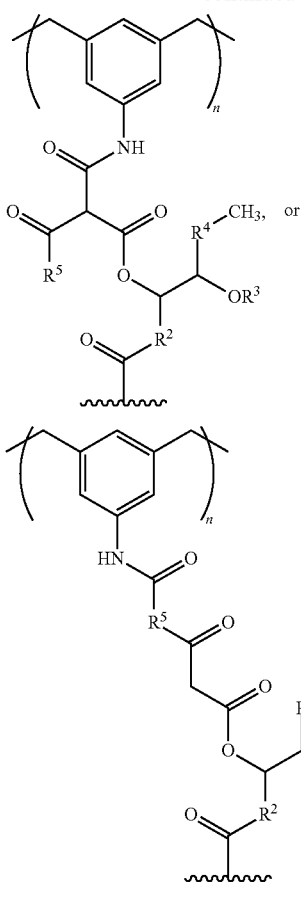

$R^{2'}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

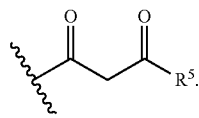

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$) heteroaryl.

In several embodiments, the triglyceride polyamido-β-ketoester composition may be represented by Formula XVI:

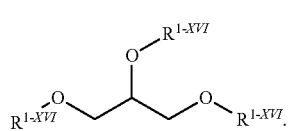

At least one $R^{1\text{-}XVI}$ may be:

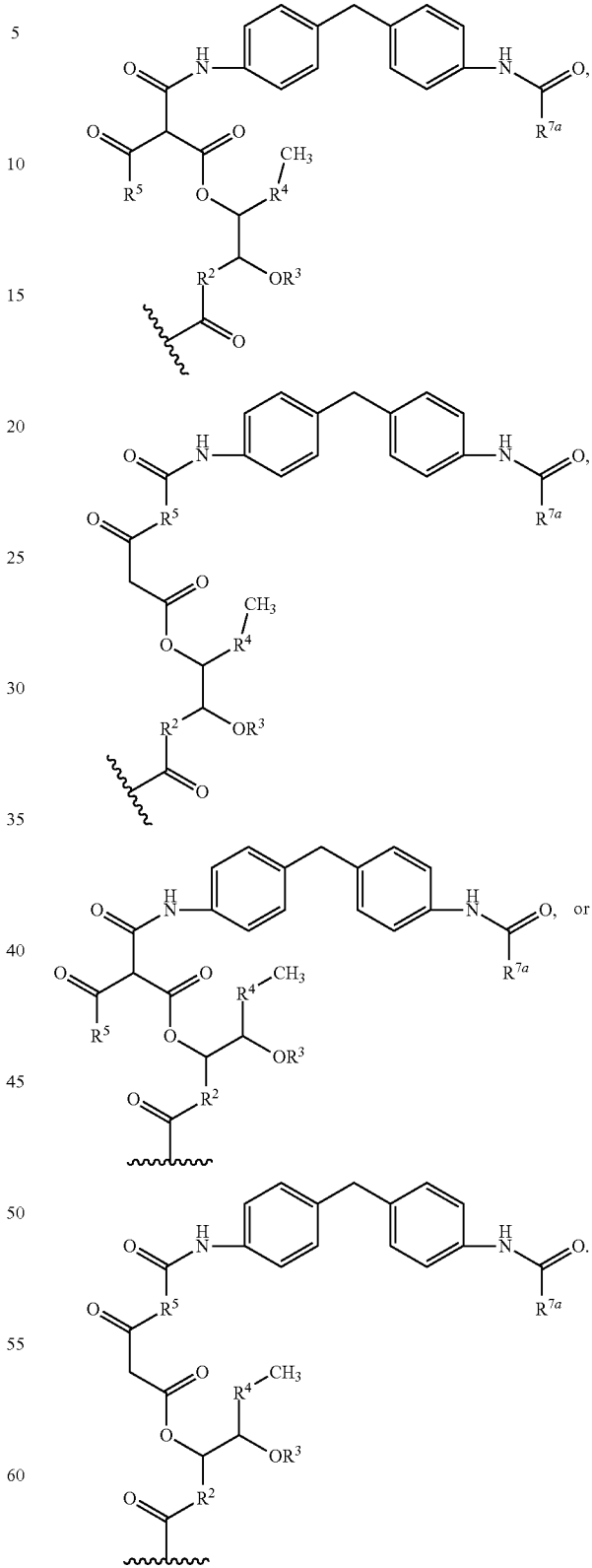

$R^2$ may be optionally hydroxylated $C_2$-$C_{25}$ alkyl or optionally hydroxylated $C_2$-$C_{25}$ alkenyl. $R^3$ may be H, or:

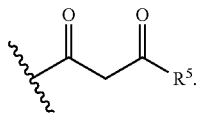

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{7a}$ may be:

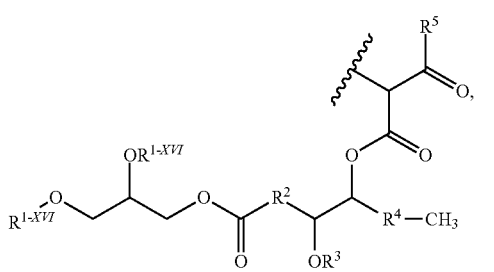

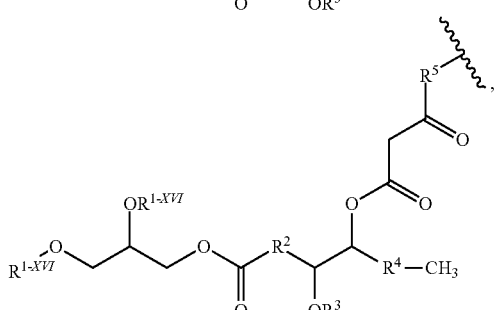

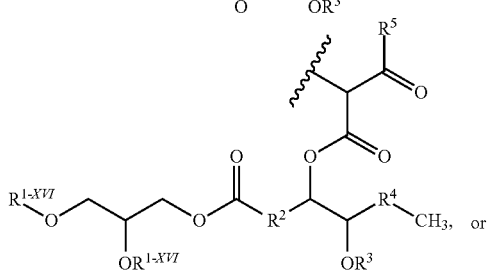

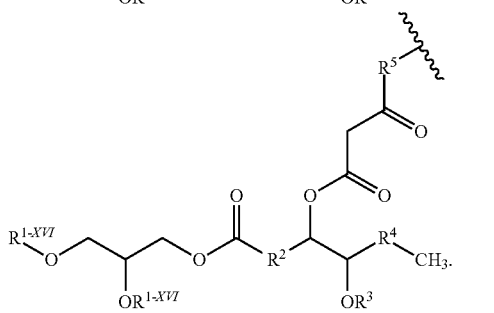

In several embodiments, the triglyceride polyamino-β-ketoester composition may include the fatty acid ester. The triglyceride polyamino-β-ketoester composition may include the β-ketoester group bonded to one of, the alkyl chain of the fatty acid ester, or the linking group. The triglyceride polyamino-β-ketoester composition may include the amine group bonded to the carbon that may be beta to the ketone of the β-ketoester. For example, the triglyceride polyamino-β-ketoester may be represented by Formula XII:

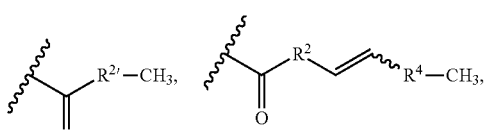

Each $R^{1-XII}$ may independently be H,

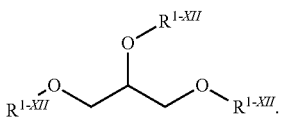

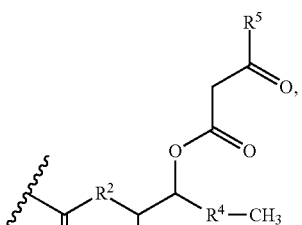

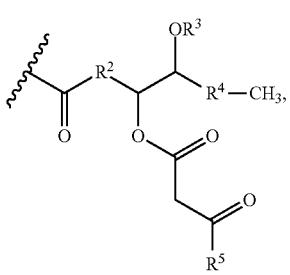

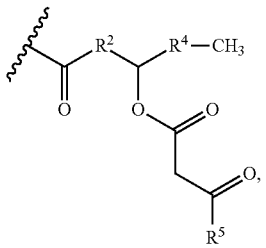

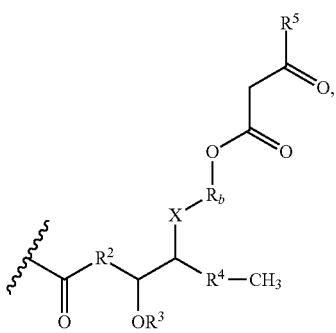

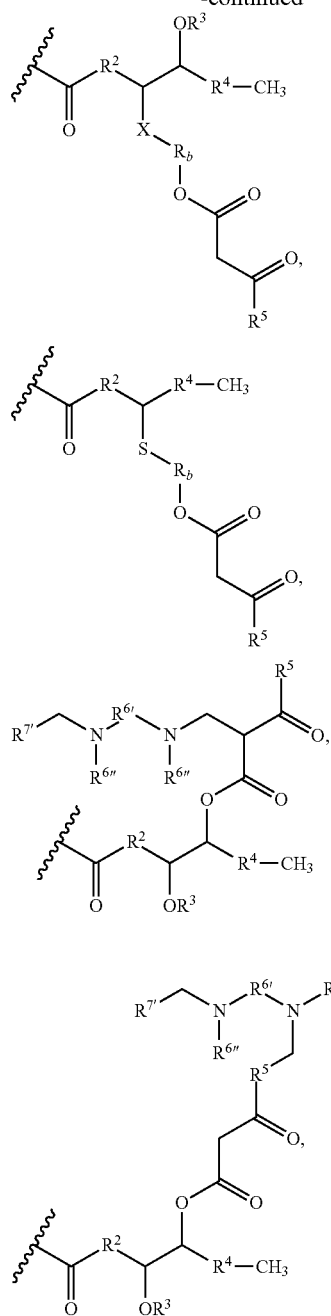
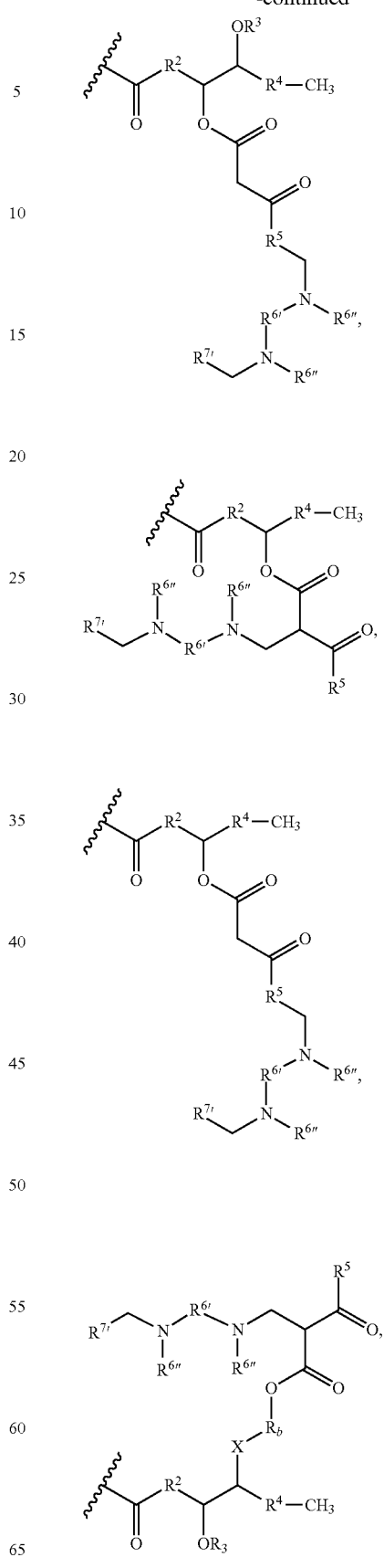

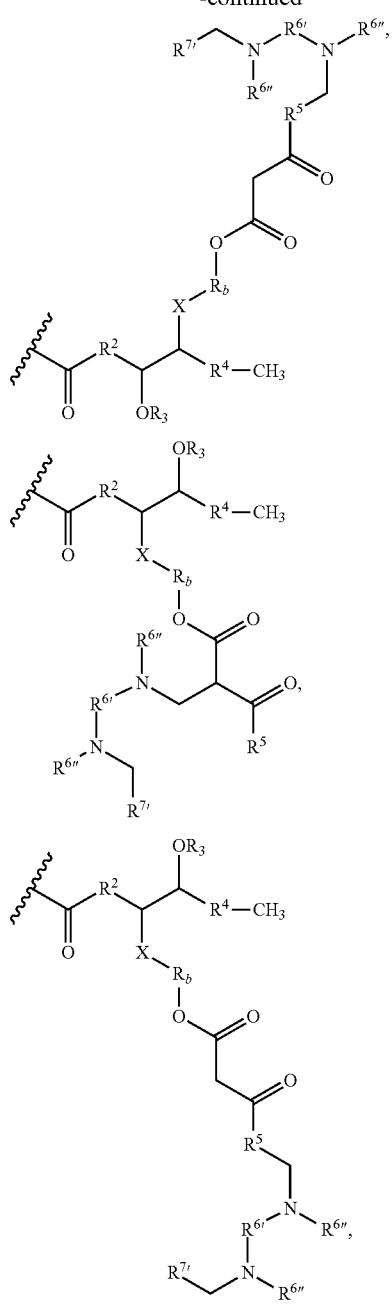
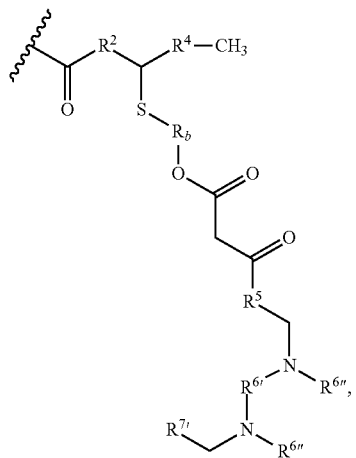
provided that at least one $R^{1\text{-}XII}$ may be:
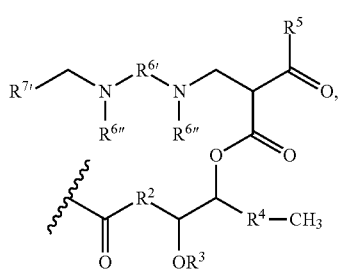
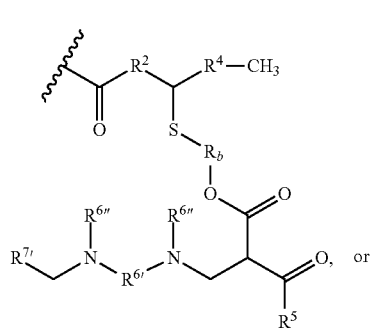
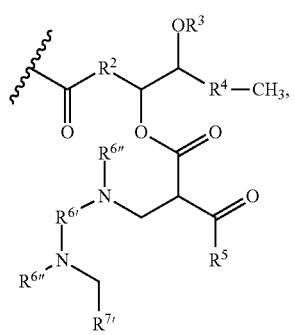

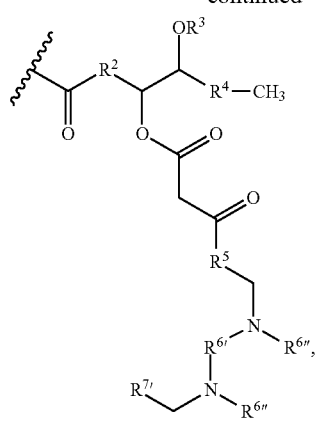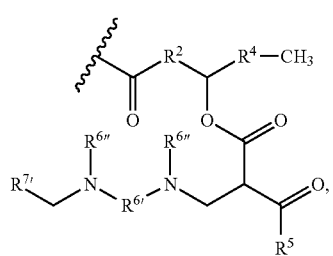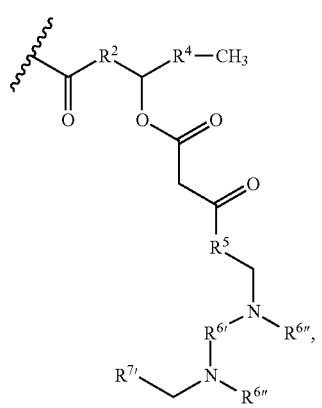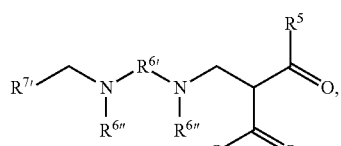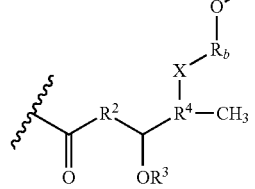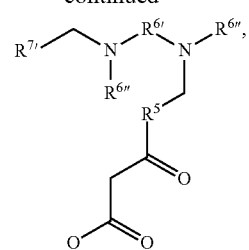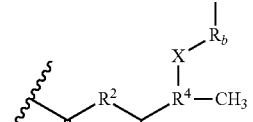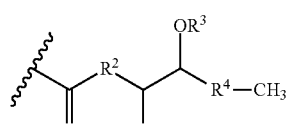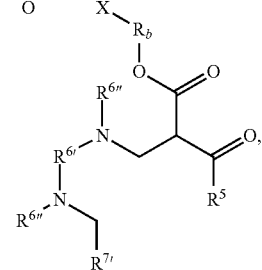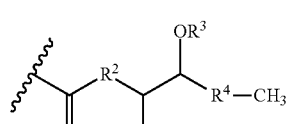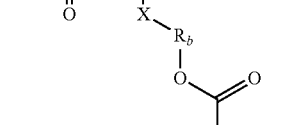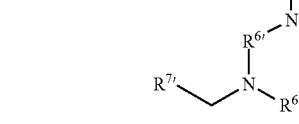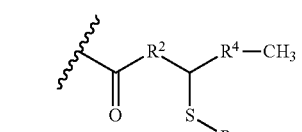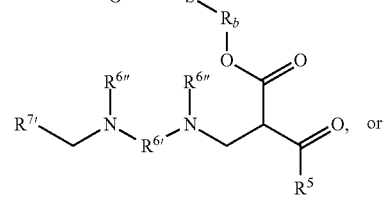

-continued

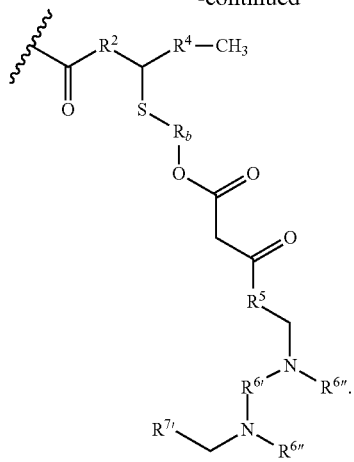

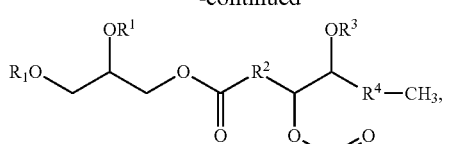

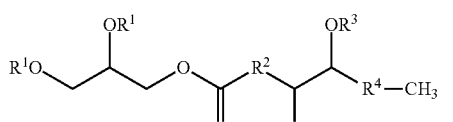

$R^{2\prime}$ may be optionally hydroxylated $C_2$-$C_{26}$ alkyl. $R^2$ may be optionally hydroxylated $C_2$-$C_{25}$ alkyl or optionally hydroxylated $C_2$-$C_{25}$ alkenyl. $R^3$ may be H, or:

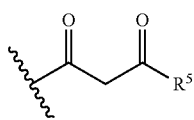

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{6\prime}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R_b$ may be optionally carboxylated $C_1$-$C_6$ alkyl, branched alkyl, or aryl. X may be O, S, or N. $R^{6\prime\prime}$ may be: $CH_2OH$, $CH_2OCH_3$, $CH_2SH$, $CH_2SCH_3$,

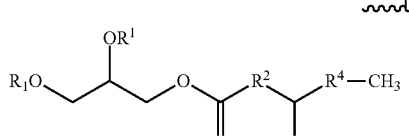

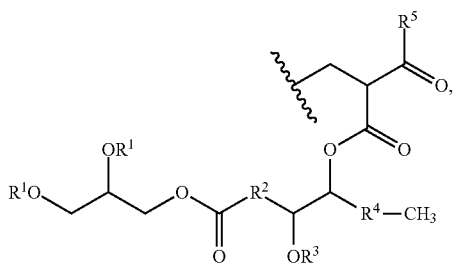

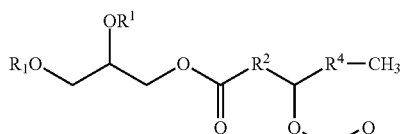

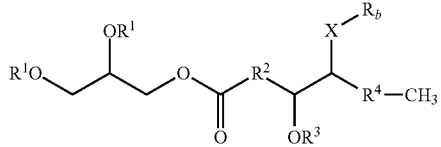

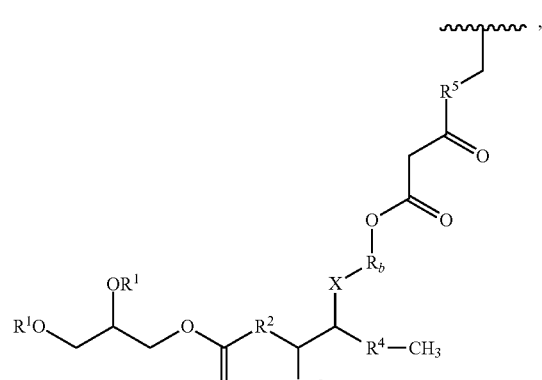
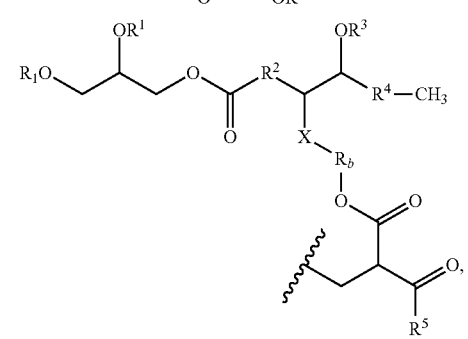
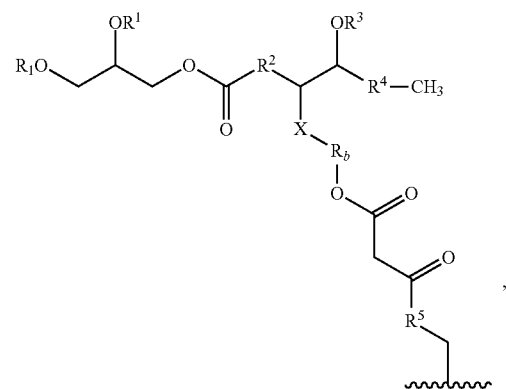
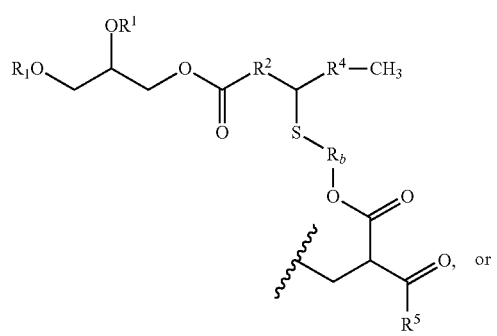
$R^{7'}$ may be:
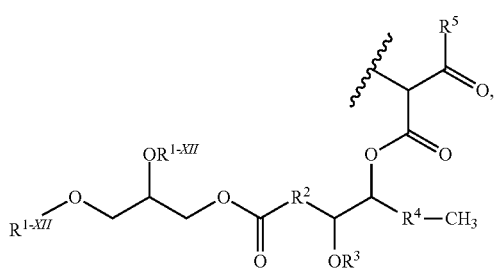
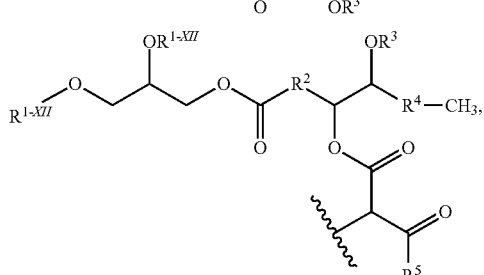
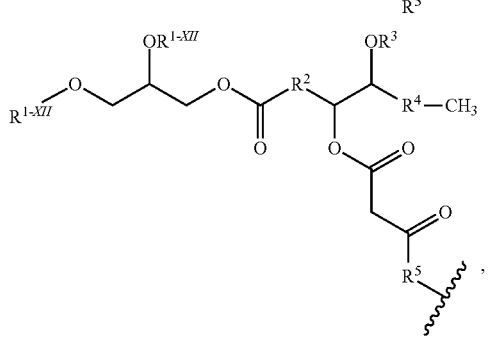

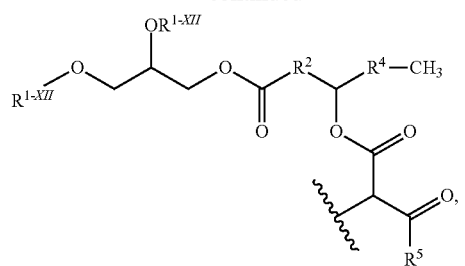
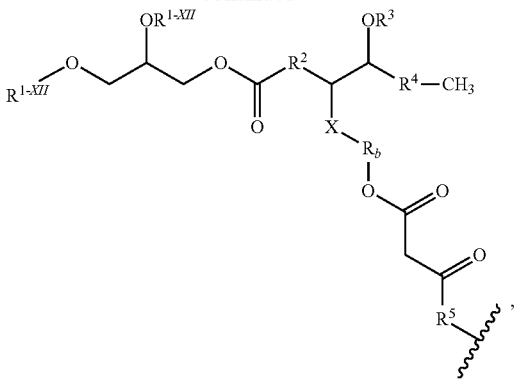
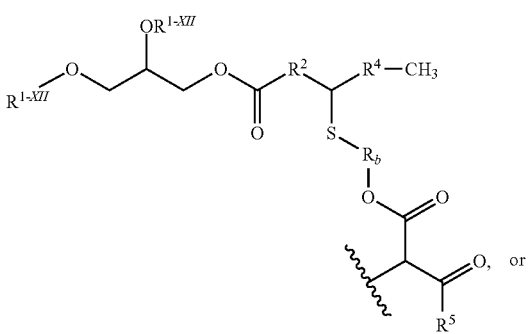
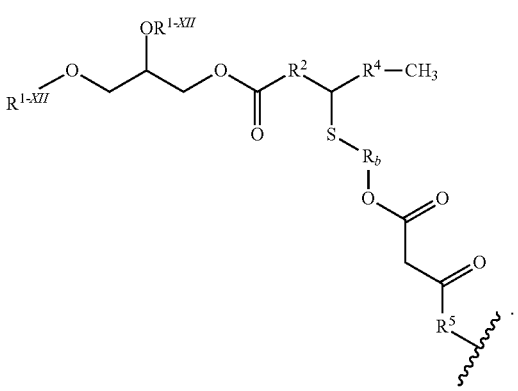
In some embodiments, the triglyceride polyamino-β-ketoester composition may be represented by Formula XVII:

At least one $R^{1\text{-}XVII}$ may be:

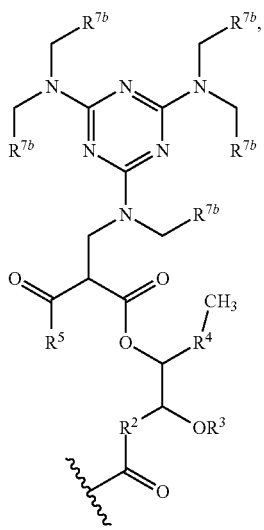

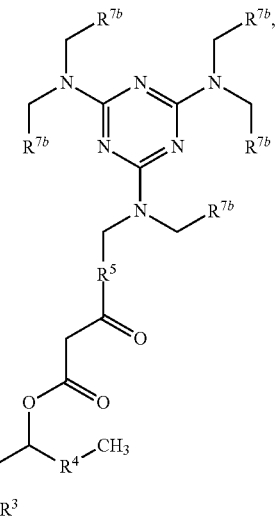

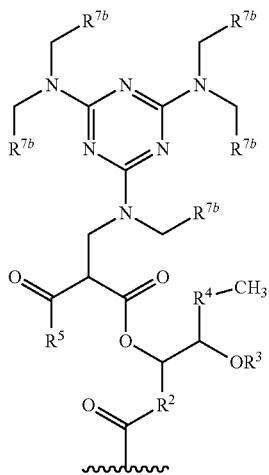 or

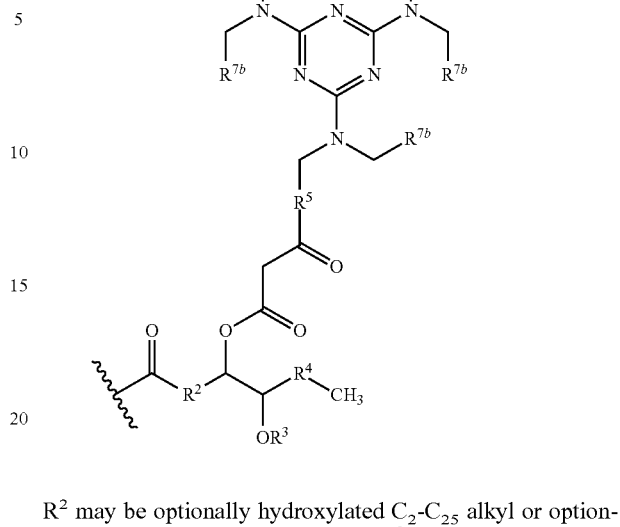

$R^2$ may be optionally hydroxylated $C_2$-$C_{25}$ alkyl or optionally hydroxylated $C_2$-$C_{25}$ alkenyl. $R^3$ may be H, or:

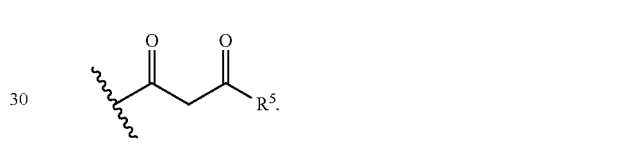

$R^4$ may be a bond, optionally hydroxylated $C_1$-$C_{25}$ alkyl, optionally hydroxylated $C_2$-$C_{25}$ alkenyl, or optionally hydroxylated $C_2$-$C_{25}$ epoxyalkyl. $R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{7b}$ may be OH, OCH$_3$, SH, SCH$_3$,

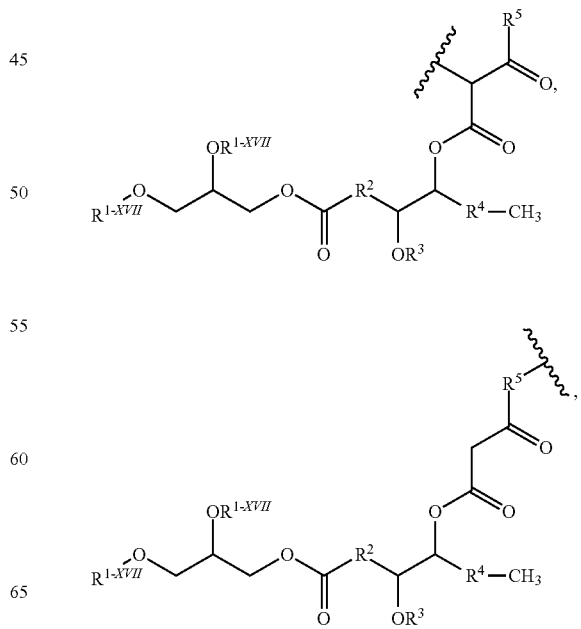

-continued

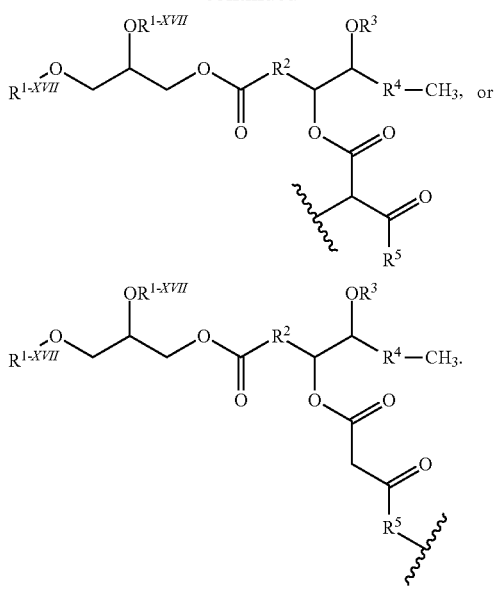

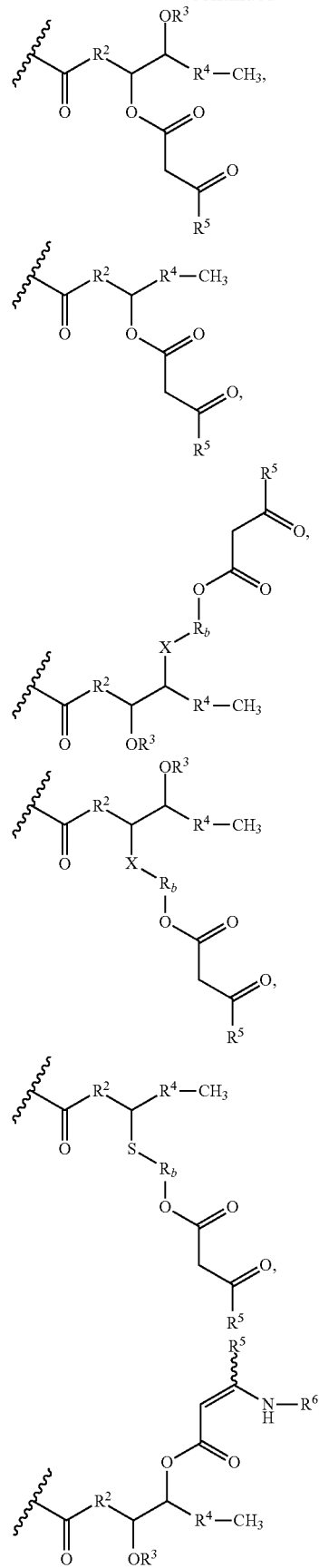

In several embodiments, the polytriglyceride-β-ketoester may include the fatty acid ester. The polytriglyceride-β-ketoester may include the β-ketoester bonded to one of: the alkyl chain of the fatty acid ester, or the linking group. The polytriglyceride-β-ketoester may include the enamine group bonded to the keto-carbon of the β-ketoester such that the polytriglyceride-β-ketoester composition may include the polytriglyceride polyenamine-β-composition. For example, the polytriglyceride polyenamine-β-composition may be represented by:

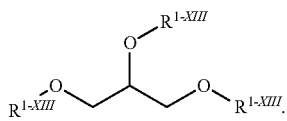

Each $R^{1-XIII}$ may independently be H,

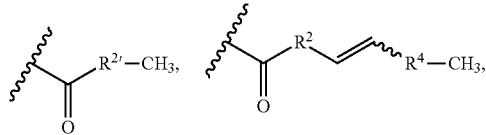

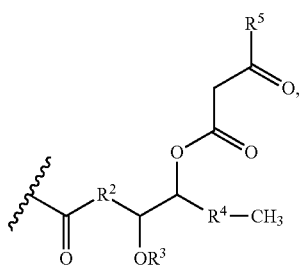

-continued
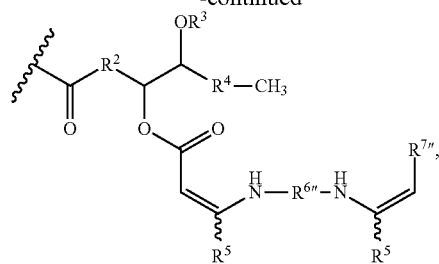
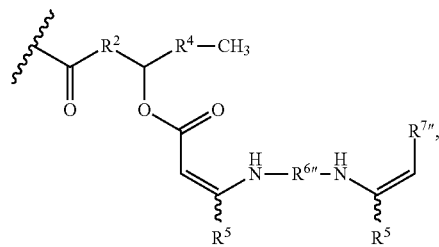
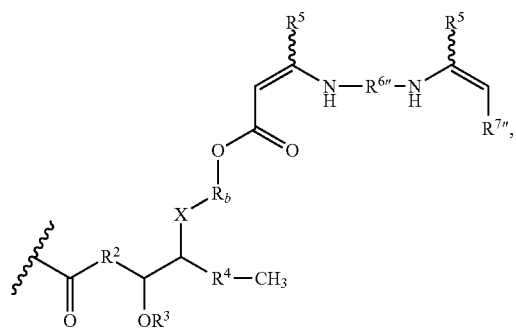
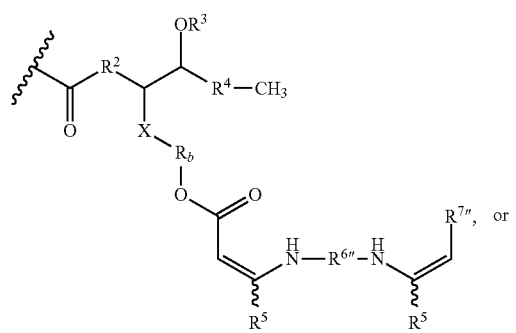
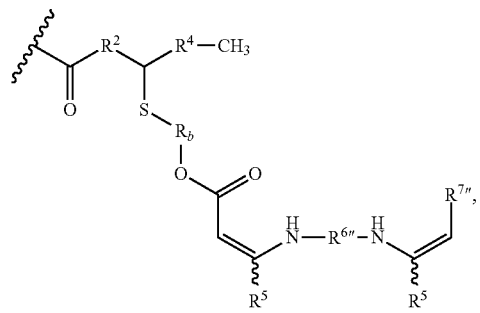
provided that at least one $R^{1\text{-}XIII}$ may be:
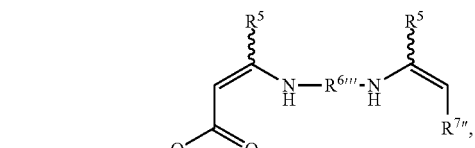
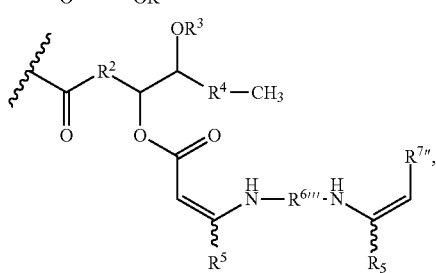
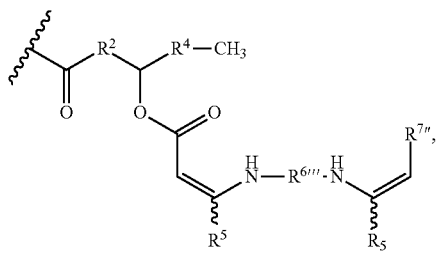
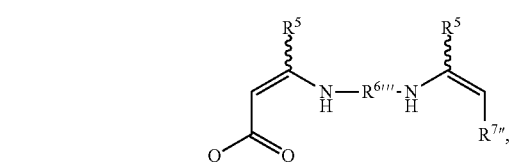
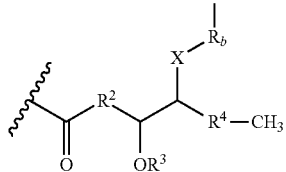
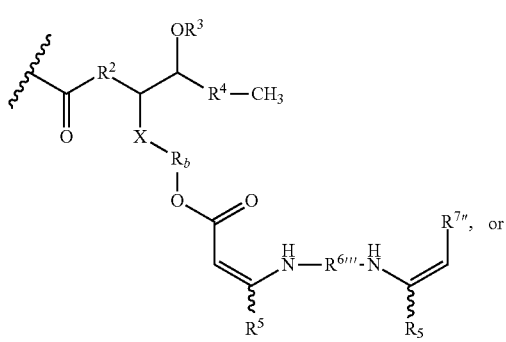

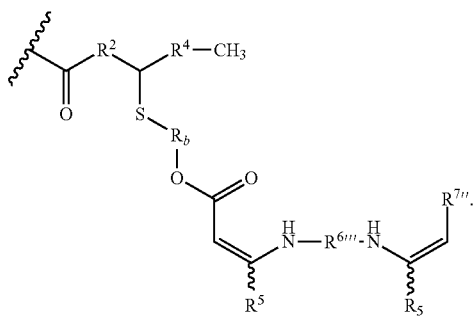

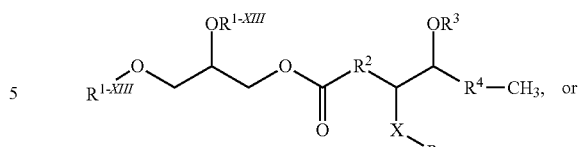

$R^{2\prime}$ may be optionally hydroxylated $C_2$-$C_{26}$ alkyl. $R^2$ may be optionally hydroxylated $C_2$-$C_{25}$ alkyl or $C_2$-$C_{25}$ alkenyl. $R^3$ may be H, or:

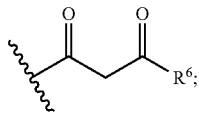

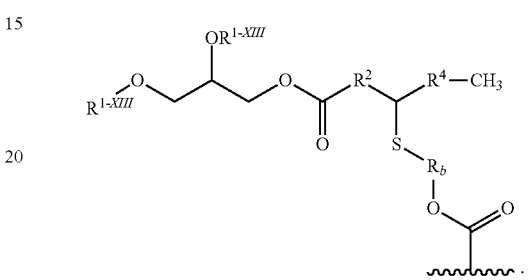

$R^4$ may be a bond, or optionally hydroxylated $C_1$-$C_{25}$ alkyl, $C_2$-$C_{25}$ alkenyl, or $C_2$-$C_{25}$ epoxyalkyl. $R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl. $R^{6\prime\prime\prime\prime}$ may be $C_2$-$C_{10}$ alkyl or $C_2$-$C_{10}$ cycloalkyl. $R_b$ may be optionally carboxylated $C_1$-$C_6$ alkyl, branched alkyl, or aryl. X may be O, S, or N. $R^{7\prime\prime}$ may be:

In some embodiments, the triglyceride polyhydrazone-β-ketoester may include the fatty acid ester. The triglyceride polyhydrazone-β-ketoester may include the β-ketoester group bonded to one of: the alkyl chain of the fatty acid ester, or the linking group. The triglyceride polyhydrazone-β-ketoester may include the hydrazone group bonded to the keto-carbon of the β-ketoester. For example, the triglyceride polyhydrazone-β-ketoester may be represented by Formula XVIII

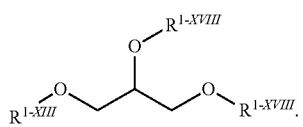

Each $R^{1\text{-}XVIII}$ may independently be H or:

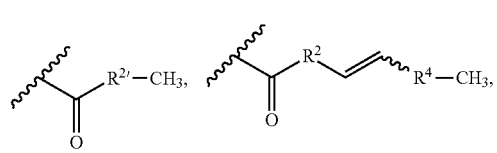

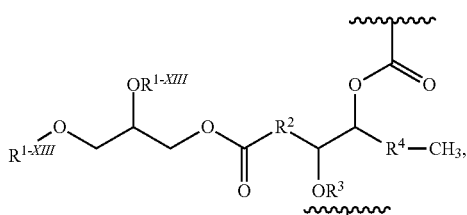

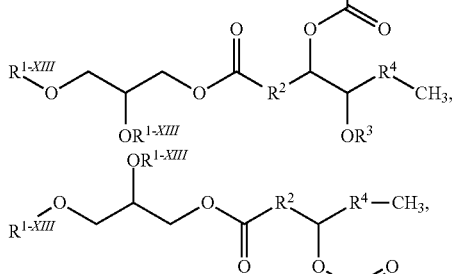

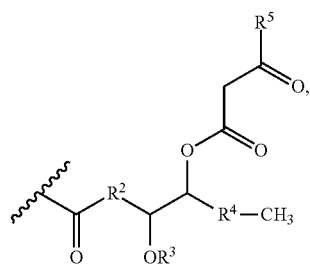

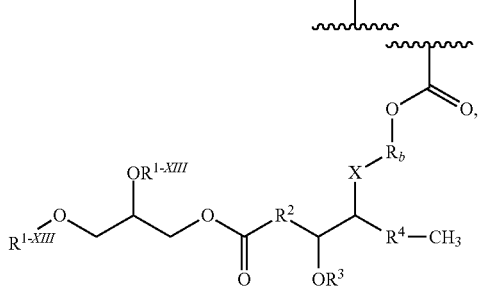

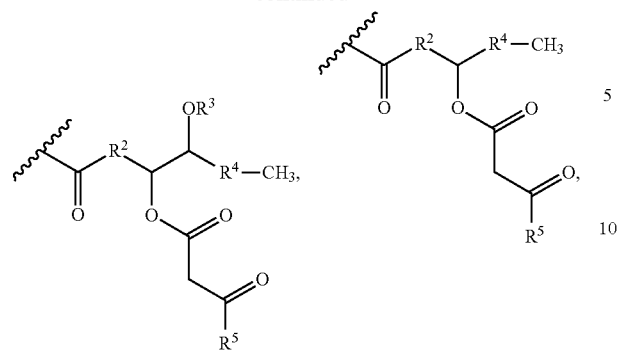
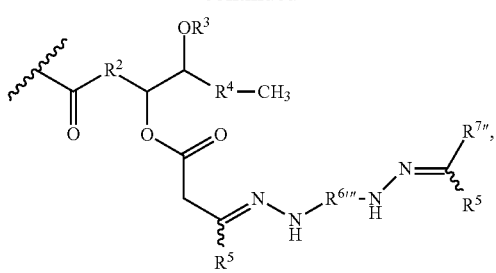
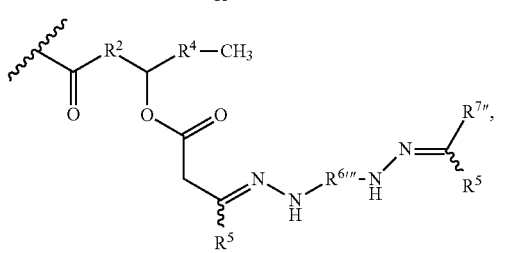
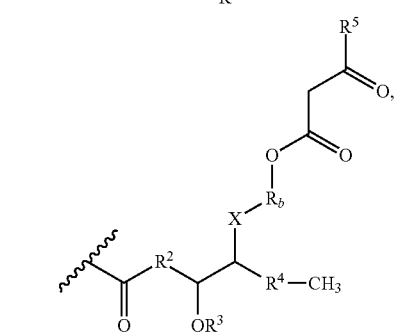
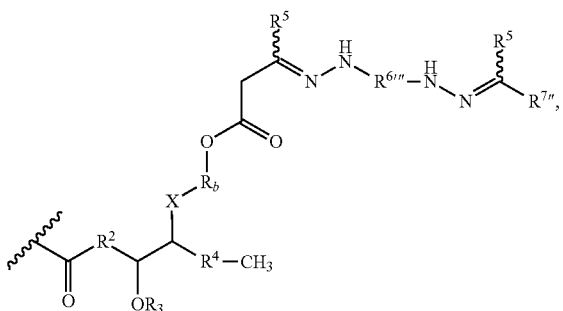
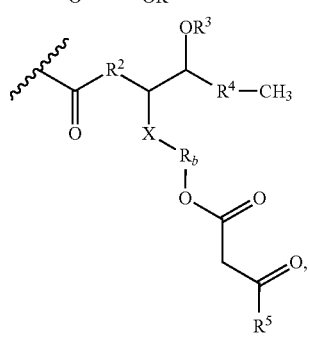
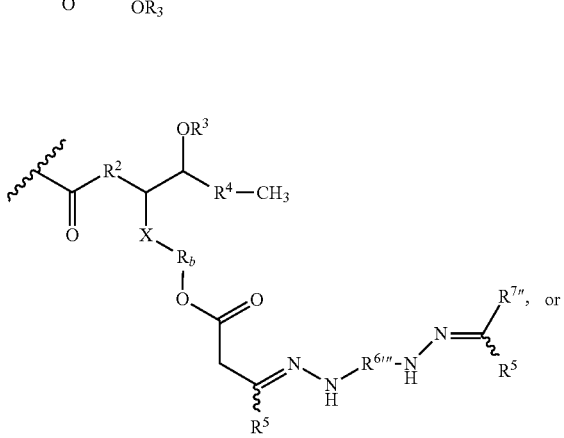
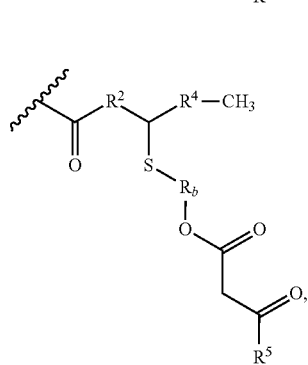
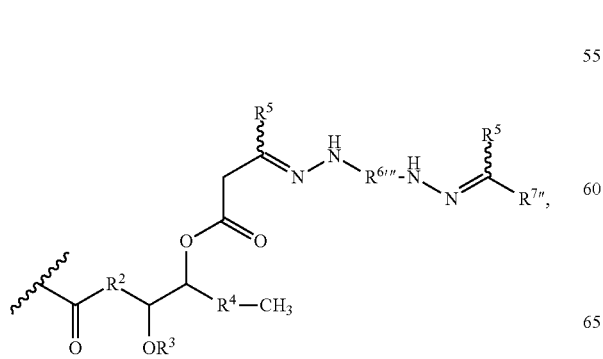
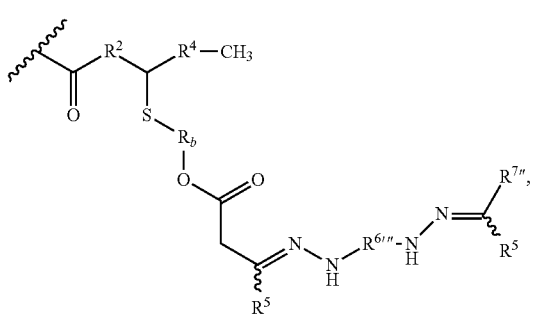

provided that at least one $R^{1\text{-}XIII}$ may be:

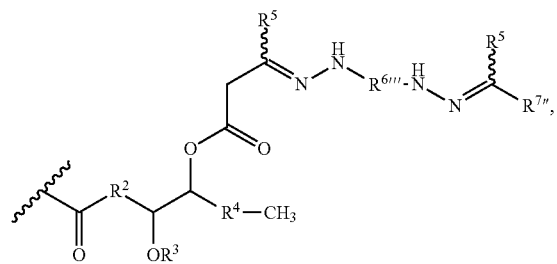

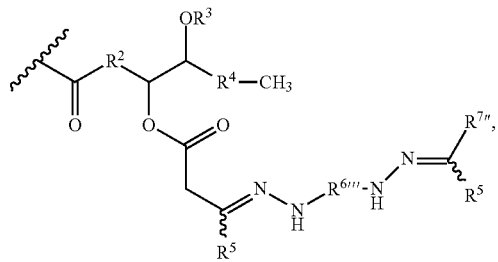

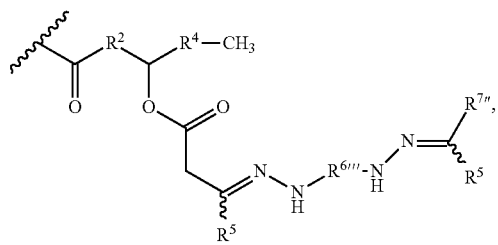

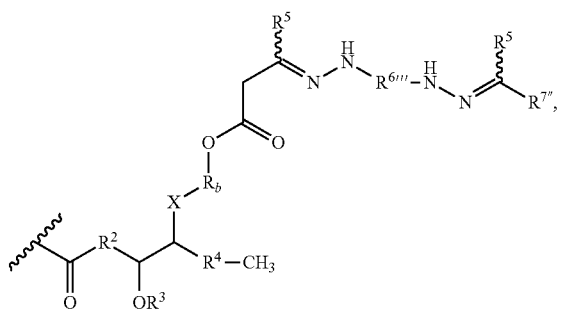

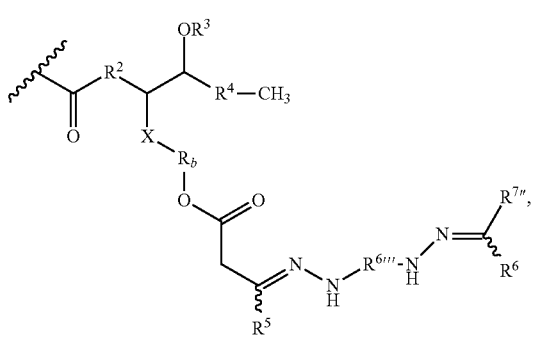

-continued

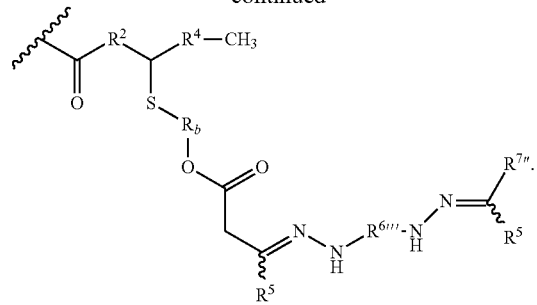

$R^{2\prime}$ may be optionally hydroxylated $C_2\text{-}C_{26}$ alkyl. $R^2$ may be optionally hydroxylated $C_2\text{-}C_{25}$ alkyl or optionally hydroxylated $C_2\text{-}C_{25}$ alkenyl. $R^3$ may be H, or:

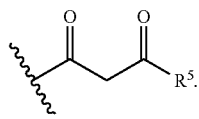

$R^4$ may be a bond, optionally hydroxylated $C_1\text{-}C_{25}$ alkyl, optionally hydroxylated $C_2\text{-}C_{25}$ alkenyl, or optionally hydroxylated $C_2\text{-}C_{25}$ epoxyalkyl. $R^5$ may be optionally hydroxylated $C_1\text{-}C_8$ alkyl, optionally hydroxylated $C_2\text{-}C_8$ alkenyl, optionally hydroxylated $C_6\text{-}C_{10}$ aryl, or optionally hydroxylated $C_4\text{-}C_{10}$ heteroaryl. $R^{6\prime\prime\prime\prime}$ may be $C_2\text{-}C_6$ alkyl, $C_4\text{-}C_{10}$ carbonylalkyl, a $C_4\text{-}C_{10}$ sulfonylalkyl. $C_6\text{-}C_{10}$ aryl, $C_1\text{-}C_6$ alkyl-$C_6\text{-}C_{10}$ aryl, $C_3\text{-}C_5$ heteroaryl, or $C_1\text{-}C_6$ alkyl-$C_3\text{-}C_5$ heteroaryl. $R_b$ may be optionally carboxylated $C_1\text{-}C_6$ alkyl, branched alkyl, or aryl. X may be O, S, or N. $R^{7\prime\prime}$ may be:

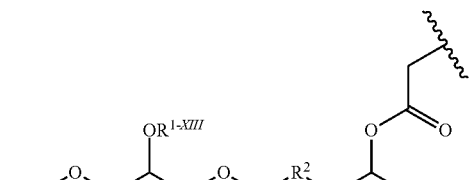

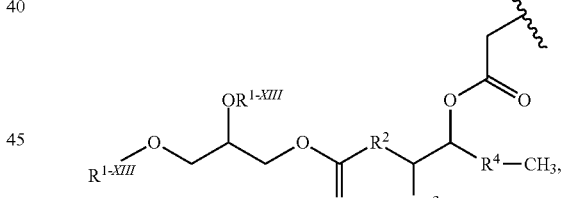

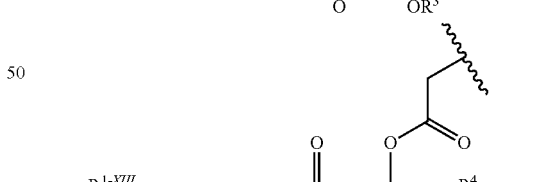

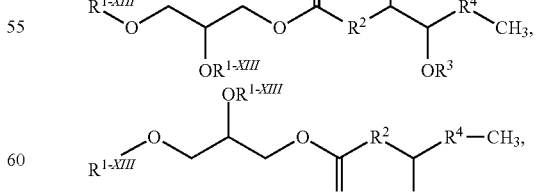

-continued

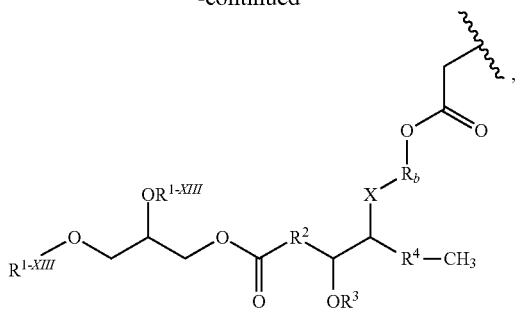

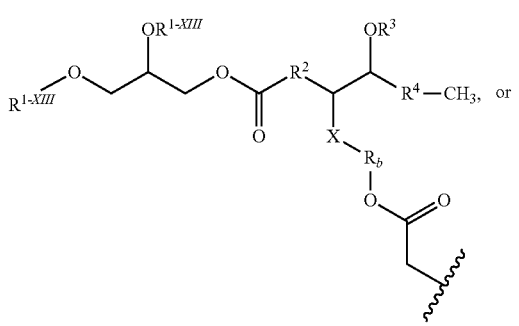

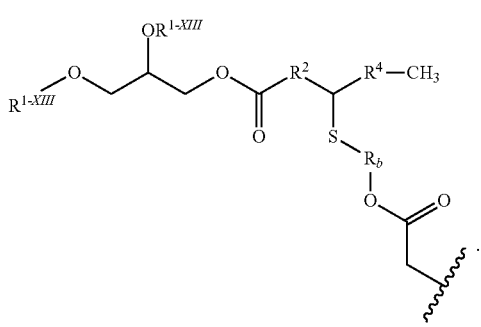

In several embodiments, the polytriglyceride-β-ketoester composition may be formed by any of the methods described herein for forming the polytriglyceride-β-ketoester composition.

In various embodiments, an article including a surface coated with a polytriglyceride-β-ketoester composition is provided. The polytriglyceride-β-ketoester composition may be any polytriglyceride-β-ketoester composition described herein. The polytriglyceride-β-ketoester composition may be formed by any of the methods described herein for forming the polytriglyceride-β-ketoester composition. The surface may be a metal surface. The article may be a beverage or food container. The polytriglyceride-β-ketoester composition may form a coating on an interior surface of the beverage or food container. The surface may include a foil or metal packaging material. The surface may include one or more of: low carbon steel, aluminum, anodized aluminum, silver, and alloys or mixtures thereof. The surface may be one or more of an interior surface or an exterior surface of a medical device. The polytriglyceride-β-ketoester composition may form a cross-linked coating on one or more of the interior surface and the exterior surface of the medical device. Further, silver may be included by one or more of: the interior surface, the exterior surface, and the polytriglyceride-β-ketoester composition forming the cross-linked coating. The silver may be in ionic or oxide form. The article may be formed with the surface coated with the polytriglyceride-β-ketoester composition by any of the methods described herein for forming the polytriglyceride-β-ketoester composition.

In various embodiments, a method for preparing a β-ketoimide composition is provided. The method may include: contacting a primary amine with a β-ketoester to form a reaction mixture; and allowing the primary amine and the β-ketoester to react effective to form the β-ketoimide.

In some embodiments, the method may include removing an alcohol byproduct from the reaction mixture by one of: distillation, contact with a molecular sieve, and reduced pressure. The method may include allowing the primary amine and the β-ketoester to react at a temperature in ° C. of at least about one or more of: 140, 150, 160.170, 180, 190, and 200. The method may include allowing the primary amine and the β-ketoester to react for a period of time in minutes of at least about one or ore of: 30, 60, 90, 120, 150, 180, 210, 240, 270, 300, 330, 360, 390 and 420. The method may include removing one or more of an unreacted primary amine and an unreacted β-ketoester from the reaction mixture by one of: distillation and reduced pressure. The β-ketoester may be represented by Formula XIV:

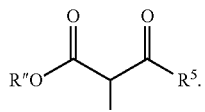

R″ may be methyl, ethyl, t-butyl, or phenyl. R may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^8$ may be H, optionally hydroxylated $C_1$-$C_8$ alkyl, or optionally hydroxylated $C_6$-$C_{10}$ aryl.

In some embodiments, the β-ketoimide composition may be represented by Formula XIX.

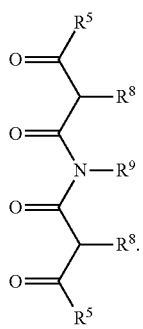

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^8$ may be H, $C_1$-$C_8$ alkyl, or $C_6$-$C_{10}$ aryl. $R^9$ may be $C_1$-$C_8$ alkyl or $C_6$ aryl optionally substituted with one or more of: nitro, carbonyl, haloalkyl, and halogen. The primary amine may be a diamine.

In several embodiments, the β-ketoimide composition may be represented by Formula VII:

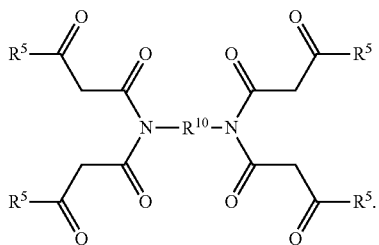

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{10}$ may be $C_2$-$C_6$ alkyl, $C_3$-$C_5$ heteroaryl, or $C_6$ aryl optionally substituted with one or more of: nitro, carbonyl, haloalkyl, and halogen.

In various embodiments, a β-ketoimide composition is provided. The ketoimide composition may include at least one tertiary β-ketoimide. For example, the β-ketoimide composition may be represented by Formula XIX:

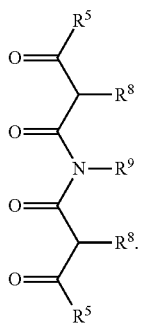

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^8$ may be H, $C_1$-$C_8$ alkyl, or $C_6$-$C_{10}$ aryl. $R^9$ may be $C_1$-$C_8$ alkyl or $C_6$ aryl optionally substituted with one or more of: nitro, carbonyl, haloalkyl, and halogen. For example, the β-ketoimide composition may be represented by Formula XII:

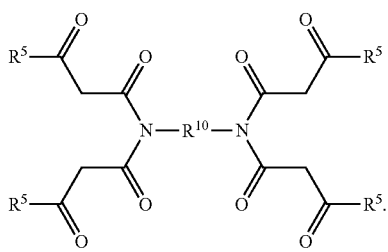

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl. $R^{10}$ may be $C_2$-$C_6$ alkyl, $C_3$-$C_5$ heteroaryl, or $C_6$ aryl optionally substituted with one or more of: nitro, carbonyl, haloalkyl, and halogen.

In several embodiments, the β-ketoimide composition may be represented by Formula XVI:

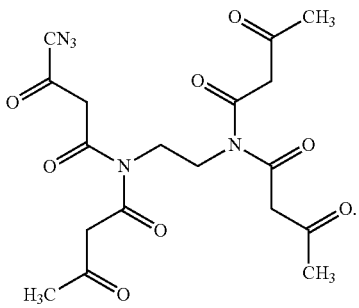

In some embodiments, the the β-ketoimide composition may be represented by Formula XVII:

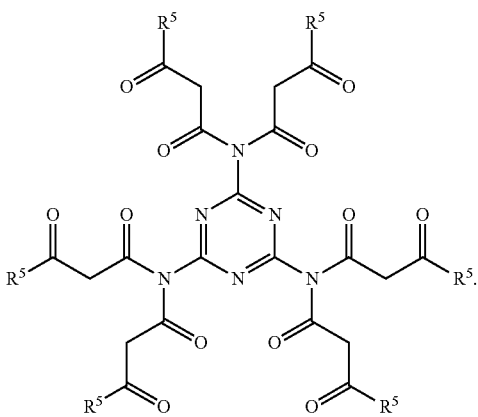

$R^5$ may be optionally hydroxylated $C_1$-$C_8$ alkyl, optionally hydroxylated $C_2$-$C_8$ alkenyl, optionally hydroxylated $C_6$-$C_{10}$ aryl, or optionally hydroxylated $C_4$-$C_{10}$ heteroaryl.

In various embodiments, a method for preparing a AAG composition is provided. The method may include providing a poly-functional compound including two or more functional groups. Each functional group may independently be hydroxy, amino, or alkenyl. The method may include reacting the poly-functional compound under conditions effective to form the AAG composition by one or more of the following. For example, the method may include reacting the poly-functional compound under conditions effective to form the AAG composition by contacting the poly-functional compound with a ketene compound, wherein the poly-functional compound includes at least one hydroxy group. The method may include reacting the poly-functional compound under conditions effective to form the AAG composition by contacting the poly-functional compound with a β-ketoester, wherein the poly-functional compound includes at least one hydroxy or amino group. The method may include reacting the poly-functional compound under conditions effective to form the AAG composition by contacting the poly-functional compound with a peroxo reagent and one or more of: a β-ketoimide, a β-ketoester, and a β-ketoacid, wherein the poly-functional compound includes at least one alkenyl group. The method may include reacting the poly-functional compound under conditions effective to form the AAG composition by contacting the poly-functional compound with a mercaptoalkanol in the presence of an initiator effective to form a mercaptoalkanol-substituted compound. The poly-functional compound may include at least one alkenyl group. The method may include further reacting the mercaptoalkanol-substituted compound with one or more of: the β-ketoester and the β-ketoacid effective to form the AAG composition.

In some embodiments, the poly-functional compound is a natural oil derived from any organism, for example, plants, mammals, reptiles, fish, mollusks, crustaceans, fungi, algae, diatoms, and the like. In some embodiments, the poly-functional compound may exclude triglycerides derived from oil of one or more of: legume seeds, non-legume seeds, and terrestrial animal fat. In some embodiments, the poly-functional compound may include triglyceride-derived oils from marine, non-terrestrial plant and animal sources, e.g., marine plants (e.g., water hyacinth), marine mammals, marine reptiles, fish, mollusks, crustaceans, marine microorganisms (e.g., fungi, bacteria, algae, diatoms), and the like, or in some embodiments, marine sources such as marine plants (e.g., water hyacinth), marine mammals, marine reptiles, fish, mollusks, crustaceans, marine microorganisms (e.g., fungi, bacteria, algae, diatoms), and the like. In some embodiments, the poly-functional compound may exclude triglyceride-derived oils from any source.

In several embodiments, the method may be conducted substantially in the absence of solvent.

The method may include contacting the poly-functional compound with the i-ketoester to form a reaction mixture. The poly-functional compound may include one or more of the hydroxyl group; and the amino group. The method may include allowing the poly-functional compound and the β-ketoester to react substantially in the absence of solvent effective to form the AAG composition.

For example, the polyfunctional compound may be a polyol and the corresponding AAG composition may be a polyol-AAG composition. The polyfunctional compound may be a polyamine and the corresponding AAG composition may be a polyamine-AAG composition. The polyfunctional compound may be a polyol-polyamine and the corresponding AAG composition may be a polyol-polyamine-AAG composition.

In some embodiments, the method may include removing an alcohol byproduct from by one or more of: distillation, reduced pressure, and contact with a molecular sieve. The method may include reacting the poly-functional compound, e.g., with the β-ketoester, under an inert atmosphere. The method may include allowing the polyfunctional compound to react, e.g., with the β-ketoester, at a temperature in ° C. of at least about one or more of: 120.130, 140, 150, 160, 170, 180, 190, and 200, or a range between any two of the preceding values, for example, between about 120 and about 200. The method may include allowing the poly-functional compound to react, e.g., with the β-ketoester, for a period of time in hours of at least about one or more of: 0.25, 0.5, 1, 2, 3, 4, 56, 7, 0.8, 9, 10, 15, 20, and 24, or a range between any two of the preceding values, for example, between about 0.25 and about 24.

In several embodiments, at least a portion of the poly-functional compound may be a polyol derived from a pyrolyzed bio-oil. The pyrolyzed bio-oil may be derived from pyrolysis of one or more of: hardwood, softwood, grass, reeds, bagasse, sugarcane, corn stover, and sorghum. At least a portion of the poly-functional compound may be a polyol derived from alkoxylated pyrolyzed bio-oil. At least a portion of the poly-functional compound may include one or more of a phenol, a cresol, a guaiacol, and a syringol. At least a portion of the poly-functional compound may include one or more of: pyrogallol, catechol, resorcinol, hydroquinone, lignin, and diphenolic acid. In some embodiments, at least a portion of the poly-functional may include an unsaturated non-triglyceride oil derived from a marine organism, a mammal, and an insect. The marine organism may include, for example one or more of: algae, water hyacinth, bacteria, and diatoms. The poly-functional compound may include lignin or derivatives thereof. The poly-functional compound may be derived from a petroleum source. For example the poly-functional compound may include a petroleum derived polyol, a petroleum-derived polyamine, a petroleum-derived polyalkene, or a composite or combination thereof. In some embodiments, the poly-functional compound may be derived from a natural source, such as a natural oil as described herein, e.g., in some embodiments, a natural oil excluding a triglyceride. In several embodiments, the poly-functional compound may exclude compounds derived from a petroleum source.

The poly-functional compound may be a polyol and the AAG may be a polyol-AAG. The poly-functional compound may include a $C_2$-$C_{20}$ compound substituted with at least one hydroxyl group. At least a portion of the poly-functional compound may be a polyol derived from a hydroxyl-containing fatty acid ester.

In some embodiments, at least a portion of the poly-functional compound may be a polyol derived from one or more of: a hydroxyl-containing triglyceride and a hydroxyl-containing fatty acid ester. At least a portion of the poly-functional compound may be represented by Formula XX:

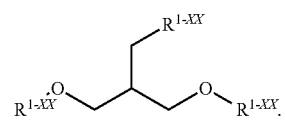

Each $R^{1\text{-}XX}$ may independently be:

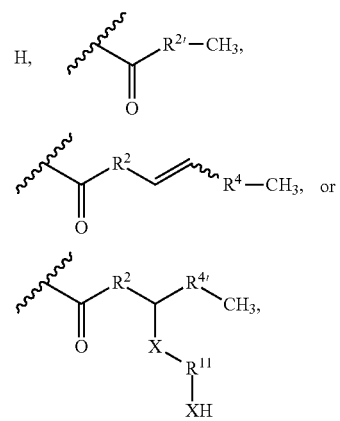

provided that at least one $R^{1\text{-}XX}$ may be:

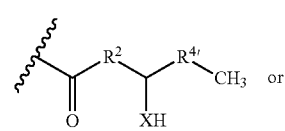

-continued

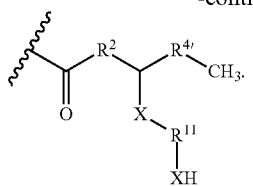

$R^{2'}$ may be $C_2$-$C_{26}$ alkyl, optionally substituted with —OH or —NH$_2$. $R^2$ may be $C_2$-$C_{25}$ alkyl or $C_2$-$C_{25}$ alkenyl, optionally substituted with —OH or —NH$_2$. $R^4$ may be a bond, or $C_1$-$C_{25}$ alkyl, $C_2$-$C_{25}$ alkenyl, or $C_2$-$C_{25}$ epoxyalkyl, optionally substituted with —OH or —NH$_2$. $R^{4'}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S—, or —NH—.

In several embodiments, at least a portion of the polyol represented by Formula XX may be derived from an unsaturated triglyceride. The unsaturated triglyceride may be modified by an electrophilic addition of one or more of: a $C_2$-$C_{12}$ diol, a $C_2$-$C_{12}$ alkanol amine, and a $C_2$-$C_{12}$ diamine to an alkene of the unsaturated fatty acid ester.

In various embodiments, the ketene compound may include one or more of: 4-methyleneoxetan-2-one, 4-ethylidene-3-methyloxetan-2-one, and 4-benzylidene-3-phenyloxetane-2-one. The ketene compound may be derived from one or more of: an α-diazo ketone and an α-halo acyl halide. The ketene compound may be optionally substituted with one or more of: $C_1$-$C_8$ alkyl and $C_6$-$C_{10}$ aryl.

In various embodiments, the β-ketoester may be represented by Formula XIV:

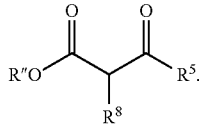

R″ may be $C_1$-$C_8$ alkyl or $C_6$-$C_{10}$ aryl. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^8$ may be H, $C_1$-$C_8$ alkyl, or $C_6$-$C_{10}$ aryl.

In several embodiments, the peroxo reagent may include one or more of: hydrogen peroxide, manganese dioxide, sodium percarbonate, potassium percarbonate, sodium perborate, potassium perborate, and the like.

In some embodiments, the β-ketoimide may be represented by Formula VI:

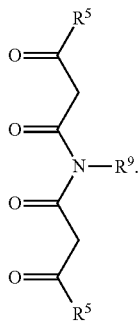

$R^5$ may be optionally hydroxylated $C_1$-$C_8$ alkyl, $C_2$-$C_8$ alkenyl $C_6$-$C_{10}$ aryl, or $C_1$-$C_8$ heteroaryl; and $R^9$ may be $C_1$-$C_8$ alkyl or $C_6$ aryl optionally substituted with one or more of: nitro, carbonyl, haloalkyl, and halogen.

In various embodiments, the β-ketoimide may be represented by Formula VII:

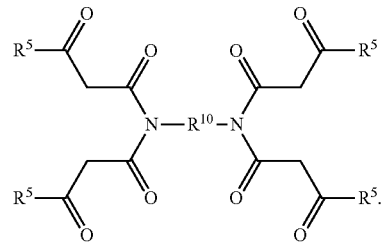

$R^5$ may be optionally hydroxylated $C_1$-$C_8$ alkyl, $C_2$-$C_8$ alkenyl, $C_6$-$C_{10}$ aryl, or $C_4$-$C_8$ heteroaryl; and $R^{10}$ may be a $C_2$-$C_6$ alkyl, $C_3$-$C_5$ heteroaryl, or $C_6$ aryl optionally substituted with one or more of: nitro, carbonyl, halogen, and haloalkyl.

In some embodiments, the β-ketoimide may be represented by Formula VIII:

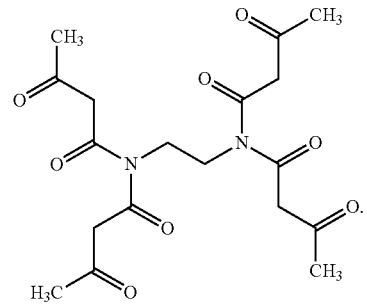

In several embodiments, the β-ketoimide may be represented by Formula VIV:

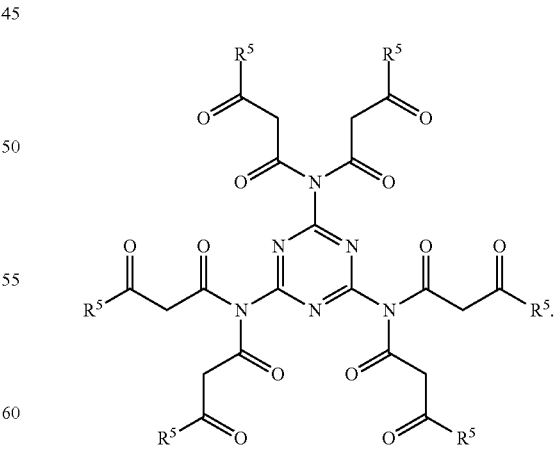

$R^5$ may be optionally hydroxylated $C_1$-$C_8$ alkyl, $C_2$-$C_8$ alkenyl. $C_6$-$C_{10}$ aryl, or $C_4$-$C_8$ heteroaryl.

In various embodiments, the β-ketoacid may be represented by Formula III:

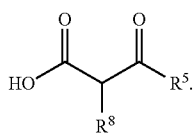

$R^5$ may be optionally hydroxylated $C_1$-$C_8$ alkyl, $C_2$-$C_8$ alkenyl, $C_6$-$C_{10}$ aryl, or $C_4$-$C_{10}$ heteroaryl, and $R^8$ may be H, or optionally hydroxylated $C_1$-$C_8$ alkyl or $C_6$-$C_{10}$ aryl.

In some embodiments, the β-ketoacid may include one or more of: 3-oxobutanoic acid, 3-oxopentanoic acid, 3-oxohexanoic acid, 3-oxo-3-phenylpropanoic acid, and the like.

In some examples, the mercaptoalkanol may be: e.g., a $C_1$-$C_8$ mercaptoalkanol, for example, the mercaptoalkanol may include one or more of: thioglycerol and mercaptoethanol.

In some embodiments, the AAG composition may include a compound represented by Formula XXI:

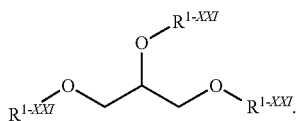

Each $R^{1\text{-}XXI}$ may independently be:

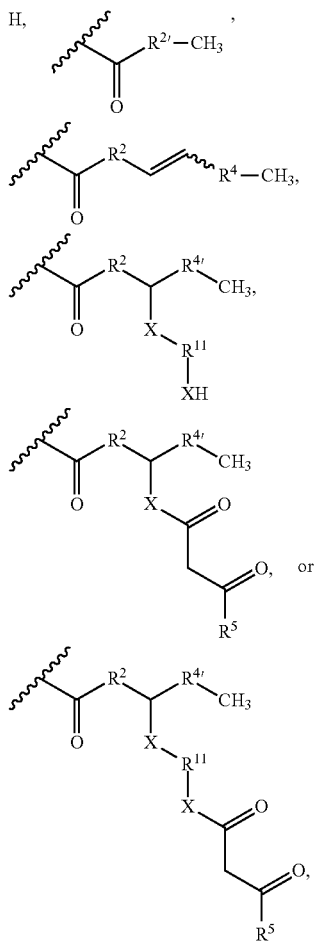

provided that at least one $R^{1\text{-}XXI}$ may be:

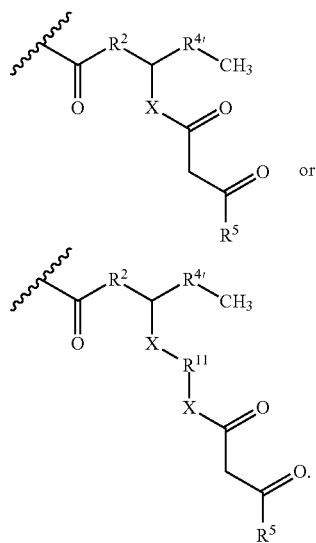

$R^{2'}$ may be $C_2$-$C_{26}$ alkyl, optionally substituted with —OH or —NH$_2$. $R^2$ may be $C_2$-$C_{25}$ alkyl or $C_2$-$C_{25}$ alkenyl, optionally substituted with —OH or —NH$_2$. $R^4$ may be a bond, or $C_1$-$C_{25}$ alkyl, $C_2$-$C_{25}$ alkenyl, or $C_2$-$C_{25}$ epoxyalkyl, optionally substituted with —OH or —NH$_2$. $R^{4'}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^5$ may be $C_1$-$C_8$ alkyl, $C_2$-$C_8$ alkenyl. $C_6$-$C_{10}$ aryl or $C_4$-$C_8$ heteroaryl, optionally substituted with —OH or —NH$_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S—, or —NH—.

In various embodiments, a method for preparing a polyol-AAG composition is provided. The method may include contacting the poly-functional compound in the form of an unsaturated polyol with the peroxo reagent and the β-ketoimide to form a reaction mixture. The method may include allowing the unsaturated polyol, the peroxo reagent, and the β-ketoimide to react effective to form the AAG composition as a polyol-AAG composition.

In some embodiments, the method may include pre-mixing the peroxo reagent and the β-ketoimide prior to contacting the unsaturated polyol. The method may include. The method may include pre-mixing the peroxo reagent and the β-ketoimide at a temperature less than about 25° C. The method may include pre-mixing the unsaturated polyol and the β-ketoimide prior to contacting the peroxo reagent. The method may include allowing the unsaturated polyol, the peroxo reagent, and the β-ketoimide to react at a temperature in ° C. of at least about one or more of: 0, 10, 20, 30, 40, 50, 60, 70, 80, 90, and 100, or a range between any two of the preceding values, for example, between about 0 and about 100. The method may include allowing the unsaturated polyol, the peroxo reagent, and the β-ketoimide to react for a period of time in minutes of at least about one or more of: 5, 10, 15, 20, 30, 40, 60, 90, 120, 150, 170, and 20), or a range between any two of the preceding values, for example, between about S and about 200.

In several embodiments, the method may include, after forming the polyol-AAG composition, contacting the reaction mixture with a reducing agent effective to consume at least a portion of remaining peroxo reagent. Suitable reducing reagents may include, for example, sodium sulfite, sodium thiosulfate, and the like. The method may include, after forming the polyol-AAG composition, purifying the polyol-AAG composition by one or more of: contacting the reaction mixture with one of: water, aqueous brine, and aqueous mild acid; separating an aqueous layer from the reaction mixture; contacting the reaction mixture to a chromatography solid phase, and eluting the polyol-AAG composition from the chromatography solid phase to provide the polyol-AAG composition in at least partly purified form.

In various embodiments, at least a portion of the unsaturated polyol may be derived from pyrolysis bio-oil. The pyrolysis bio-oil may be derived from pyrolysis of one or more of, hardwood, softwood, grass, reeds, bagasse, corn stover, sugarcane, and sorghum. At least a portion of the unsaturated polyol may include an unsaturated triglyceride derived from a marine organism. The marine organism may include one or more of: algae, water hyacinth, bacteria, and diatoms. The algae, water hyacinth, bacteria, and diatoms may be cultured, and/or may be harvested from the ocean. The unsaturated triglyceride may include an unsaturated alkyl-diacylglycerol.

In some embodiments, the β-ketoimide may be represented by Formula VI:

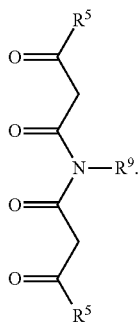

$R^5$ may be optionally hydroxylated: $C_1$-$C_8$ alkyl, $C_2$-$C_8$ alkenyl, $C_6$-$C_{10}$ aryl, or $C_4$-$C_8$ heteroaryl. $R^9$ may be $C_1$-$C_6$ alkyl or $C_6$ aryl optionally substituted with one or more of: nitro, carbonyl, haloalkyl, and halogen. The β-ketoimide may be represented by Formula VII:

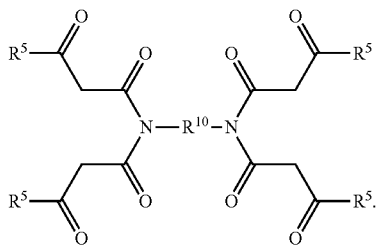

$R^5$ may be optionally hydroxylated $C_1$-$C_8$ alkyl, $C_2$-$C_8$ alkenyl $C_6$-$C_{10}$ aryl, or $C_4$-$C_8$ heteroaryl. $R^{10}$ may be a $C_2$-$C_6$ alkyl, $C_3$-$C_5$ heteroaryl, or $C_6$ aryl optionally substituted with one or more of: nitro, carbonyl, halogen, and haloalkyl. The β-ketoimide may be represented by Formula VIII:

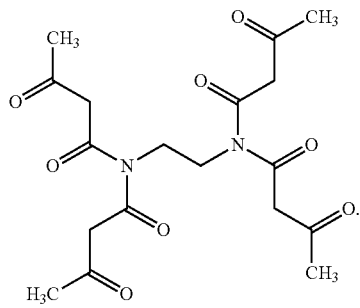

The β-ketoimide may be represented by Formula VIV:

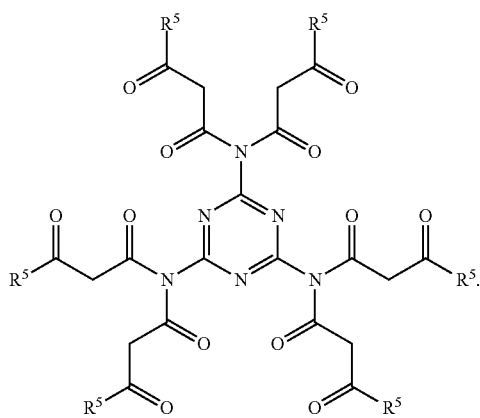

$R^5$ may be optionally hydroxylated: $C_1$-$C_8$ alkyl $C_2$-$C_8$ alkenyl, $C_6$-$C_{10}$ aryl or $C_4$-$C_8$ heteroaryl.

In several embodiments, the peroxo reagent may include one or more oft hydrogen peroxide, manganese dioxide, sodium percarbonate, potassium percarbonate, sodium perborate, potassium perborate, and the like.

In various embodiments of the method, the polyol-AAG composition may include: a polyol unit, at least one hydroxyl group bonded to an alkyl chain of the polyol unit; and a β-ketoester group bonded to a carbon atom of the alkyl chain that may be alpha to a carbon atom bearing the hydroxyl group. The polyol-AAG composition may include a hydroxyl value greater than the unsaturated polyol.

In various embodiments, a method for preparing a poly (AAG)-composition is provided. The method may include contacting an AAG composition, e.g., any AAG composition described herein, with a cross-linking compound to form a reaction mixture. The method may include allowing the AAG composition and the cross-linking compound to react effective to form the poly(AAG) composition. In some embodiments, the AAG composition may be any AAG composition described herein. In some embodiments, the AAG composition may be any AAG composition described herein, provided that the AAG composition is not a triglyceride-AAG composition.

The method may include contacting the AAG composition with the cross-linking compound to form the reaction mixture, the AAG composition being, for example, a AAG-β-ketoester composition. The method may include allowing the AAG composition and the cross-linking compound to react effective to form the AAG composition as, for example, a poly(AAG)-β-ketoester composition.

In some embodiments, the AAG composition may be derived from pyrolyzed bio-oil. The pyrolyzed bio-oil may be derived from pyrolysis of one or more of: hardwood, softwood, grass, reeds, bagasse, corn stover, sugarcane, and sorghum. The AAG composition may be derived from one or more of, a phenol, a cresol, a guaiacol, and a syringol. The AAG composition may be derived from an alkoxylated pyrolyzed bio-oil. The AAG composition may be derived from a hydroxyl-containing fatty acid ester.

In several embodiments, the AAG composition may be derived from a hydroxyl-containing triglyceride. For example, the polyol-AAG composition may include a compound represented by Formula XX:

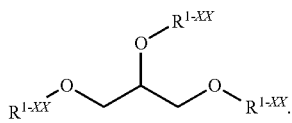

Each $R^{1-XX}$ may independently be:

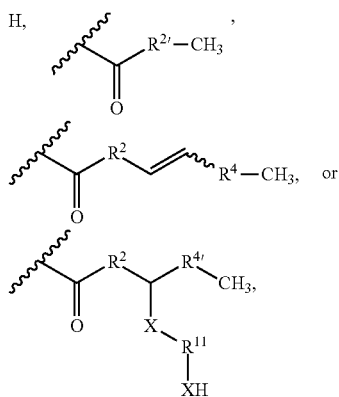

provided that at least one $R^{1-XX}$ may be:

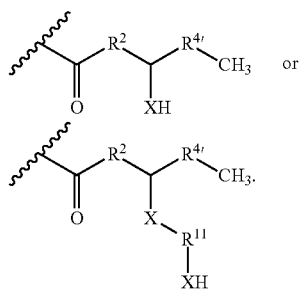

$R^{2'}$ may be $C_2$-$C_{26}$ alkyl, optionally substituted with —OH or —NH$_2$. $R_2$ may be $C_2$-$C_{25}$ alkyl or $C_2$-$C_{25}$ alkenyl, optionally substituted with —OH or —NH$_2$. $R^4$ may be a bond, or $C_1$-$C_{25}$ alkyl, $C_2$-$C_{25}$ alkenyl, or $C_2$-$C_{25}$ epoxyalkyl, optionally substituted with —OH or —NH$_2$. $R^{4'}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^{11}$ may be $C_2$-$C_{25}$ alkyl, $C_6$-$C_{12}$ aryl, or $C_2$-$C_{12}$alkyl-$C_6$-$C_{12}$ aryl. X may be —O—, —S—, or —NH—. The compound represented by Formula XX may be derived from an unsaturated triglyceride modified by an electrophilic addition of one or more of: a $C_2$-$C_{12}$ diol, a $C_2$-$C_{12}$ alkanol amine, and a $C_2$-$C_{12}$ diamine to an alkene of the unsaturated fatty acid ester.

In various embodiments, the method may include contacting the AAG composition with the cross-linking compound in the presence of a surfactant. The method may include allowing the AAG composition and the cross-linking compound to react at a temperature in ° C. of at least about one or more of: 140, 150, 160, 170, 180, 190, and 200, or a range between any two of the preceding values, for example, between about 140 and about 200. The method may include allowing the AAG composition and the cross-linking compound to react for a period of time in minutes of at least about one or more of: 5, 10, 15, 20, 25, 30, 35, 40, 45, 50, 55, and 60, or a range between any two of the preceding values, for example, between about 5 and about 60. The method may include contacting the AAG composition with the cross-linking compound in the presence of one or more of: an inert atmosphere; water; a blowing agent; and a base. The base may include one or more of: magnesium hydroxide, zirconium hydroxide, aluminum hydroxide, and the like.

In some embodiments, the method may include applying the reaction mixture to a surface. The method may include heating the reaction mixture and the surface effective to form the poly(AAG)-composition, e.g., the poly(AAG)-β-ketoester composition, as a cross-linked coating on the surface. The method may include contacting the AAG composition and the cross-linking compound to form the reaction mixture at about 25° C. for less than 3 minutes. The method may include applying the reaction mixture onto the surface. The method may include heating the reaction mixture and the surface at a temperature of about 180° C. for 30 minutes effective to form the poly(AAG)-composition, e.g., the poly(AAG)-β-ketoester composition, as a cross-linked coating on the surface. The surface may be a metal surface. The surface may be an interior surface of a food or beverage container. The surface may include a foil or metal packaging material. The surface may include one or more of: low carbon steel, aluminum, anodized aluminum, silver, and alloys or mixtures thereof. The surface may be one or more of an interior surface or an exterior surface of a medical device. The poly(AAG)-compositions, e.g., as a poly(AAG)-β-ketoester composition, may form a cross-linked coating on one or more of the interior surface and the exterior surface of the medical device. Further, silver may be included by one or more of: the interior surface, the exterior surface, and the poly(AAG)-composition, e.g., as the poly(AAG)-β-ketoester composition, forming the cross-linked coating. The silver may be in ionic or oxide form.

In several embodiments, the method may include contacting the AAG composition and the cross-linking compound at about 25° C. The method may include pouring the reaction mixture into a mold, the mold coated in a mold release agent. The cross-linking compound may include one or more of a diisocyanate, a triisocyanate, and a tetraisocyanate. The cross-linking compound may include a polymer including more than one isocyanate group. The cross-linking compound may include one or more isocyanate cross-linking reagents, e.g.: Luprinate M20, PMDI, Desmodur DA-L, Desmodur DN, Bayhydur 302, VESTANAT® T, VESTANAT® HB, VESTANAT® HT, VESTANAT® B, VESTANAT® DS, and like isocyanate cross-linking reagents.

In various embodiments of the method, the poly(AAG)-composition, e.g., as the poly(AAG)-β-ketoester composition, may include a polyol-polyamido-β-ketoester. The polyol-polyamido-β-ketoester may include: a polyol unit; a β-ketoester group located on an alkyl chain of the polyol unit; and an amide group bonded to a carbon of the alkyl chain that may be alpha to a ketone of the β-ketoester. The polyol-polyamido-β-ketoester composition may include a compound represented by Formula XXII:
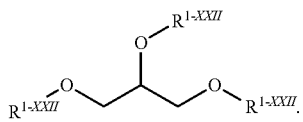
Each $R^{1\text{-}XXII}$ may independently be:
H,
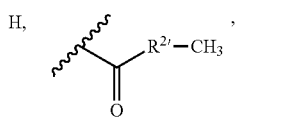
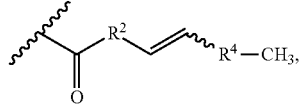
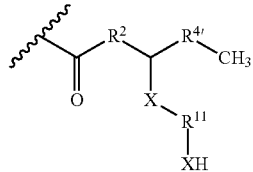
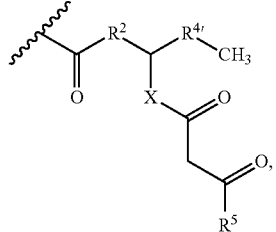
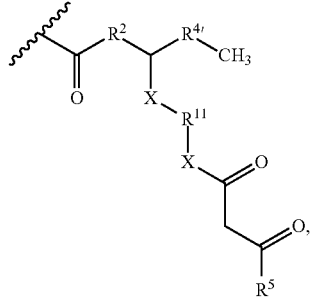
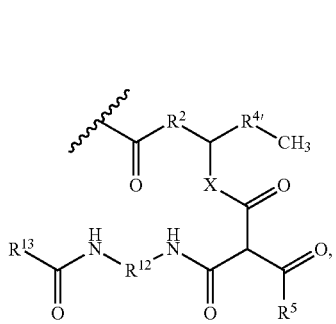
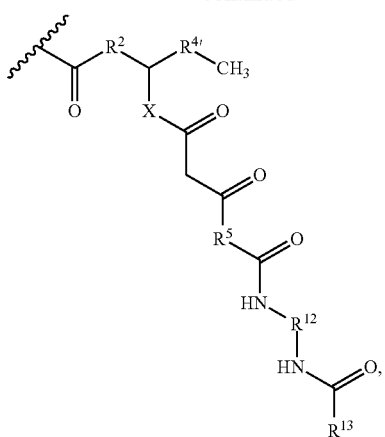
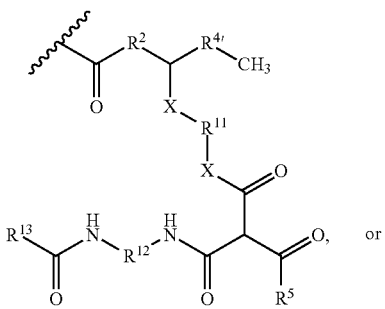
or
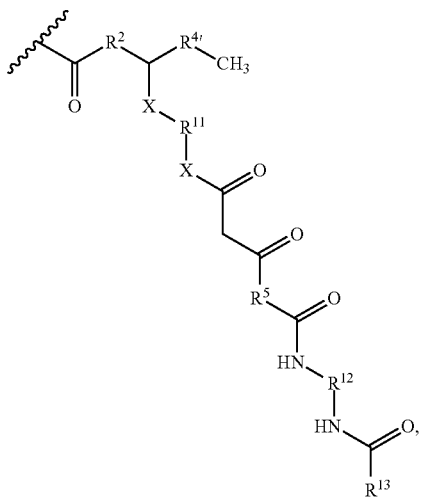
provided that at least one $R^{1\text{-}XXII}$ may be:
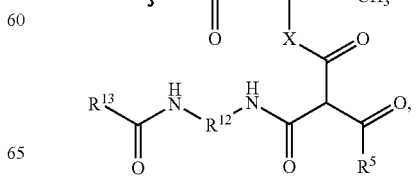

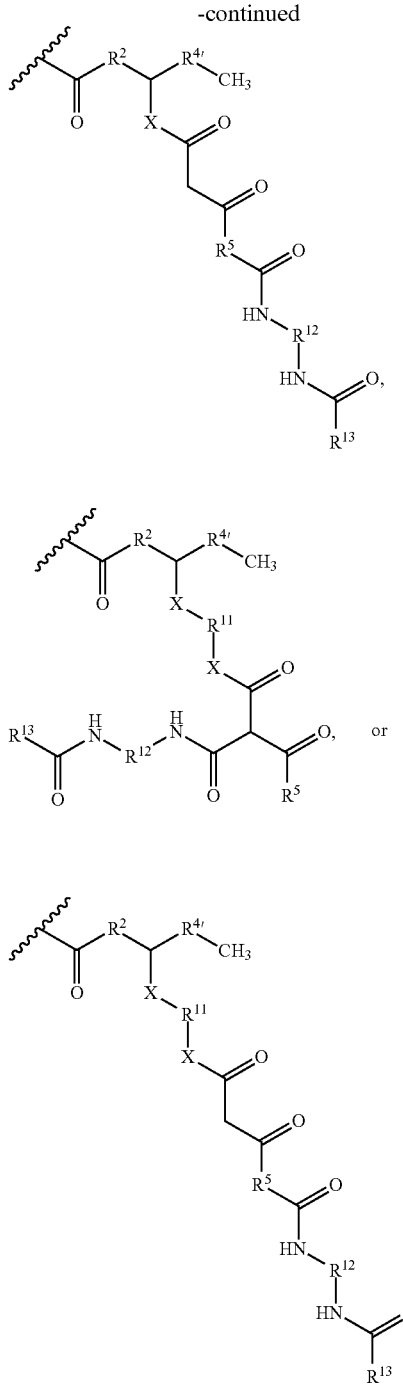

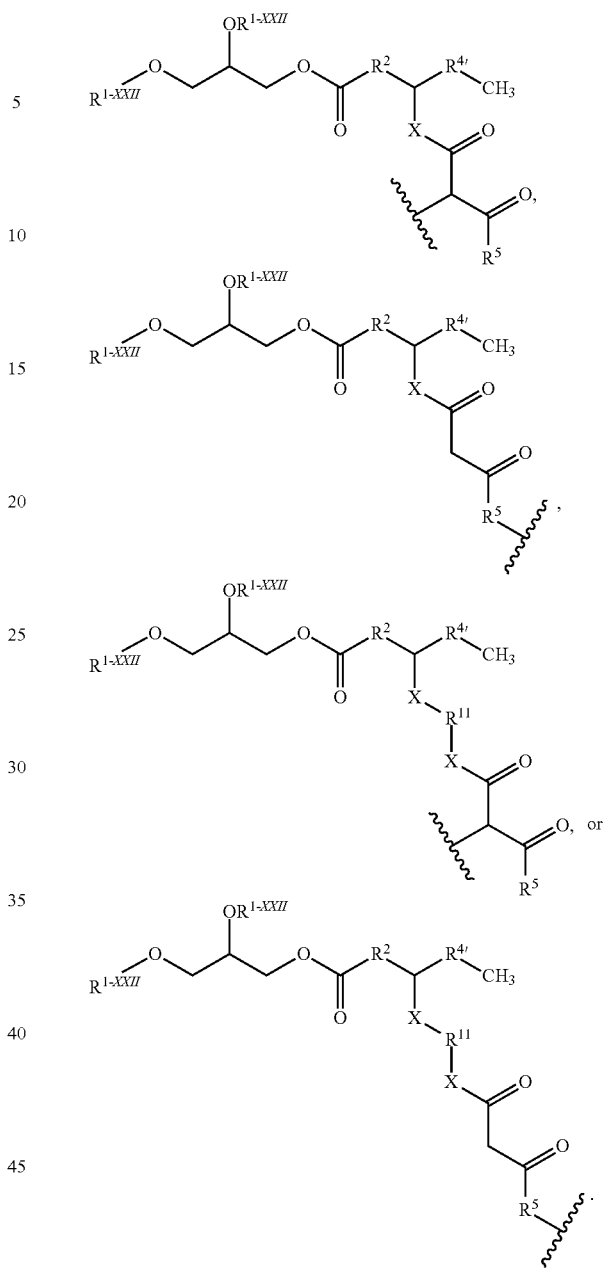

$R^{2'}$ may be $C_2$-$C_{26}$ alkyl, optionally substituted with —OH or —$NH_2$. $R^2$ may be $C_2$-$C_{25}$ alkyl or $C_2$-$C_{25}$ alkenyl, optionally substituted with —OH or —$NH_2$. $R^4$ may be a bond, or $C_1$-$C_{25}$ alkyl, $C_2$-$C_{25}$ alkenyl, or $C_2$-$C_{25}$ epoxyalkyl, optionally substituted with —OH or —$NH_2$. $R^{4'}$ may be a bond; or $C_1$-$C_{25}$ alkyl, $C_2$-$C_{25}$ alkenyl, or $C_2$-$C_{25}$ epoxyalkyl, optionally substituted with —OH or —$NH_2$. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —$NH_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S—, or —NH—. $R^{12}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R^{13}$ may be:

In some embodiments, the cross-linking compound may include one or more of: a hemiaminal, a hemiaminal ether, a hemiaminal thioether an aromatic hemiaminal, an aromatic hemiaminal ether, an aromatic hemiaminal thioether, a polymer including a hemiaminal, a polymer including a hemiaminal ether, and a polymer including a hemiaminal thioether. The cross-linking agent may include one or more hemiaminal cross-linking reagents (e.g., the CYMEL™ series from Allnex USA, Inc., Alpharetta, Ga.), such as CYMEL™ 303, CYMEL® 300. CYMEL™ 301, CYMEL™ 303 LF, CYMEL™ 304, CYMEL™ 350, CYMEL™ 3745, CYMEL™ XW 3106, CYMEL™ MM-100, CYMEL™ 323, CYMEL™ 325, CYMEL™ 327, CYMEL™ 328, CYMEL™ 385, CYMEL™ 370, CYMEL™ 373, CYMEL™ 380, and the like. The method may include contacting the AAG composition with the cross-linking compound in the presence of an acid catalyst.

The acid catalyst may include one or more of: p-toluene sulfonic acid; methane sulfonic acid; a $C_1$-$C_8$ carboxylic acid; a $C_1$-$C_8$ halocarboxylic acid, e.g., trifluoromethane sulfonic acid, chloroacetic acid, dichloroacetic acid, trichloroacetic acid, and the like; a polymeric sulfonic acid resin, and the like. The method may include contacting the AAG composition with the cross-linking compound in the presence of a Lewis acid catalyst, e.g., boron trifluoride. The method may include removing an alcohol byproduct from the reaction mixture by one or more of: distillation, reduced pressure, and contact with a molecular sieve.

In several embodiments of the method, the poly(AAG)-composition, e.g., as the poly(AAG)-β-ketoester composition, may include a polyol polyamino-β-ketoester. The polyol polyamino-β-ketoester may include: a polyol unit; a β-ketoester group bonded to an alkyl chain of the polyol unit, amid an amine group bonded to a carbon beta to a ketone of the β-ketoester. The poly(AAG)-composition, e.g., as the polyol polyamino-β-ketoester composition may include a compound represented by Formula XXIII:

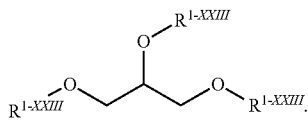

Each $R^{1\text{-}XXIII}$ may independently be:

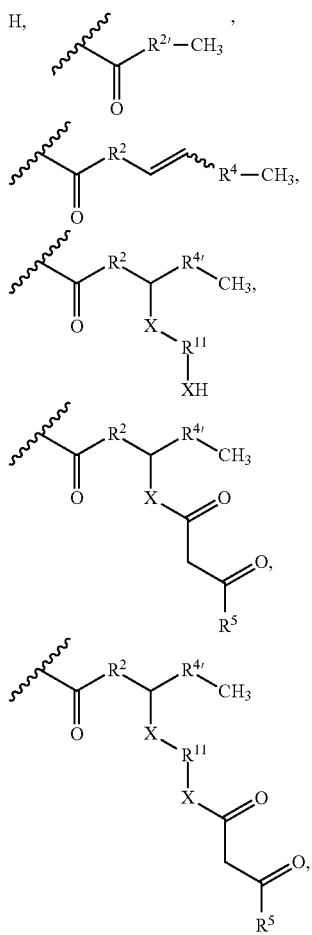

-continued

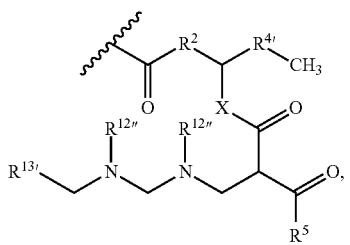

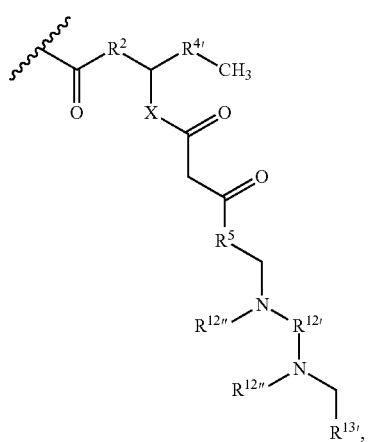

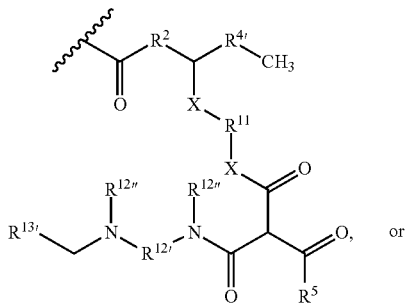

or

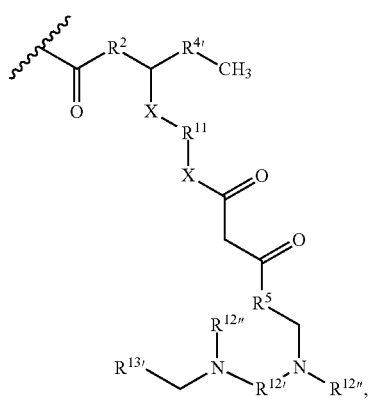

provided that at least one $R^{1\text{-}XXIII}$ may be:

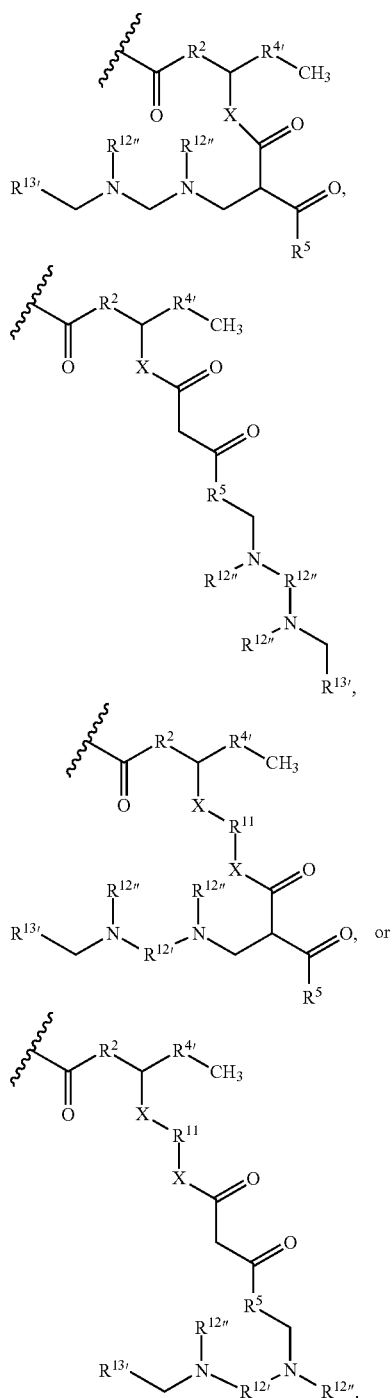

$R^{2'}$ may be $C_2$-$C_{26}$ alkyl, optionally substituted with —OH or —NH$_2$. $R^2$ may be $C_2$-$C_{25}$ alkyl or $C_2$-$C_{25}$ alkenyl, optionally substituted with —OH or —NH$_2$, $R^4$ may be a bond, or $C_1$-$C_{25}$ alkyl, $C_2$-$C_{25}$ alkenyl, or $C_2$-$C_{25}$ epoxyalkyl, optionally substituted with —OH or —NH$_2$. $R^{4'}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^5$ may be $C_1$-$C_8$ alkyl, $C_2$-$C_8$ alkenyl, $C_6$-$C_{10}$ aryl, or $C_2$-$C_{12}$ heteroaryl, optionally substituted with —OH or —NH$_2$. $R^{12'}$ may be $C_2$-$C_{12}$ alkyl, $C_6$-$C_{12}$ aryl or $C_2$-$C_{12}$ alkyl-$C_6$-$C_{12}$ aryl. X may be —O—, —S—, or —NH—. $R^{12'}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R^{12''}$ may be: CH$_2$OH, CH$_2$OCH$_3$, CH$_2$SH, CH$_2$SCH$_3$,

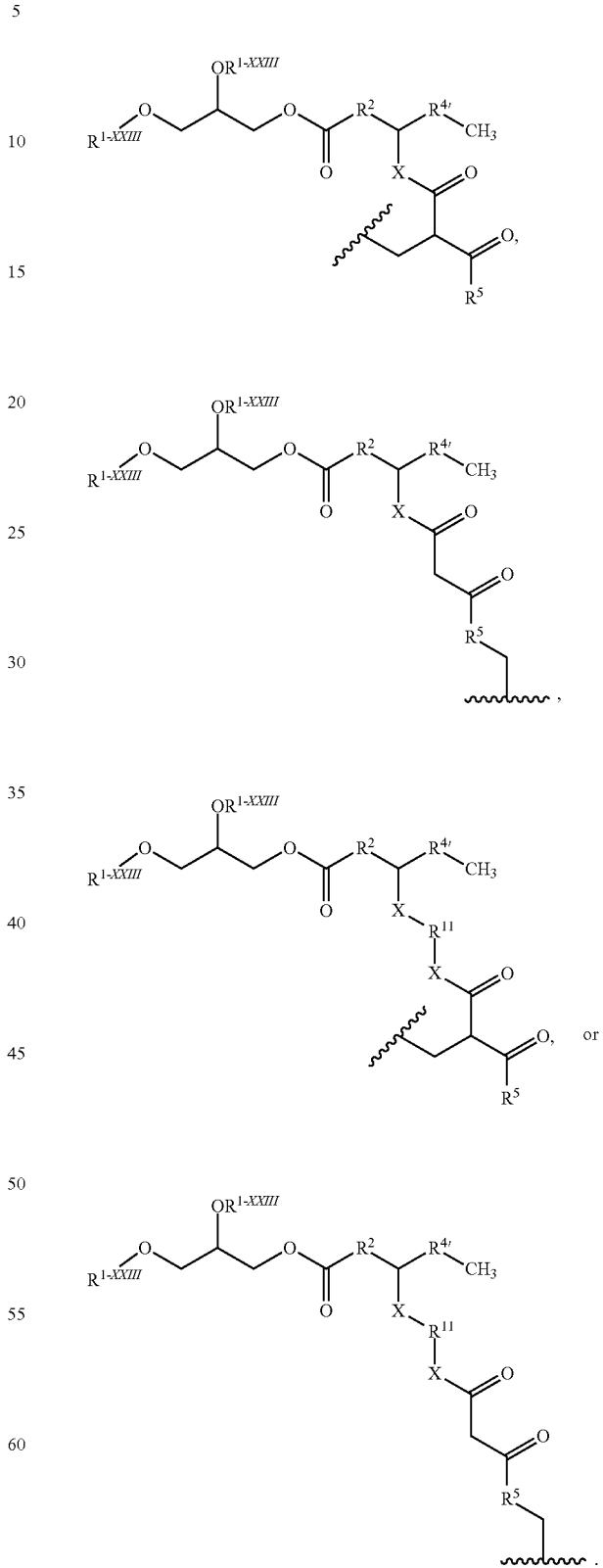

$R^{13'}$ may be:

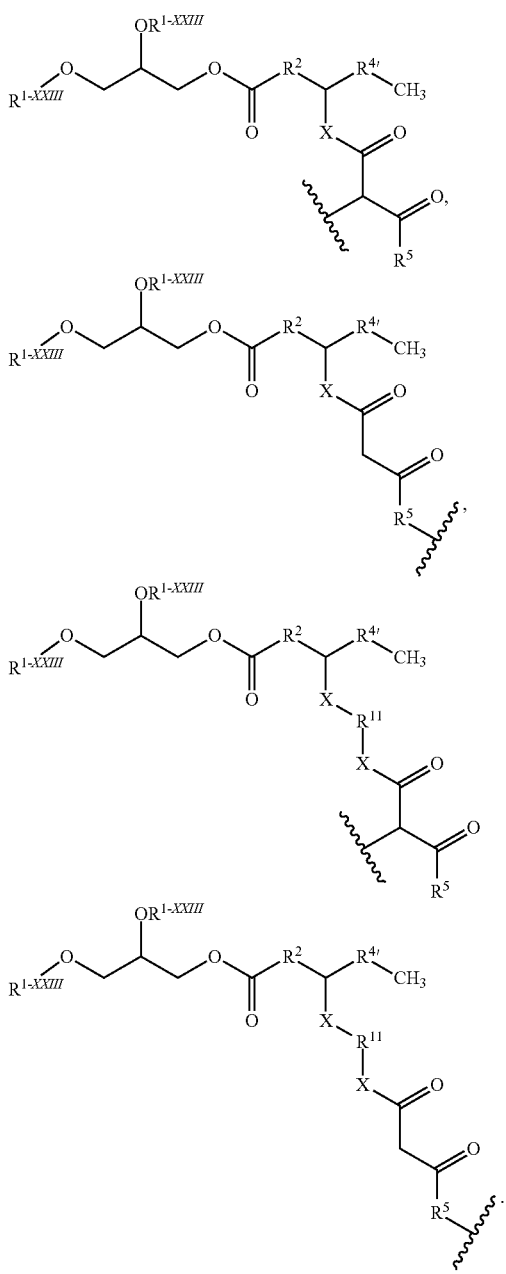

In many embodiments, the crosslinking compound may include a polyamine. For example, the polyamine may include a diamine, triamine, and the like. The polyamine may be aliphatic or cycloaliphatic. The polyamine may be aromatic aryl, or aralkyl. The polyamine may include a mixture of aliphatic, cycloaliphatic, and aromatic polyamines. For example, the polyamine may include any of the ANACAMINE® series (Air Products. Allentown, Pa.), e.g., ANACAMINE® 2049, ANACAMINE® 1110, ANACAMINE® 1482. ANACAMINE® 1608, ANACAMINE® 1617LV, ANACAMINE® 1638, ANACAMINE® 1693, ANACAMINE® 1769, ANACAMINE® 1784. ANACAMINE® 1856, ANACAMINE® 1884, ANACAMINE® 1922A, ANACAMINE® 2014FG, ANACAMINE® 2021. ANACAMINE® 2072, ANACAMINE® 2074, ANACAMINE® 2089M, ANACAMINE® 2143. ANACAMINE® 2280, and the like. The polyamine crosslinking agent may crosslink the AAG composition via imine or enamine linkages.

In various embodiments, the AAG composition may include a polyol polyeneamine-β-ketoester. The polyol polyeneamine-β-ketoester may include, for example, a polyol unit; a β-ketoester group bonded to an alkyl chain of the polyol unit; and an enamine bonded to a keto-carbon of the β-ketoester and effective to cross-link more than one polyol unit.

The cross-linking compound may include one or more of: a dihydrazine and a dihydrazide. The cross-linking compound may include one or more of: adipic dihydrazide, sebacic dihydrazide, oxalyl dihydrazide, succinic dihydrazide, maleic dihydrazide, malic dihydrazide isophthalic dihydrazide, terephthalic dihydrazide and the like.

In several embodiments of the method, the poly(AAG)-composition. e.g., as the poly(polyol)-β-ketoester composition, may include a polyol polyhydrazone-β-ketoester. The polyol polyhydrazone-β-ketoester may include: a polyol unit; a β-ketoester group bonded to an alkyl chain of the polyol unit; and a hydrazone bonded to a keto-carbon of the β-ketoester and effective to cross-link more than one polyol unit. The poly(AAG)-composition. e.g., as the polyol polyhydrazone-β-ketoester composition, may include a compound represented by Formula XXIV:

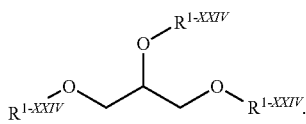

Each $R^{1\text{-}XXIV}$ may independently be:

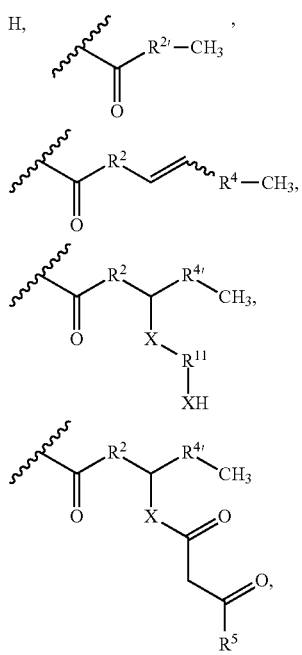

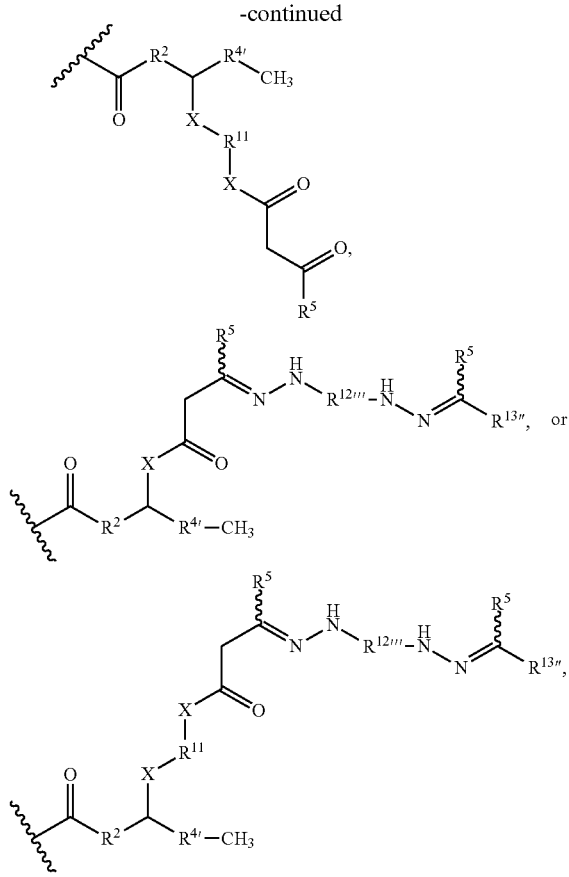

provided that at least one $R^{1\text{-}XXIV}$ may be:

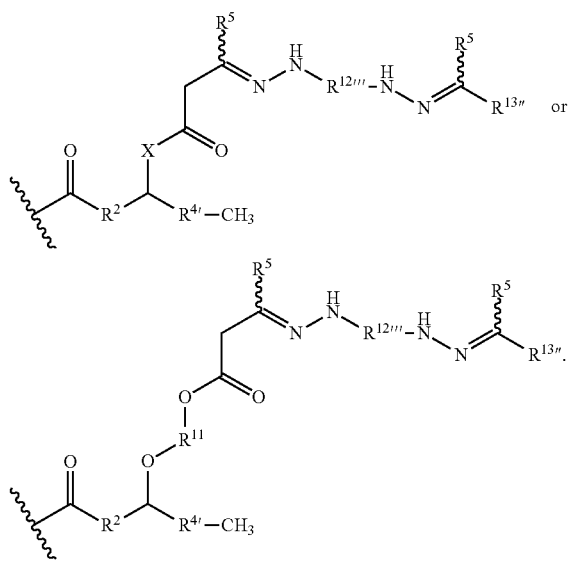

$R^{2'}$ may be $C_2$-$C_{26}$ alkyl, optionally substituted with —OH or —NH$_2$. $R^2$ may be $C_2$-$C_{25}$ alkyl or $C_2$-$C_{25}$ alkenyl, optionally substituted with —OH or —NH$_2$. $R^4$ may be a bond, or $C_1$-$C_{25}$ alkyl, $C_2$-$C_{25}$ alkenyl, or $C_2$-$C_{26}$ epoxyalkyl, optionally substituted with —OH or —NH$_2$. $R^{4'}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S—, or —NH—. $R^{12'''}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R^{13''}$ may be:

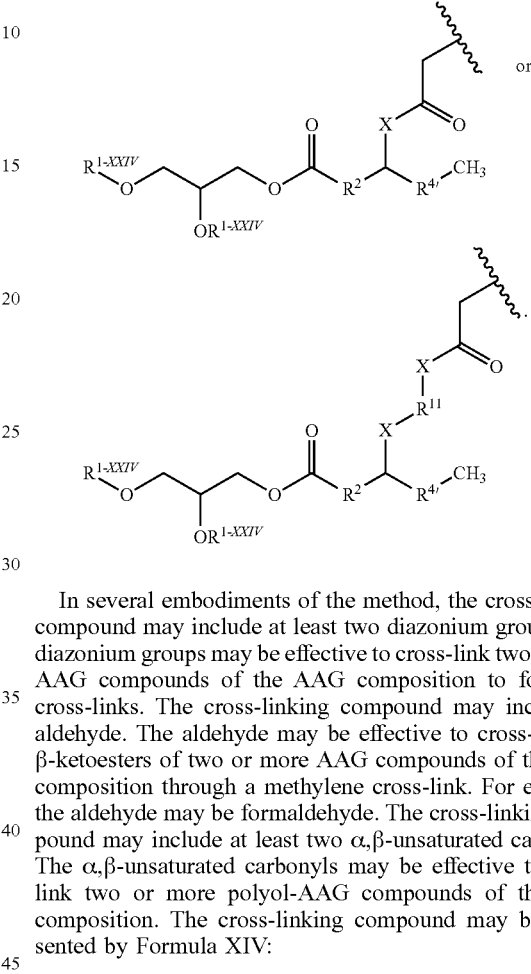

In several embodiments of the method, the cross-linking compound may include at least two diazonium groups. The diazonium groups may be effective to cross-link two or more AAG compounds of the AAG composition to form azo cross-links. The cross-linking compound may include an aldehyde. The aldehyde may be effective to cross-link the β-ketoesters of two or more AAG compounds of the AAG composition through a methylene cross-link. For example, the aldehyde may be formaldehyde. The cross-linking compound may include at least two α,β-unsaturated carbonyls. The α,β-unsaturated carbonyls may be effective to cross-link two or more polyol-AAG compounds of the AAG composition. The cross-linking compound may be represented by Formula XIV:

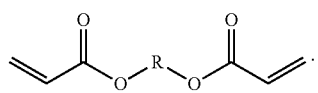

R may be CH$_2$CH$_2$, CH$_2$(CH$_3$)CH, (CH$_2$CH$_2$OCH$_2$CH$_2$)$_n$, or (CH$_2$(CH$_3$)CHOCH$_2$(CH$_3$)CH)$_n$, and n may be an integer from 1 to 50.

In various embodiments, a poly(AAG)-composition is provided. The poly(AAG)-composition may include a polyfunctional moiety derived from a polyol unit, a polyamine unit, a polyalkene unit, or a combination or composite thereof. The poly(AAG)-composition may include a β-ketoester group bonded to an alkyl chain of the polyfunctional moiety. The poly(AAG)-composition may include one or more of the following. The poly(AAG)-composition may include an amide group bonded to a carbon of the alkyl chain that is alpha to a ketone of the β-ketoester such that the poly(AAG)-composition includes a poly(AAG)amido-β-ketoester composition. The poly (AAG)-composition may include an amine group bonded to a carbon on the alkyl chain that is beta to a ketone of the β-ketoester such that the poly(AAG)-composition comprises a poly(AAG)amino-β-ketoester composition. The poly (AAG)-composition may include a hydrazone group bonded to a keto-carbon of the β-ketoester group such that the poly(AAG)-composition comprises a poly(AAG)hydrazone-β-ketoester composition.

The poly(AAG)-composition may be prepared according to any method of preparing the poly(AAG)-composition described herein. The poly(AAG)-composition may be prepared from any AAG-composition as described herein. For example, the poly(AAG)-composition may be prepared from a AAG-composition derived from the poly-functional compound including two or more functional groups. Each functional group may independently be hydroxy, amino, or alkenyl. For example, the poly(AAG)-composition may have structural features corresponding to preparation of the AAG-composition by contacting the poly-functional compound with the ketene compound, wherein the poly-functional compound includes at least one hydroxy group. The poly(AAG)-composition may have structural features corresponding to preparation of the AAG-composition by contacting the poly-functional compound with the β-ketoester, wherein the poly-functional compound includes at least one hydroxy or amino group. The poly(AAG)-composition may have structural features corresponding to preparation of the AAG-composition by contacting the poly-functional compound with a peroxo reagent and one or more of: a β-ketoimide, a β-ketoester, and a β-ketoacid, wherein the poly-functional compound includes at least one alkenyl group. The poly(AAG)-composition may have structural features corresponding to preparation of the AAG-composition by contacting the poly-functional compound with a mercaptoalkanol in the presence of an initiator effective to form a mercaptoalkanol-substituted compound, wherein the poly-functional compound includes at least one alkenyl group; and further reacting the mercaptoalkanol-substituted compound with one or more of: the β-ketoester and the β-ketoacid.

In some embodiments, the poly-functional compound is a natural oil derived from any organism, for example, plants, mammals, reptiles, fish, mollusks, crustaceans, fungi, algae, diatoms, and the like. In some embodiments, the poly-functional compound may exclude triglycerides derived from oil of one or more of: legume seeds, non-legume seeds, and terrestrial animal fat. In some embodiments, the poly-functional compound may include triglyceride-derived oils from marine, non-terrestrial plant and animal sources, e.g., marine plants (e.g., water hyacinth), marine mammals, marine reptiles, fish, mollusks, crustaceans, marine microorganisms (e.g., fungi, bacteria, algae, diatoms), and the like, or in some embodiments, marine sources such as marine plants (e.g., water hyacinth), marine mammals, marine reptiles, fish, mollusks, crustaceans, marine microorganisms (e.g., fungi, bacteria, algae, diatoms), and the like. In some embodiments, the poly-functional compound may exclude triglyceride-derived oils from any source. In some embodiments, the poly(AAG)-composition may be prepared from a AAG-composition excluding the triglyceride AAG composition.

In some embodiments, the poly(AAG) composition, e.g., as a poly(AAG)-β-ketoester composition, e.g., poly(polyol)-β-ketoester composition, may include: a polyol unit a β-ketoester group bonded to an alkyl chain of the polyol unit. The poly(AAG)-β-ketoester composition, e.g., poly(polyol)-β-ketoester composition, may include an amide group bonded to a carbon of the alkyl chain that may be alpha to a ketone of the β-ketoester such that the poly(AAG)-β-ketoester composition, e.g., poly(polyol)-β-ketoester composition, includes a polyol polyamido-β-ketoester composition. The poly(polyol)-β-ketoester composition, e.g., poly(polyol)-β-ketoester composition, may include an amine group bonded to a carbon on the alkyl chain that may be beta to a ketone of the β-ketoester such that the poly(AAG)-β-ketoester composition, e.g., poly(polyol)-β-ketoester composition, includes a polyol polyamino-β-ketoester composition. The poly(AAG)-β-ketoester composition, e.g. poly(polyol)-β-ketoester composition, may include a hydrazone group bonded to a keto-carbon of the β-ketoester group such that the poly(AAG)-β-ketoester composition, e.g., poly(polyol)-β-ketoester composition, includes a polyol polyhydrazone-β-ketoester composition.

In some embodiments, the poly(AAG)-composition, e.g., as the poly(polyol)-β-ketoester composition, may be in the form of one or more of: a cross-linked coating and a cross-linked foam. The poly(AAG)-composition. e.g., as the poly(polyol)-β-ketoester composition, may be in the form of a cross-linked coating on a surface. The poly(AAG)-composition, e.g., as the poly(polyol)-β-ketoester composition, may be in the form of a cross-linked coating on a metal surface. The poly(AAG)-composition, e.g., as the poly(polyol)-β-ketoester composition, may be in the form of a cross-linked coating on an interior surface of a beverage or food container. The surface may include a foil or metal packaging material. The surface may include one or more of: low carbon steel, aluminum, anodized aluminum, silver, and alloys or mixtures thereof. The surface may be one or more of an interior surface or an exterior surface of a medical device. The poly(AAG)-composition. e.g., as the poly(polyol)-β-ketoester composition, may form a cross-linked coating on one or more of the interior surface and the exterior surface of the medical device. Further, silver may be included by one or more of: the interior surface, the exterior surface, and the poly(AAG)-composition, e.g., as the poly(polyol)-β-ketoester composition, forming the cross-linked coating. The silver may be in ionic or oxide form.

In several embodiments, the composition may include the polyol unit; the β-ketoester group bonded to an alkyl chain of the polyol unit; and the amide group bonded to the carbon of the alkyl chain alpha to the ketone of the β-ketoester such that the poly(AAG)-composition, e.g., as the poly(AAG)-β-ketoester composition, includes the polyol polyamido-β-ketoester composition. The polyol polyamido-β-ketoester composition may include a compound represented by Formula XXV:

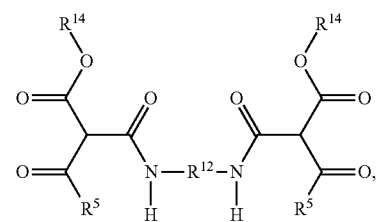

-continued

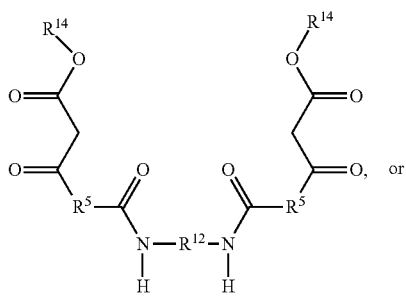

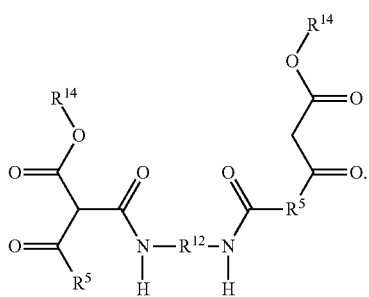

$R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^{12}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R^{14}$ may be a polyol derived from one of: a pyrolyzed bio-oil, a modified triglyceride, and a triglyceride from a marine organism. The polyol polyamido-β-ketoester composition may include a compound represented by Formula XXII:

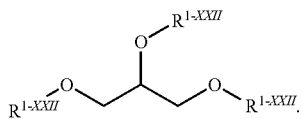

Each $R^{1-XXII}$ may independently be:

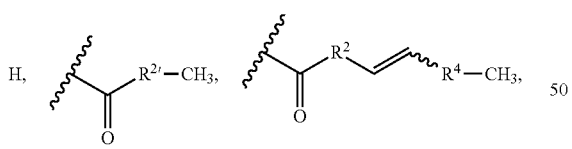

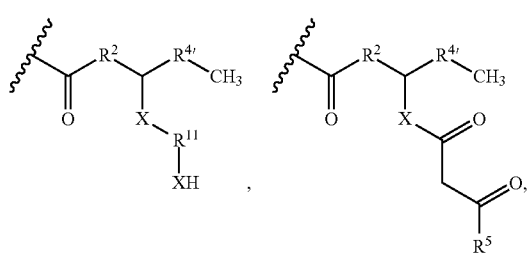

-continued

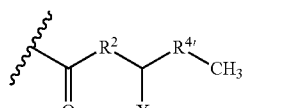

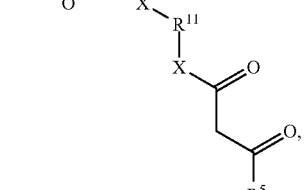

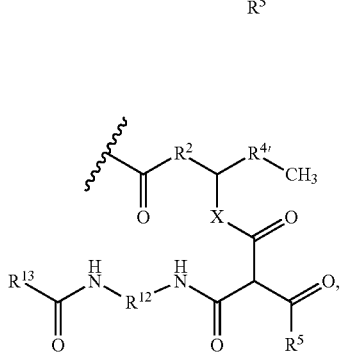

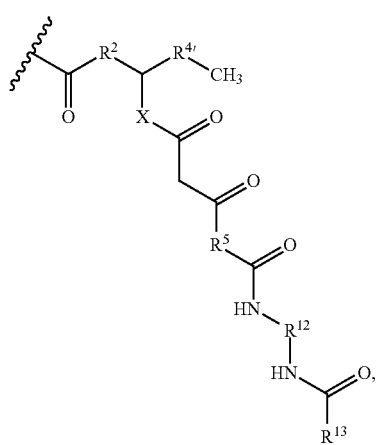

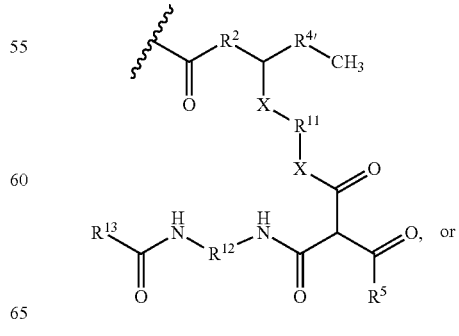

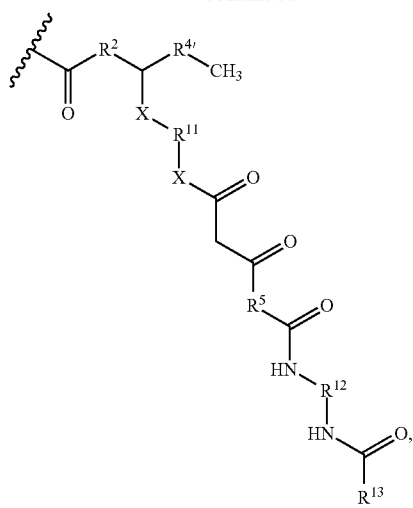

provided that at least one $R^{1-XXII}$ may be:

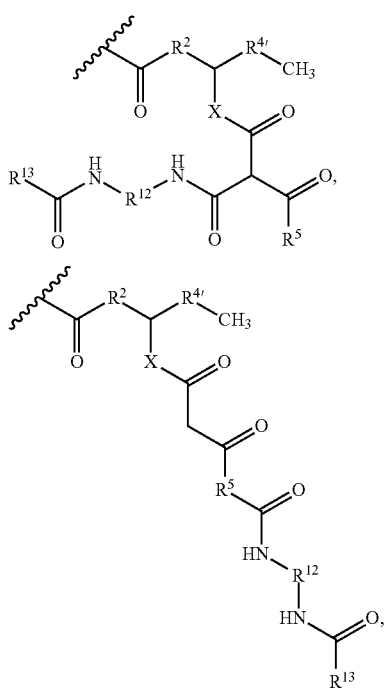

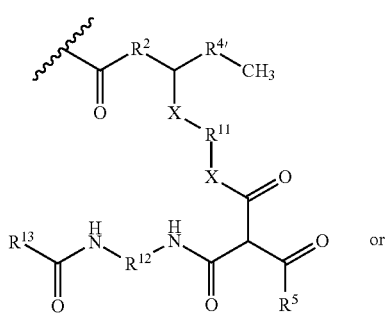

or

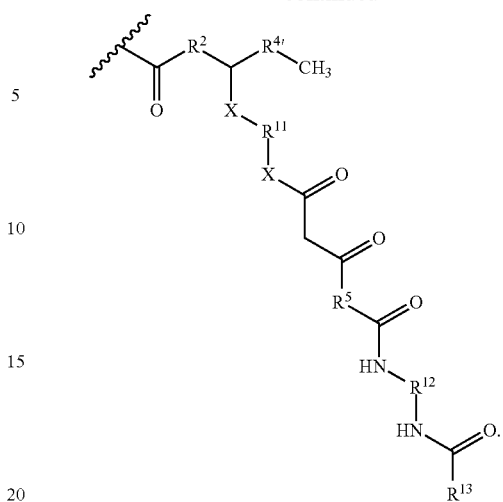

$R^{2'}$ may be $C_2$-$C_{26}$ alkyl, optionally substituted with —OH or —NH$_2$. $R^2$ may be $C_2$-$C_{25}$ alkyl or $C_2$-$C_{25}$ alkenyl, optionally substituted with —OH or —NH$_2$. $R^4$ may be a bond, or $C_1$-$C_{25}$ alkyl, $C_2$-$C_{25}$ alkenyl, or $C_2$-$C_{25}$ epoxyalkyl, optionally substituted with —OH or —NH$_2$. $R^{4'}$ may be a bond; or $C_{11}$-$C_{25}$ alkyl, $C_2$-$C_{25}$ alkenyl, or $C_2$-$C_{25}$ epoxyalkyl, optionally substituted with —OH or —NH$_2$. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^{11}$ may be $C_2$-$C_6$ alkyl, $C_6$-$C_{12}$ aryl, or $C_2$-$C_{12}$ alkyl-$C_6$-$C_{12}$ aryl. X may be —O—, —S—, or —NH—. $R^{12}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl $R^{13}$ may be:

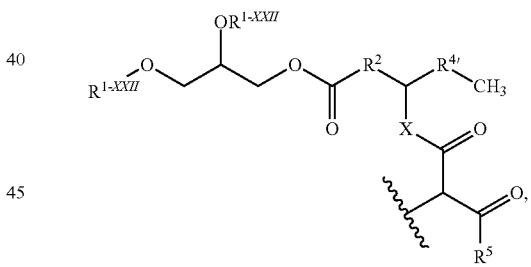

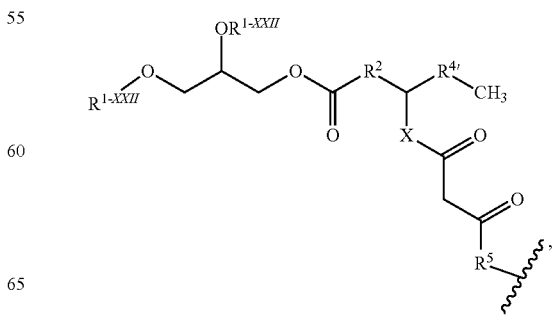

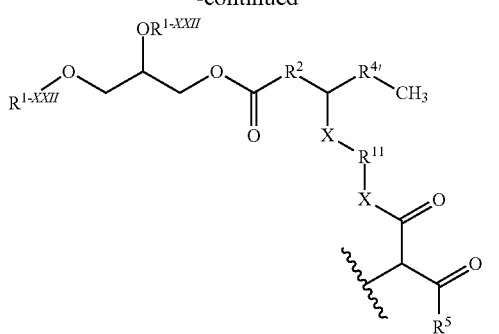

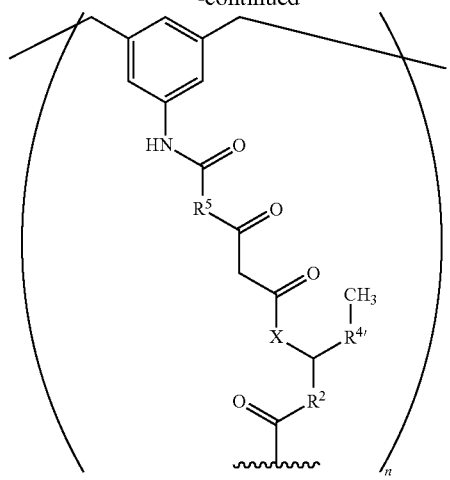

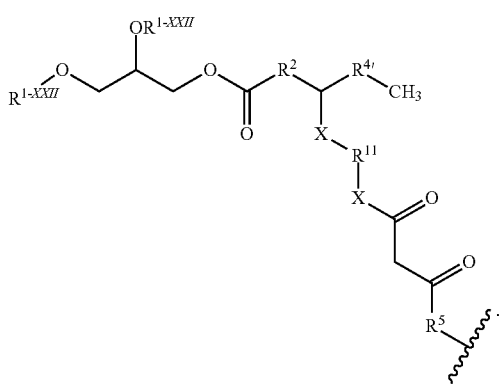

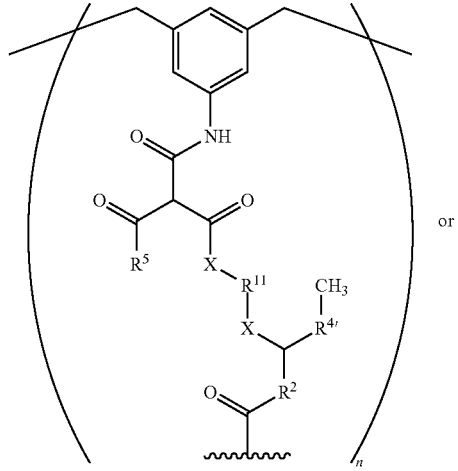

The polyol polyamido-β-ketoester composition may include a compound represented by Formula XXVI:

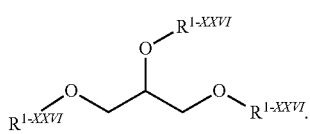

At least one $R^{1-XXVI}$ may be:

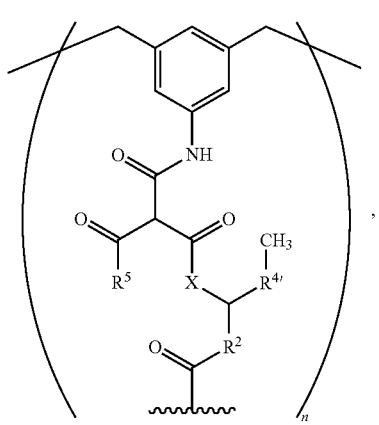

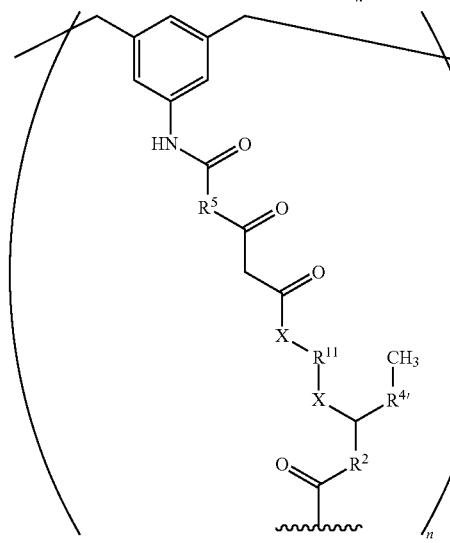

$R^2$ may be $C_2$-$C_{25}$ alkyl or $C_2$-$C_{25}$ alkenyl, optionally substituted with —OH or —NH$_2$. $R^{4\prime}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S—, or —NH—; and n may be an integer from 2 to 200. The polyol polyamido-β-ketoester composition may include a compound represented by Formula XXVII:

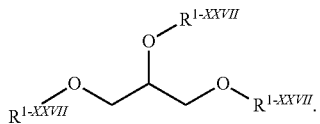

At least one $R^{1-XXVI}$ may be:

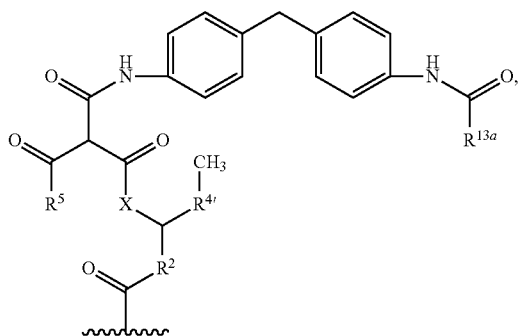

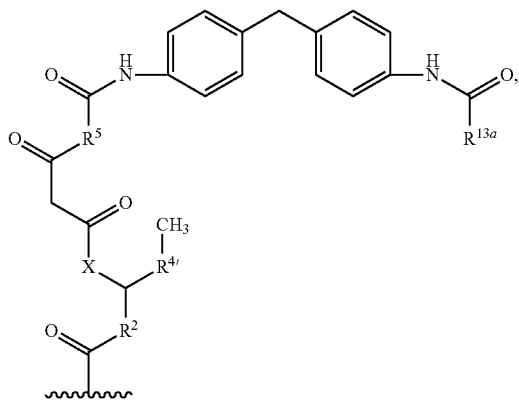

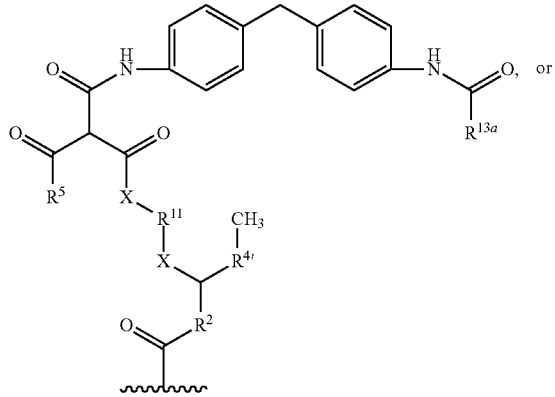

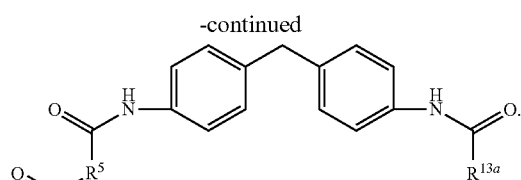

$R^2$ may be $C_2$-$C_{25}$ alkyl or $C_2$-$C_{25}$ alkenyl, optionally substituted with —OH or —NH$_2$. $R^{4\prime}$ may be a bond; or $C_1$-$C_{25}$ alkyl, $C_2$-$C_{25}$ alkenyl, or $C_2$-$C_{25}$ epoxyalkyl, optionally substituted with —OH or —NH$_2$. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S—, or —NH—. $R^{13a}$ may be:

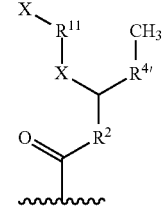

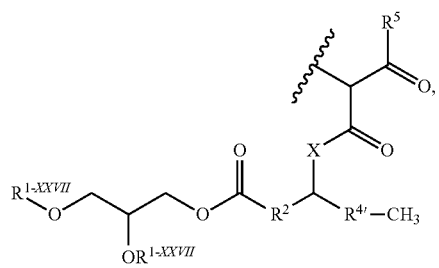

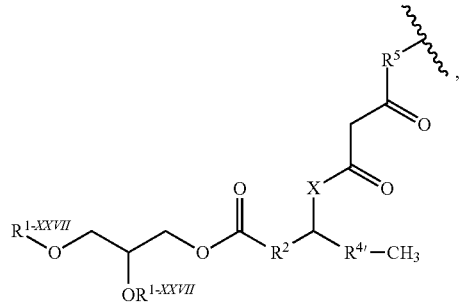

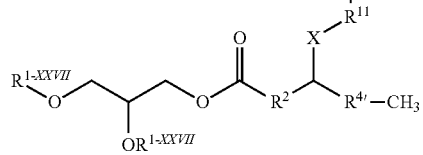

-continued

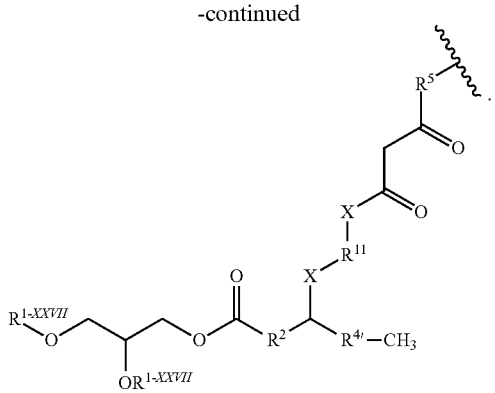

In some embodiments, the composition may include: the polyol unit; the β-ketoester group bonded to the alkyl chain of the polyol unit; and the amine group bonded to the carbon on the alkyl chain that beta to the ketone of the β-ketoester such that the poly(polyol)-β-ketoester composition includes the polyol polyamino-β-ketoester composition. The polyol polyamino-β-ketoester composition may include a compound represented by Formula XXVIII:

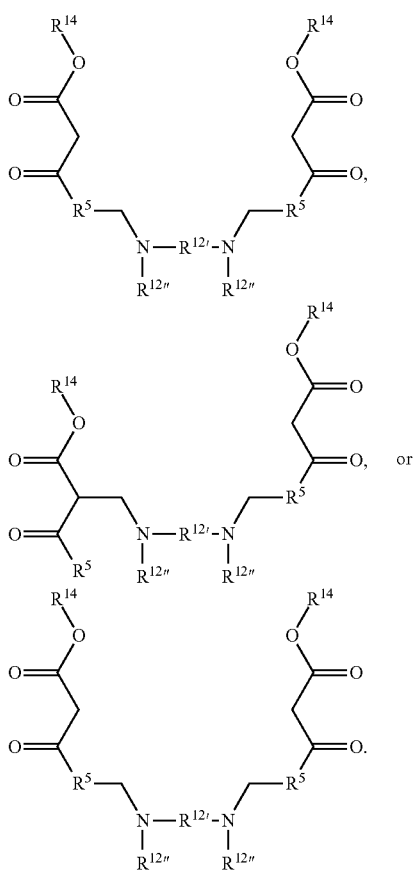

$R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —NH$_2$. $R^{12'}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R^{14}$ may be a polyol derived from one of: a pyrolyzed bio-oil, a modified triglyceride, and a triglyceride from a marine organism. $R^{12''}$ may be: $C_1$-$C_{12}$ alkyl, $C_1$-$C_{12}$ aryl, $CH_2OH$, $CH_2OCH_3$, $CH_2SH$, $CH_2SCH_3$,

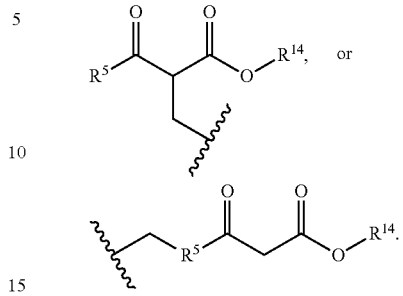

The polyamino-β-ketoester composition may include a compound represented by Formula XXIX:

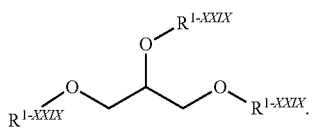

At least one $R^{1\text{-}XXIX}$ may be:

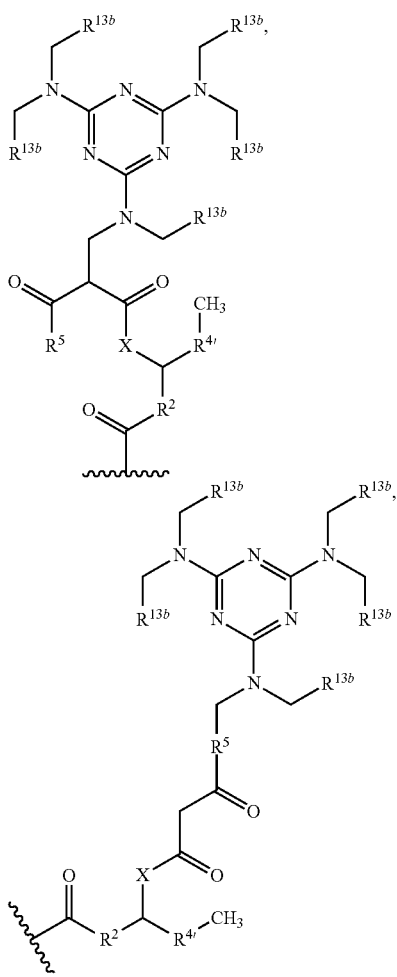

-continued

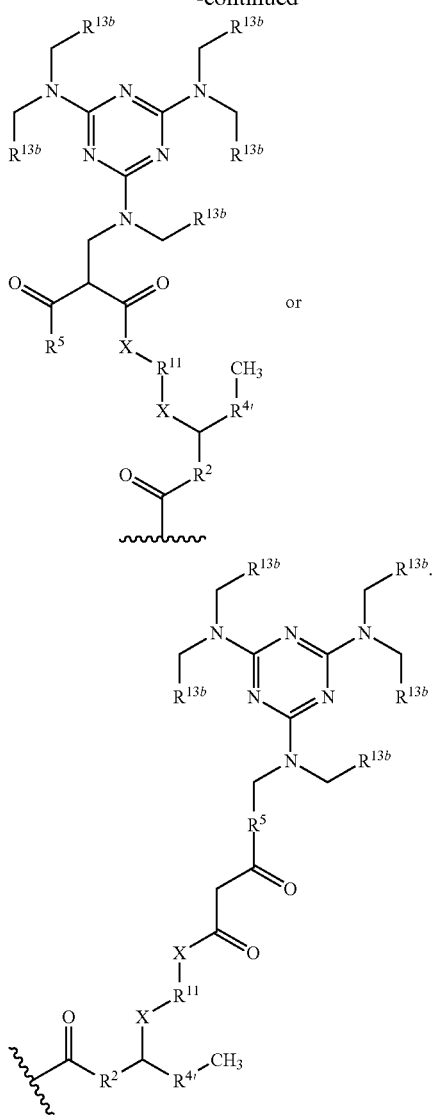

or

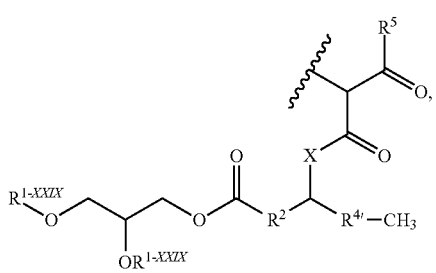

$R^2$ may be $C_1$-$C_{25}$ alkyl or $C_2$-$C_{25}$ alkenyl, optionally substituted with —OH or —$NH_2$. $R^{4\prime}$ may be a bond; or $C_1$-$C_{25}$ alkyl, $C_2$-$C_{25}$ alkenyl, or $C_2$-$C_{25}$ epoxyalkyl, optionally substituted with —OH or —$NH_2$. $R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —$NH_2$. $R^{11}$ may be $C_2$-$C_{12}$ alkyl, $C_6$-$C_{12}$ aryl, or $C_2$-$C_{12}$ alkyl-$C_6$-$C_{12}$ aryl. X may be —O—, —S— or —NH—. $R^{13b}$ may be: —OH, —$OCH_3$, —SH, —$SCH_3$, -continued

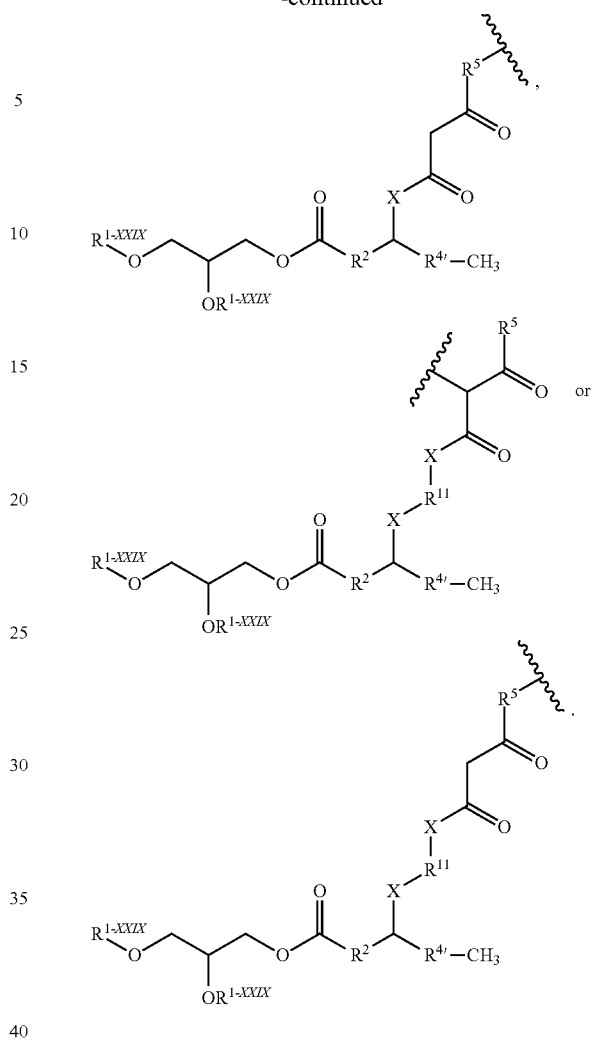

In several embodiments, the composition may include: the polyol unit the β-ketoester group bonded to the alkyl chain of the polyol unit; and the hydrazone group bonded to the keto-carbon of the β-ketoester group such that the poly(polyol)-β-ketoester composition includes the polyol polyhydrazone-β-ketoester composition. The polyol polyhydrazone-β-ketoester composition may include a compound represented by Formula XXX:

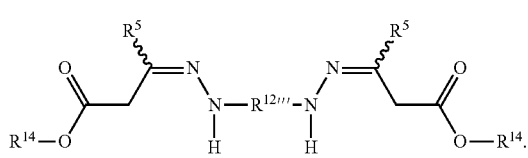

$R^5$ may be $C_1$-$C_8$ alkyl, $C_2$-$C_8$ alkenyl, $C_6$-$C_{10}$ aryl, or $C_4$-$C_8$ heteroaryl, optionally substituted with —OH or —$NH_2$. $R^{12\prime\prime\prime\prime}$ may be $C_2$-$C_6$ alkyl, $C_6$-$C_{10}$ aryl, $C_1$-$C_6$ alkyl-$C_6$-$C_{10}$ aryl, $C_3$-$C_5$ heteroaryl, or $C_1$-$C_6$ alkyl-$C_3$-$C_5$ heteroaryl. $R^{14}$ may be a polyol derived from one of: a pyrolyzed bio-oil, a modified triglyceride, and a triglyceride from a marine organism. The polyol polyhydrazone-β-ketoester composition may include a compound represented by Formula XXXI:

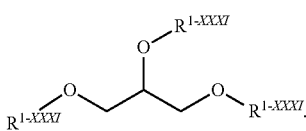

At least one R$^{1\text{-}XXXI}$ may be:

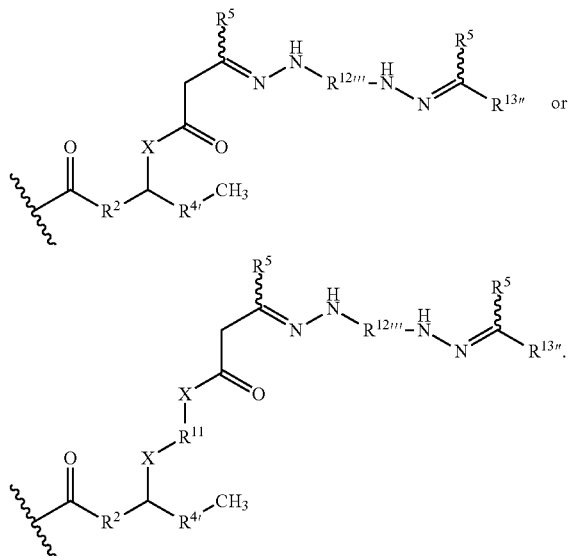

R$^2$ may be C$_2$-C$_{25}$ alkyl or C$_2$-C$_{25}$ alkenyl, optionally substituted with —OH or —NH$_2$. R$^{4\prime}$ may be a bond; or C$_1$-C$_{25}$ alkyl, C$_2$-C$_{25}$ alkenyl, or C$_2$-C$_{25}$ epoxyalkyl, optionally substituted with —OH or —NH$_2$. R$^{11}$ may be C$_2$-C$_{12}$ alkyl, C$_2$-C$_8$ alkenyl, C$_6$-C$_{10}$ aryl, or C$_4$-C$_8$ heteroaryl, optionally substituted with —OH or —NH$_2$. R$^{11}$ may be C$_2$-C$_{12}$ alkyl, C$_6$-C$_{12}$ aryl, or C$_2$-C$_{12}$ alkyl-C$_6$-C$_{12}$ aryl. X may be —O—, —S—, or —NH—. R$^{12\prime\prime\prime}$ may be C$_2$-C$_6$ alkyl, C$_6$-C$_{10}$ aryl, C$_1$-C$_6$ alkyl-C$_6$-C$_{10}$ aryl, C$_3$-C$_5$ heteroaryl, or C$_1$-C$_6$ alkyl-C$_3$-C$_5$ heteroaryl. R$^{13\prime\prime}$ may be:

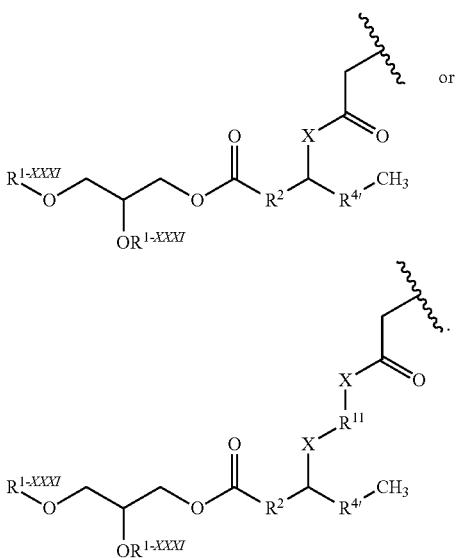

In various embodiments, the poly(polyol)-β-ketoester composition may be a product formed by a process according to any method described herein for the poly(polyol)-β-ketoester composition.

In various embodiments, an article is provided. The article may include a surface coated with a poly(AAG)-composition. e.g., as the poly(AAG)-β-ketoester composition. The poly(AAG)-composition, e.g., as the poly(AAG)-β-ketoester composition, may include any aspect of the poly (AAG)-composition, e.g., as the poly(AAG)-β-ketoester composition, described herein, and may be a product formed by a process according to any method described herein for the poly(AAG)-composition, e.g., as the poly(AAG)-β-ketoester composition. The article may be a beverage or food container and the poly(AAG)-composition, e.g., as the poly (AAG)-β-ketoester composition, may form a coating on an interior surface of the beverage or food container. The surface may include a foil or metal packaging material. The surface may include one or more of: low carbon steel aluminum, anodized aluminum, silver, and alloys or mixtures thereof. The surface may be one or more of: an interior surface or an exterior surface of a medical device. The poly(AAG)-composition, e.g., as the poly(AAG)-β-ketoester composition, may form a cross-linked coating on one or more of: the interior surface and the exterior surface of the medical device. Further, silver may be included by one or more of: the interior surface, the exterior surface, and the poly(AAG)-composition, e.g., as the poly(AAG)-β-ketoester composition, forming the cross-linked coating. The silver may be in ionic or oxide form.

EXAMPLES

The following examples illustrate the processes and compositions of described herein. The following examples are merely illustrative and should not be construed to limit the scope of the embodiments described herein in any way.

Example 1: Synthesis of Acetoacetoxy Amines

Example 1A—Tetraacetoacetoxyethylenediamine (TAAED)

A 250 mL 3-neck round bottom flask was charged with ethylene diamine (11.1 mL, 167 mmol) and t-butyl acetoacetate (110.4 mL, 666 mmol) and purged with argon. The flask was fitted with a Dean-Stark trap, a water-cooled condenser, a thermocouple, and an overhead stirrer. The solution was brought to 150° C. and stirred under argon. Byproduct t-butanol was collected in the trap. After 30 min, the temperature was increased to 160° C. and an exotherm to 170° C. was observed. After 40 min, t-butanol (50.9 mL, 533 mmol, 80%) was collected and the dark red, molten mixture was allowed to cool to room temperature. The resulting red solid was manually broken to yield an orange-red powder.

Example 1B—Tetraacetoacetoxyethylenediamine (TAAED)

A 500 mL 3-neck round bottom flask was charged with ethylene diamine (5.6 mL, 84 mmol) and excess t-butyl acetoacetate (1.27 L, 7.63 mol) and purged with argon. The flask was fitted with a Dean-Stark trap, a water-cooled condenser, a thermocouple, and an overhead stirrer. The solution was stirred at room temperature under argon for 30 min and an exotherm to 40° C. was observed. The reaction mixture was heated to 140° C. and the clear solution became yellow. While ramping the temperature to 150° C., byproduct t-butanol (9 mL, 94.1 mmol) was collected in the trap. After 1 b at 150° C., t-butanol (49 mL, 512 mmol, 97%) was collected in the trap and the solution became dark red in color. The solution was allowed to cool to room temperature and excess starting materials were removed under reduced pressure. The product was analyzed by NMR and IR and was substantially the same as the product obtained in Example 1A.

Example 1C—Hexaacetoacetonoatemelamine (HAAM)

A 250 mL flask was charged with melamine (20 g), 1-butyl acetoacetate (150.51 g), and purged with argon. The flask was fitted with a Dean-Stark trap, a water-cooled condenser, a thermocouple, and an overhead stirrer. The solution was stirred and heated at 170° C. for 4 h. Upon cooling, the solution became a hard, dark red solid. The product was obtained in greater than 80% yield.

Example 2: Synthesis of Polyol-AAG (Acetoacetalation of Polyol)

Example 2A—Soy-AAG ("Soy-PK")

A 1 L flask was charged with soy polyol (600.5 g) [Honeybee HB530, MCPU Polymer Engineering, LLC, Richmond. Va.] and t-butyl acetoacetate (156.7 ml, 946 mmol), and purged with argon. The flask was fitted with a Dean-Stark trap, a water-cooled condenser, a thermocouple, and an overhead stirrer. The reaction was heated to 140° C. aid stirred for 4 h which resulted in byproduct t-butanol (100%) collected in the trap. Fourier Transform Infrared (FTIR) spectra of the Soy-AAG product was obtained, as shown in FIG. 1. The peak at 1730 cm$^{-1}$ is characteristic of the acetoacetate functional group. The Soy-AAG product is a solid and may be diluted with methyl ethyl ketone. The physical properties of Soy-AAG is illustrated in tabular form in FIG. 2.

Example 2B—Soy-AAG ("Soy-PK")

A 1 L flask was charged with soy polyol (690.5 g) [Honeybee HB530, MCPU Polymer Engineering, LLC] and t-butyl acetoacetate (156.7 mL, 946 mmol), and purged with argon. The flask was fitted with a Dean-Stark trap, a water-cooled condenser, a thermocouple, and an overhead stirrer. The reaction was heated to 140° C. and stirred for 3 h which resulted in byproduct t-butanol (73.3 mL, 766 mmol, 81%) collected in the trap. The temperature was increased to 150° C. and the reaction was stirred for an additional 3 h. Byproduct i-butanol (100%) was collected. Fourier Transform Infrared (FTIR) spectra of the product was obtained, as shown in FIG. 1. The peak at 1730 cm$^{-1}$ is characteristic of the acetoacetate functional group. The Soy-AAG product is a solid and may be diluted with methyl ethyl ketone. The physical properties of Soy-AAG is illustrated in tabular form in FIG. 2.

Example 2C—Pentaerythritol-AAG

A 1 L flask was charged with pentaerythritol (40.5 g, 1.03 mol) and t-butyl acetoacetate (684.5 mL, 4.13 mol), and purged with argon. The flask was fitted with a Dean-Stark trap, a water-cooled condenser, a thermocouple, and an overhead stirrer. The reaction was heated to 140° C. for 4 h. The product was isolated without any further purification in 94% yield.

Example 2D—Sucrose-AAG

A 250 mL flask was charged with sucrose (20.06 g, 58.6 mmol) and 1-butyl acetoacetate (81.4 mL, 491 mmol), and purged with argon. The flask was fitted with a Dean-Stark trap, a water-cooled condenser, a thermocouple, and an overhead stirrer. The reaction was heated at 150° C. for 2 h. After this time, the reflux ceased and the reaction temperature as increased to 170° C. for an additional 2 h. Byproduct t-butanol (32.7 mL, 342 mmol, 70%) was collected.

Example 2E—1,4-BD-diAAG

A 250 mL flask was charged with 1,4-butanediol (29.6 mL, 334 mmol) and t-butyl acetoacetate (116.6 mL, 703 mmol), and purged with argon. The flask was fitted with a Dean-Stark trap, a water-cooled condenser, a thermocouple, and an overhead stirrer. The reaction was heated at 150° C. for 4 h. Byproduct t-butanol (60.1 mL, 628 mmol, 89%) was collected.

Example 2F—Glycerol-triAAG

A flask was charged with glycerol (150.7 mL, 206 mmol) and t-butyl acetoacetate (1.03 L, 6.19 mol), and purged with argon. The flask was fitted with a Dean-Stark trap, a water-cooled condenser, a thermocouple, and an overhead stirrer. The reaction was heated to 140° C. After 3 h t-butanol (481.3 mL, 5.03 mol, 81%) was collected in the trap. The temperature was increased to 150° C. and the reaction was allowed to stir for an additional 3 h. Byproduct t-butanol (561.8 mL, 5.87 mol, 95%) was collected.

Example 2G—Arsoy-AAG

A 250 mL flask was charged with jet-milled soy carbohydrate concentrate (30 g) (Arsoy, Praeter Industries MKBL4718V<20 micron) and t-butyl acetoacetate (94.3 mL, 569 mmol), and purged with argon. The flask was fitted with a Dean-Stark trap, a water-cooled condenser, a thermocouple, and an overhead stirrer. The reaction was heated at 140° C. for 4 h. Byproduct t-butanol (100%) was collected and a tan paste was obtained.

Example 2H—Stearyl-AAG

A 250 mL flask was charged with stearyl alcohol (80.0 g, 296 mmol), 1-butyl acetoacetate (53.2 mL, 321 mmol), and purged under argon. The flask was fitted with a Dean-Stark trap, a water-cooled condenser, a thermocouple, and an overhead stirrer. The reaction mixture was heated at 150° C. for 4 h. Byproduct t-butanol (20.9 mL, 218 mmol, 74%) was collected in the trap.

Example 2I—Polyesterpolyether Polyol-AAG

A 1 L round bottom flask was charged with Boltorn™ P501 (353 g) [Perstorp Winning Formulas, Perstorp, Sweden], I-butyl acetoacetate (377 g), and purged under argon. The flask was fitted with a Dean-Stark trap, a water-cooled condenser, a thermocouple, and an overhead stirrer. The reaction mixture was heated at 140° C. for 4 h. Byproduct t-butanol (96%) was collected in the trap.

Example 2J—Polyether Polyol-AAG

A 500 mL round bottom flask was charges with JEFFOL® SG360 (200.3 g) [Huntsman, Auburn Hills, Michigan], i-butyl acetoacetate (205.8 g), and purged under argon. The flask was fitted with a Dean-Stark trap, a water-cooled condenser, a thermocouple, and an overhead stirrer. The reaction mixture was heated at 140° C. for 2 h. Byproduct t-butanol (96%) was collected in the trap.

Example 3: Soy-AAG Polyamine and Soy-AAG Polyamide Coatings

Examples 3A-3C below were performed as follows: The AAG and crosslinker (total 10 grams) were weighed in a Flecktec mixing cup along with PTSA (0.5-10 wt % in methyl ethyl ketone (MEK)). The contents were mixed at 3000 rpm for 1 min. The resulting mixture was coated onto a low carbon steel panel using a 2 mm wet film thickness drawdown bar. The panel was cured at 180° C. for 30 min.

Figure 3:
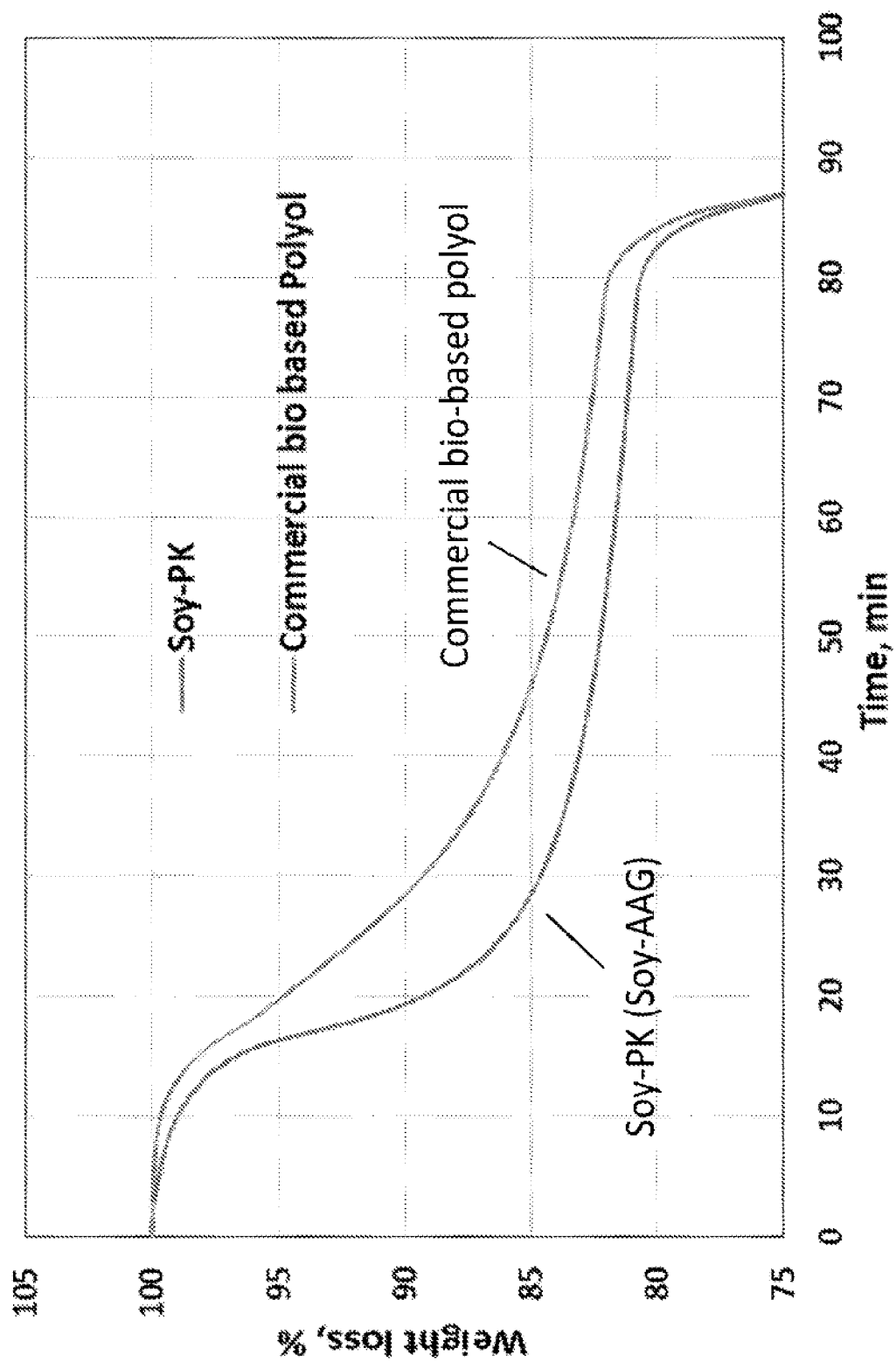
FIG. 3 is a graph illustrating the relative cure rates, via TGA, of an example soy-AAG ("soy-PK") and a commercial bio-based polyol with CYMEL™-303 cross-linker.

Example 3A: 75% soy-AAG; 25% CYMEL™ 303, PTSA (0.5%). It was observed from Thermogravimetric Analysis (TGA) that soy-AAG ("Soy-PK") cures faster than its precursor: the non-acetoacetoatylated commercial bio-based polyol [Honeybee HB530, MCPU Polymer Engineering, LLC, Richmond]. The TGA plot of soy-AAG curing with CYMEL™ 303 is compared with the bio-based soy polyol curing with CYMEL™ 303, as shown in FIG. 3.

The degree of cure, α, can be calculated from the TGA data using the following equation:

$$\alpha = \frac{\Delta m_{t,T}}{\Delta y}$$

where $\Delta m_{t,T}$ is the difference in mass at time t and temperature T; $\Delta y$ is the derivative at the given cure temperature T. The derivative at 200° C. for soy-AAG and polyol-based resin is respectively 19.2 and 17.9%. Therefore, the degree of cure at 20 min for soy-AAG is 51%, and the degree of cure for the commercial bio-based polyol is 29%.

Figure 5:
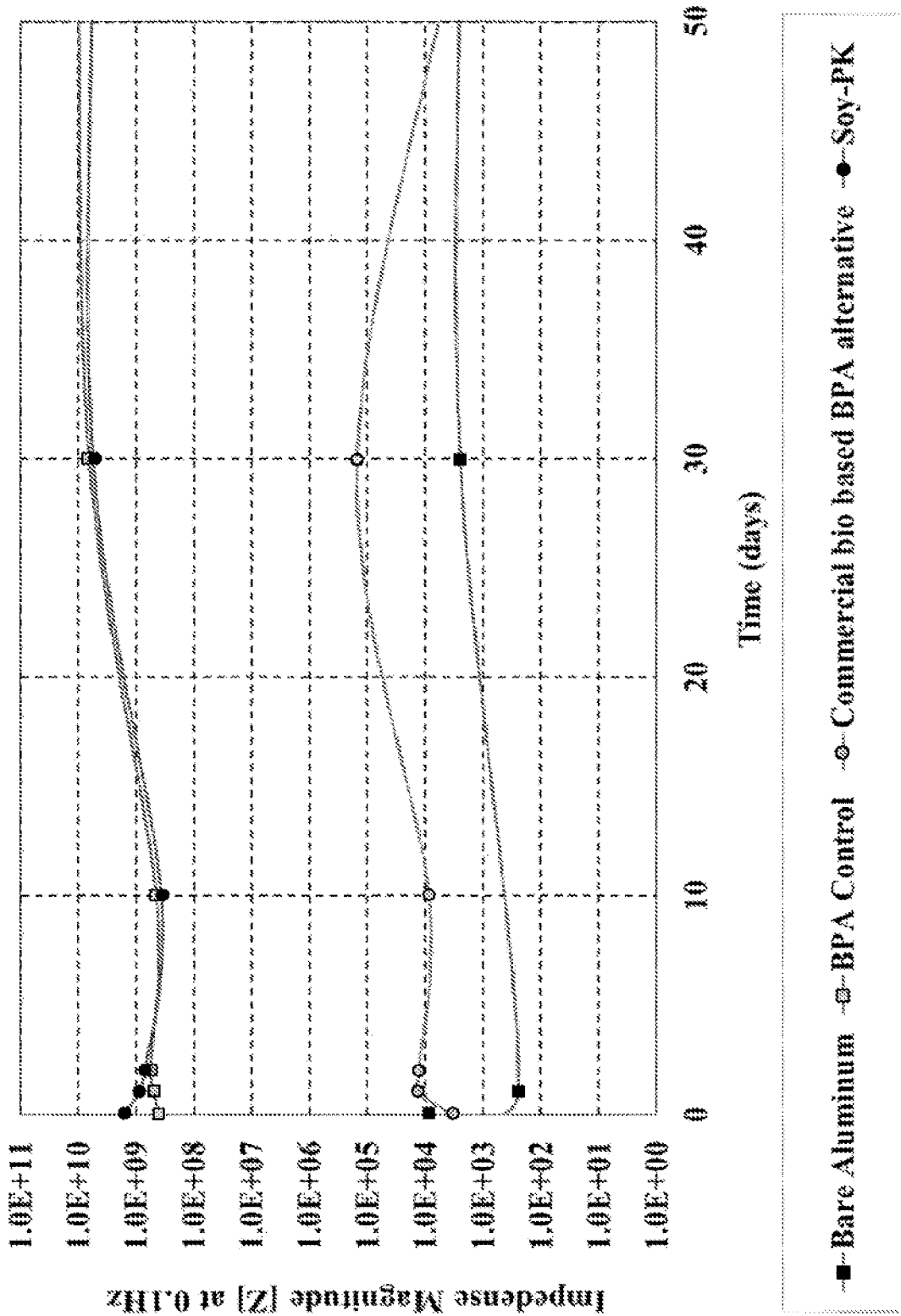
FIG. 5 is a graph illustrating the relative corrosion performances, via EIS, of an example soy-AAG ("soy-PK") CYMEL™-303-cured resin, commercial BPA resin, commercial BPA resin alternative, and aluminum.

Performance data for the soy-AAG cured resin is illustrated in tabular format in FIG. 4. The corrosion performance of soy-AAG cured resin was evaluated using Electrochemical Impedance Spectroscopy (EIS). The coating was exposed to 3.5 wt % NaCl and the impedance was measured using a PAR potentiostat/galvanostat and Solartron equipment between the frequency range of 0.01 Hz to 65 Hz. The total coating impedance at a frequency of 0.1 Hz was used as a guide to predict the corrosion performance of die coating. The performance for the soy-AAG cured resin coating over a period of 50 days is shown in FIG. 5. It was evident that the soy-AAG cured resin is on par with the corrosion performance of BPA-based resin and outperforms commercial bio-based BPA-free alternative coatings.

Figure 6:
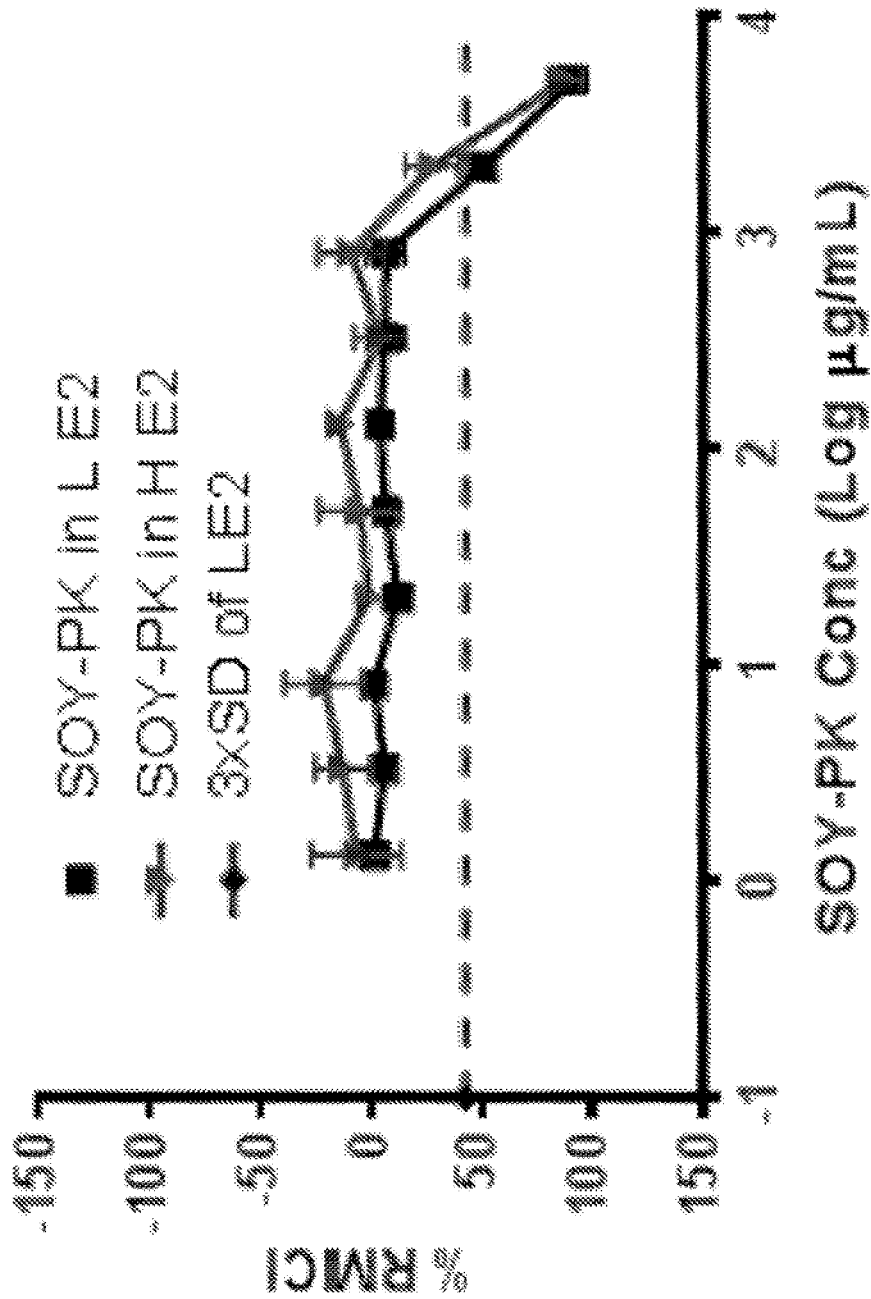
FIG. 6 is a graph illustrating the toxicity performance, via BG1LUC assay, of an example soy-AAG ("soy-PK") CYMEL™-303-cured resin with respect to anti-estrogenic activity.
Figure 7:
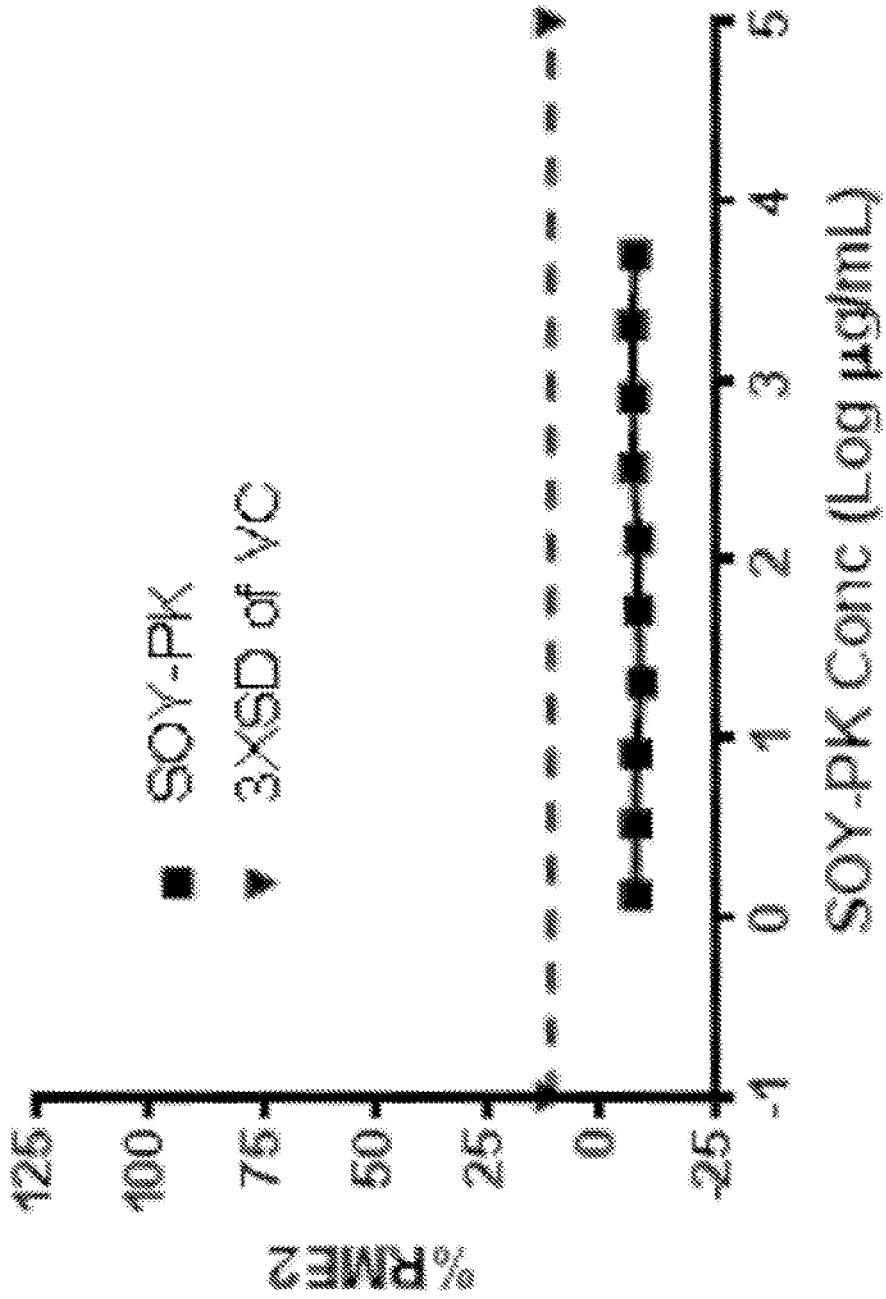
FIG. 7 is a graph illustrating the toxicity performance, via BG1LUC assay, of an example soy-AAG ("soy-PK") CYMEL™-303-cured resin with respect to estrogenic activity.

The toxicity of soy-AAG cured resin was assessed using BG1LUC assay, as described in Bittner, et al., *Environmental Heath*, 2014, 13, 103. It was found that soy-AAG cured resin has no detectable estrogenic (see FIG. 6) or antiestrogenic activity (see FIG. 7).

Example 3B

50% soy-AAG: 25% CYMEL™ 303; 25% pentaerythritol-AAG; PTSA (0.5%).

Example 3C

50% soy-AAG; 25% CYMEL® 303; 25% dipentaerythriol-AAG; PTSA (0.5%).

Example 3D

95% soy-AAG; 5% PMDI; 70% solids with MEK. The AAG and crosslinker (total 10 grams) was weighed in a Flecktec mixing cup along with methyl ethyl ketone. The contents were mixed at 3000 rpm for 1 min. The resulting mixture was coated onto a low carbon steel panel using a 2 mm wet film thickness drawdown bar. The panel was cured at 180° C. for 30 min.

Example 3E—Arsoy-AAG Polyamine

A flask was charged with CYMEL™ 303 (2.5 g), Arsoy-AAG 7.5 g), p-toluene sulfonic acid (0.5% wt). The mixture was diluted with MEK (30% wt) and stirred until a uniform solution was achieved. The solution was spread onto a low carbon steel coupon (2 mm film thickness) and heated (cured) at 180° C. for 30 min. The resulting tackless coating appeared opaque and yellow in color.

Example 3F—Styrenyl-AAG Polyamine

A flask was charged with CYMEL™-303 (2.5 g). Styrene-AAG of Example 5A (2.5 g), Soy-AAG of Example 2A/2B (5.0 g) and p-toluene sulfonic acid (0.2 mol %). The reaction mixture was stirred until a uniform solution was obtained. The reaction mixture was spread onto a low carbon steel coupon (2 mm thick). The coupon and reaction mixture were heated at 180° C. for 30 min, resulting in a tackless yellow-brown film.

Example 4: Soy-AAG Polyamide Foam

Example 4A

Soy-AAG (20.13 g), Luprinate M20 (6 g), tegostab B4690 (0.1 g), water (0.11 g) and MEK (2.1 g) were rapidly mixed using a spatula at about 23° C. for 2-4 min. The resulting mixture was poured into a container coated with a release agent and the foam solids were allowed to expand 5-15 times.

Example 4B

Soy-AAG (20.01 g), Luprinate M20 (9.5 g), tegostab B4690 (0.2 g), water (1.01 g) and MEK (4 g) were rapidly mixed at about 23° C. for 2-4 min. The resulting mixture was poured into a container coated with release agent and the foam solids were allowed to expand 5-15 times.

Example 4C

Soy-AAG (20.01 g), Luprinate M2 (9.5 g), tegosab B4690 (0.2 g), and water (1.01 g) were rapidly mixed at about 23° C. for 2-4 min. The resulting mixture was poured into a container coated with release agent and the foam solids were allowed to expand 5-15 times.

Example 4D

Soy-AAG (30 g), Luprinate M20 (9.5 g), tegostab B4690 (0.2 g), water (0.5 g), and Mg(OH)₂ (2.0 g) were rapidly mixed at about 23° C. for 2-4 min. The resulting mixture was poured into a container coated with release agent and the foam solids were allowed to expand 5-15 times.

Example 4E

Soy-AAG (5.02 g). Luprinate M20 (9.5 g), tegostab B4690 (0.2 g), water (0.21 g), and glycerol-AAG (prepared according to Example 2) (1.35 g) were rapidly mixed at about 23° C. for 2-4 mm. The resulting mixture was poured into a container coated with release agent aid the foam solids were allowed to expand 5-15 times.

Example 5: Biomass Surrogate-AAG

Example 5A—Styrene-AAG

A 500 mL flask was charged with 2-(methylacryloyloxy) ethyl acetoacetate (89.1 mL, 467 mmol), styrene 110 mL, 960 mmol), and AIBN (4.0 g, 24.4 mmol), and purged with argon. The flask was fitted with a Dean-Stark trap, a water-cooled condenser, a thermocouple, and an overhead stirrer. The reaction was heated to 60° C. and stirred for 24 h. The reaction mixture was cooled and gave a pale yellow product with low viscosity.

Example 5B—Polyol-diAAG Diurethane

Hexamethylene diisocyanate (HDI) was reacted with ethylene glycol to give a hexamethylene diurethane diol. A 250 mL flask was charged with hexamethylene diurethane diol (48.62 g, 289 mmol) t-butyl acetoacetate (55.2 mL, 333 mmol), and purged under argon. The flask was fitted with a Dean-Stark trap, a water-cooled condenser, a thermocouple, and an overhead stirrer. The reaction mixture was heated to 140° C. for 2 h. Byproduct t-butanol (>90%) was collected in the trap. The reaction mixture was cooled to give a clear, yellow-orange product.

Example 5C—Polyol-diAAG Diurethane

A 500 mL flask was charged with hexamethylene diamine (110.7 g, 953 mmol), ethylene carbonate (167.7 g, 1.9) mol), and purged under argon. The flask was fitted with a Dean-Stark trap, a water-cooled condenser, a thermocouple, and an overhead stirrer. The reaction mixture was heated to 90° C. for 20 h. The reaction mixture was cooled to give a crystalline solid.

Prophetic Example 6: Acetoacetalation of Epoxidized Triglyceride

To a solution of an epoxidized triglyceride, such as epoxidized soybean oil, and choice solvent, may be added acetoacetic acid. The reaction may be promoted by the addition of a mild, non-nucleophilic base. Alternatively, the reaction may be promoted by an acid catalyst.

Prophetic Example 7: Acetoacetalation of Unsaturated Triglyceride

To a solution of TAAED mid choice solvent, may be added an aqueous solution of $H_2O_2$. The solution may be stirred for a period of time before the addition of a solution of an unsaturated triglyceride in a choice solvent. Alternatively, the TAAED/$H_2O_2$ solution may be added to a flask containing the unsaturated triglyceride solution. It is also conceivable that TAAED, $H_2O_2$, aid the unsaturated triglyceride may be combined at once, though it is presumed that higher yield may be obtainable in a step-wise fashion.

Prophetic Example 8: Acetoacetalation of Unsaturated Natural Oil

To a solution of TAAED mid choice solvent, may be added an aqueous solution of $H_2O_2$. The solution may be stirred for a period of time before the addition of a solution of an unsaturated fatty acid ester in a choice solvent. Alternatively, the TAAEDH/$H_2O_2$ solution may be added to a flask containing the unsaturated fatty acid ester. The TAAED, $H_2O_2$, and the fatty acid ester may be combined at once, though it is presumed that higher yield may be obtainable in a step-wise fashion.

Prophetic Example 9: Pyrolized Bio-oil-AAG

A flask may be charged with alcohols and/or polyols of pyrolized bio-oil, t-butyl acetoacetate, and purged under argon. The flask may be fitted with a Dean-Stark trap, a water-cooled condenser, a thermocouple, and an overhead stirrer. The reaction mixture may be heated to 140-200° C. for a period of time. The byproduct t-butanol may be collected in the trap and the quantity of t-butanol produced may be indicative of the progression of the reaction.

To the extent that the term "include" or "including" is used in the specification or the claims, it is intended to be inclusive in a manner similar to the interpretation of the term "comprising" when employed as a transitional word in a claim. Furthermore, to the extent that the term "or" is employed (e.g., A or B) it is intended to mean "A or B or both." When "only A or B but not both" is intended, then the term "only A or B but not both" will be employed. Thus, use of the term "or" herein is the inclusive, and not the exclusive use. As used in the specification and the claims, the singular forms "a," "an," and "the" include the plural. As used herein, the term "approximately" means plus or minus 10% unless otherwise specified.

The terms "optional" and "optionally" mean that the subsequently described circumstance may or may not occur, so that the description includes instances where the circumstance occurs and instances where it does not.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e. F, Cl, Br, and I), hydroxyls, alkoxy, alkenoxy, aryloxy, aralkyloxy, heterocyclyloxy, and heterocyclylalkoxy groups; carbonyls (oxo); carboxyls; esters; urethanes oximes; hydroxylamines; alkoxyamines; aralkoxyamines; thiols; sulfides; sulfoxides; sulfones; sulfonyls; sulfonamides, amines; N-oxides; hydrazides, hydrazides; hydrazones, aides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Substituted cycloalkyl groups may be substituted one or more times with non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Aryl groups are cyclic aromatic hydrocarbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or napthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

Heterocyclic groups include aromatic (also referred to as heteroaryl) and non-aromatic ring compounds containing 3 or more ring members of which one or more is a heteroatom such as, but not limited to, N, O, and S. In some embodiments, the heterocyclyl group contains 1, 2, 3 or 4 heteroatoms. In some embodiments, heterocyclic groups include mono-, bi- and tricyclic rings having 3 to 16 ring members, whereas other such groups have 3 to 6, 3 to 10, 3 to 12, or 3 to 14 ring members. Heterocyclic groups encompass aromatic, partially unsaturated and saturated ring systems, such as, for example, imidazolyl, imidazolinyl and imidazolidinyl groups. The phrase "heterocyclic group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclic groups that have other groups, such as alkyl, oxo or halo groups, bonded to one of the ring members. Rather, these are referred to as "substituted heterocyclic groups." Heterocyclic groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrolyl, pyrrolinyl imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, norpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzinidazolyl, benzofuranyl, benzothiophenyl, benzthiazolyl, benzoxadiazolyl, benzoxawnyl, benzodithiinyl, benzoxathiinyl, benzothiainyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyndyl, tetrahydropyrazolopyridyl, tetrahydroimidazopyridyl, tetrahydrotriazolopyridyl, and tetrahydroqunolinyl groups. Representative substituted heterocyclic groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindol (pyrrolopyridinyl), indazolyl, benzimidazolyl, imidazopyridinyl (azabenzimidazolyl), pyrazolopyridinyl, triazolopyridinyl, benzotnazolyl, benzoxazolyl, benzothiazolyl, benzothiadiazolyl, imidazopyridinyl, isoxazolopyridinyl, thianaphthyl purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Heteroaralkyl groups are alkyl groups as defined above in which a hydrogen or carbon bond of an alkyl group is replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the technology are designated by use of the suffix, "ene." For example, divalent alkyl groups are alkylene groups, divalent aryl groups are arylene groups, divalent heteroaryl groups are heteroarylene groups, and so forth. Substituted groups having a single point of attachment to the compound of the technology are not referred to using the "ene" designation. Thus, for example, chloroethyl is not referred to herein as chloroethylene.

Alkoxy groups are hydroxyl groups (—OH) in which the bond to the hydrogen atom is replaced by a bond to a carbon atom of a substituted or unsubstituted alkyl group as defined above. Examples of linear alkoxy groups include, but are not limited to, methoxy, ethoxy, propoxy, butoxy, pentoxy, hexoxy, and the like. Examples of branched alkoxy groups include, but are not limited to, isopropoxy, sec-butoxy, tert-butoxy, isopentoxy, isohexoxy, and the like. Examples of cycloalkoxy groups include, but are not limited to, cyclopropyloxy, cyclobutyloxy, cyclopentyloxy, cyclohexyloxy, and the like. Representative substituted alkoxy groups may be substituted one or more times with substituents such as those listed above.

The term "amine" (or "amino"), as used herein, refers to NR$^a$R$^b$ groups, wherein R$^a$ and R$^b$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino. The term "alkylamino" is defined as NR$^c$R$^d$ wherein at least one of R$^c$ and R$^d$ is alkyl and the other is alkyl or hydrogen. The term "arylamino" is defined as NR$^e$R$^f$, wherein at least one of R$^e$ and R$^f$ is aryl and the other is aryl or hydrogen.

The term "halogen" or "halo," as used herein, refers to bromine, chlorine, fluorine, or iodine. In some embodiments, the halogen is fluorine. In other embodiments, the halogen is chlorine or bromine.

While the present application has been illustrated by the description of embodiments, and while the embodiments have been described in considerable detail, it is not the intention to restrict or in any way limit the scope of the appended claims to such detail. Additional advantages and modifications will readily appear to those skilled in the an, having the benefit of this application. Therefore, the application, in its broader aspects, is not limited to the specific details and illustrative examples shown. Departures may be made from such details and examples without departing from the spirit or scope of the general inventive concept.

The invention claimed is:

1. A method for preparing a poly acetoacetyl group (AAG)-composition, comprising:
    contacting an AAG composition with a cross-linking compound to form a reaction mixture, the AAG composition being derived from a polyfunctional moiety comprising a polyol unit, a polyamine unit, a polyalkene unit, or a combination or a composite thereof, wherein at least a portion of the poly-functional moiety being a polyol derived from one or more of a pyrolyzed bio-oil and an alkoxylated pyrolyzed bio-oil, provided that the AAG composition is not a triglyceride-AAG composition and
    reacting the AAG composition and the cross-linking compound to form the poly(AAG) composition.

2. The method of claim 1, comprising:
    contacting the AAG composition with the cross-linking compound to form the reaction mixture, the AAG composition being a AAG-ketoester composition; and
    reacting the AAG composition and the cross-linking compound to form the poly(AAG)-ketoester composition.

3. The method of claim 1, further comprising one of:
    contacting the AAG composition with the cross-linking compound in the presence of one or more of: an inert atmosphere; water; a blowing agent; a surfactant; and a base;
    contacting the AAG composition with the cross-linking compound in the presence of an acid catalyst or a Lewis acid catalyst;
    contacting the AAG composition and the cross-linking compound at about 25° C.; and pouring the reaction mixture into a mold, the mold coated in a mold release agent; and
    applying the reaction mixture to a surface; and heating the reaction mixture and the surface effective to form the poly(AAG)-composition as a cross-linked coating on the surface.

4. The method of claim 3, comprising applying the reaction mixture to the surface, and further comprising:
    contacting the AAG composition and the cross-linking compound to form the reaction mixture at about 25° C. for less than 3 minutes;
    applying the reaction mixture onto the surface; and
    heating the reaction mixture and the surface at a temperature of about 180° C. for 30 minutes effective to form the poly(AAG)-composition as a cross-linked coating on the surface.

5. The method of claim 4, the surface being one of:
    an interior surface of a food or beverage container;
    an interior surface or an exterior surface of a medical device; and
    a metal surface comprising:
        a foil or metal packaging material;
        one or more of: low carbon steel, aluminum, anodized aluminum, silver, and alloys or mixtures thereof.

6. The method of claim 1, the cross-linking compound comprising one of:

one or more of: a diisocyanate, a triisocyanate, and a tetraisocyanate;
a polymer comprising more than one isocyanate group;
one or more isocyanate cross-linking reagents;
one or more of: a hemiaminal, a hemiaminal ether, a hemiaminal thioether an aromatic hemiaminal, an aromatic hemiaminal ether, an aromatic hemiaminal thioether, a polymer comprising a hemiaminal, a polymer comprising a hemiaminal ether, and a polymer comprising a hemiaminal thioether;
a hemiaminal crosslinking reagent;
a polyamine;
one or more of: a dihydrazine and a dihydrazide;
at least two diazonium groups, the diazonium groups being effective to cross-link two or more AAG compounds of the AAG composition to form azo cross-links;
one or more of: adipic dihyrazide, sebacic dihydrazide, oxalyl dihydrazide, succinic dihydrazide, maleic dihydrazide, malic dihydrazide, isophthalicdihydrazide, and terephthalic dihydrazide;
an aldehyde, the aldehyde being effective to cross-link two or more AAG compounds of the AAG composition through a methylene cross-link;
formaldehyde;
at least two α,β-unsaturated carbonyls, the α,β-unsaturated carbonyls effective to cross-link two or more AAG compounds of the AAG composition; and
a compound represented by Formula XIV:

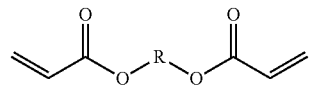

wherein: R is $CH_2CH_2$, $CH_2(CH_3)CH$, $(CH_2CH_2OCH_2CH_2)_n$, $(CH_2(CH_3)CHOCH_2(CH_3)CH)_n$; and n is an integer from 1 to 50.

* * * * *